(12) United States Patent
Yasui

(10) Patent No.: US 8,185,218 B2
(45) Date of Patent: May 22, 2012

(54) CONTROL APPARATUS, CONTROL METHOD, AND ENGINE CONTROL UNIT

(75) Inventor: Yuji Yasui, Saitama-ken (JP)

(73) Assignee: Honda Motor Co. Ltd, Tokyo (JP)

( * ) Notice: Subject to any disclaimer, the term of this patent is extended or adjusted under 35 U.S.C. 154(b) by 678 days.

(21) Appl. No.: 11/802,002

(22) Filed: May 18, 2007

(65) Prior Publication Data

US 2007/0270983 A1    Nov. 22, 2007

(30) Foreign Application Priority Data

May 18, 2006   (JP) ................................. 2006-139265

(51) Int. Cl.
 *G05B 13/02* (2006.01)
 *G06F 19/00* (2011.01)
 *F02B 17/00* (2006.01)
 *F02B 5/00* (2006.01)

(52) U.S. Cl. .............. 700/30; 700/31; 701/99; 123/295; 123/305; 123/406.11; 123/406.23; 123/406.24

(58) Field of Classification Search .................... 700/30, 700/31; 701/99; 123/295, 305, 406.11, 406.23, 123/406.24, 406.26, 406.33, 434, 681, 687, 123/694, 695

See application file for complete search history.

(56) References Cited

U.S. PATENT DOCUMENTS

| | | | | |
|---|---|---|---|---|
| 5,991,680 A * | 11/1999 | Kono et al. | ...................... | 701/67 |
| 6,049,738 A * | 4/2000 | Kayama et al. | .................. | 700/29 |
| 6,785,601 B2 * | 8/2004 | Yoshizawa et al. | ........... | 701/109 |
| 6,848,420 B2 * | 2/2005 | Ishiguro et al. | ................ | 123/399 |
| 7,270,119 B2 * | 9/2007 | Mitsutani | ....................... | 123/674 |
| 2002/0010518 A1 * | 1/2002 | Reid et al. | ........................ | 700/31 |
| 2002/0133268 A1 * | 9/2002 | Kato et al. | ..................... | 700/193 |
| 2003/0033075 A1 * | 2/2003 | Yasui et al. | .................... | 701/109 |
| 2003/0139826 A1 * | 7/2003 | Yasui et al. | ...................... | 700/31 |
| 2003/0154953 A1 * | 8/2003 | Yasui | ............................ | 123/205 |
| 2003/0229408 A1 * | 12/2003 | Yasui et al. | ..................... | 700/30 |
| 2004/0049296 A1 * | 3/2004 | Hashimoto et al. | ............. | 700/28 |
| 2004/0199323 A1 * | 10/2004 | Mizuno et al. | ................ | 701/109 |
| 2005/0004683 A1 * | 1/2005 | Yamazaki | ....................... | 700/30 |
| 2006/0129257 A1 * | 6/2006 | Chen et al. | ...................... | 700/96 |

FOREIGN PATENT DOCUMENTS

JP    2003-172181 A    6/2003
JP    2005-267632 A    9/2005

OTHER PUBLICATIONS

European Search Report dated Sep. 26, 2007.

* cited by examiner

*Primary Examiner* — Albert Decady
*Assistant Examiner* — Jason Lin
(74) *Attorney, Agent, or Firm* — Arent Fox LLP

(57) ABSTRACT

A control apparatus which is capable of ensuring both high-level stability and accuracy of control, even when controlling a controlled object having extremal characteristics or a controlled object a controlled object model of which cannot be represented. The control apparatus 1 includes a cooperative controller 30, an onboard model analyzer 40, and a model corrector 60. The model corrector 60 calculates the model correction parameter matrix θ, so as to correct the controlled object model defining the relationship between the intake opening angle θlin and the exhaust reopening angle θrbl and the indicated mean effective pressure Pmi. The onboard model analyzer 40 calculates first and second response indices RI1 and RI2 representative of correlations between θlin, θrbl, and Pmi, based on the controlled object model corrected using θ. The cooperative controller 30 calculates the θlin and θrbl such that Pmi is caused to converge to a target value Pmi_cmd, and determines an increasing/decreasing rate and increasing/decreasing direction of θlin and θrbl according to RI1 and RI2.

24 Claims, 31 Drawing Sheets

F I G. 3
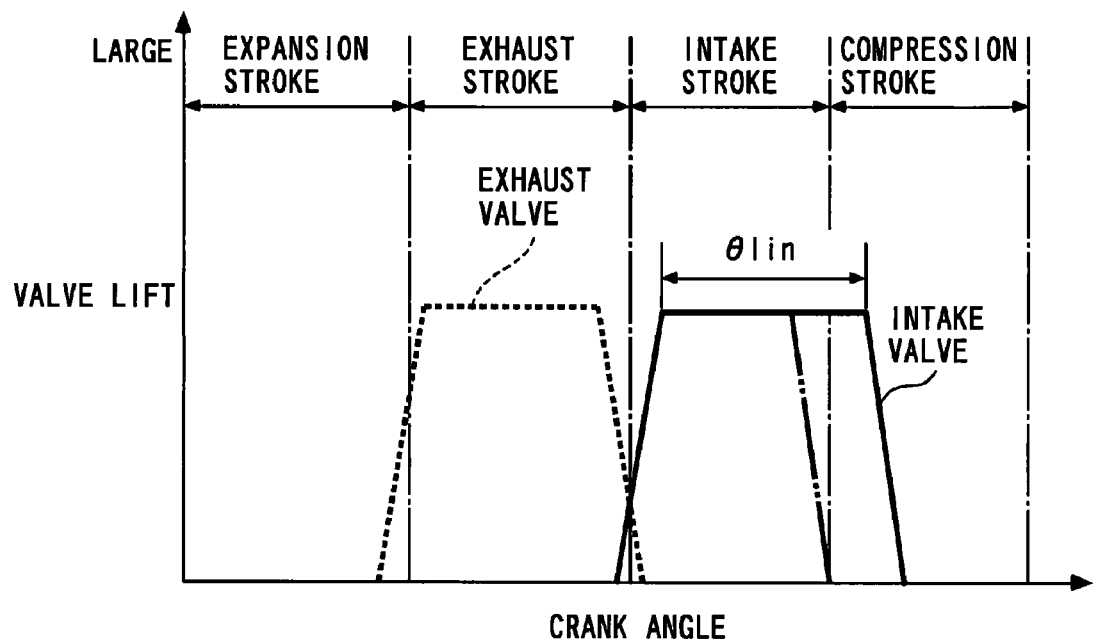
F I G. 4
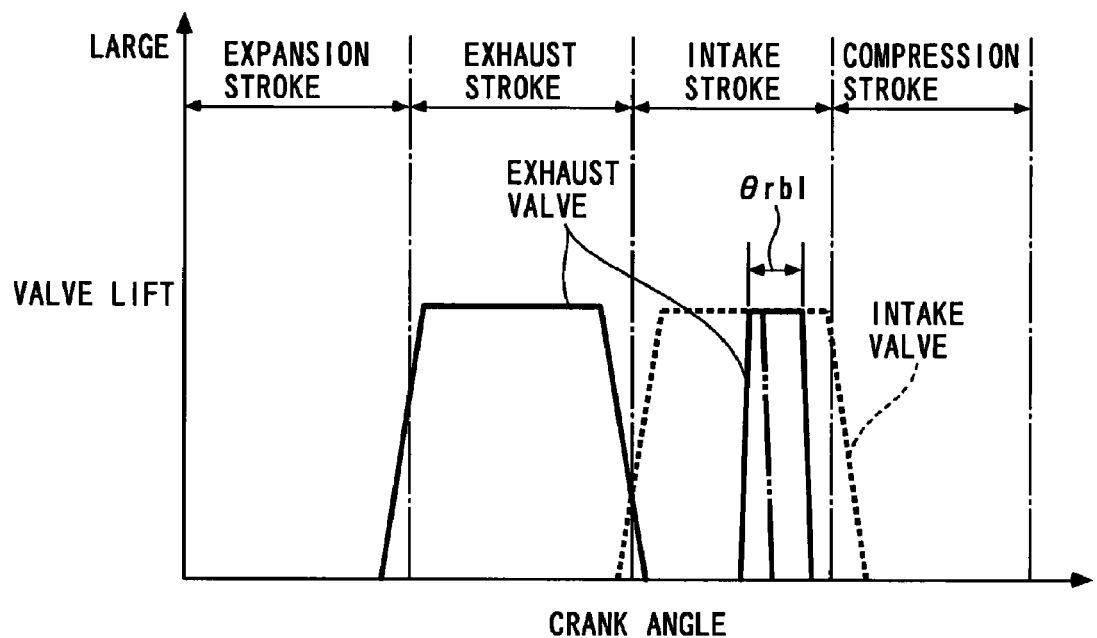

F I G. 1 6
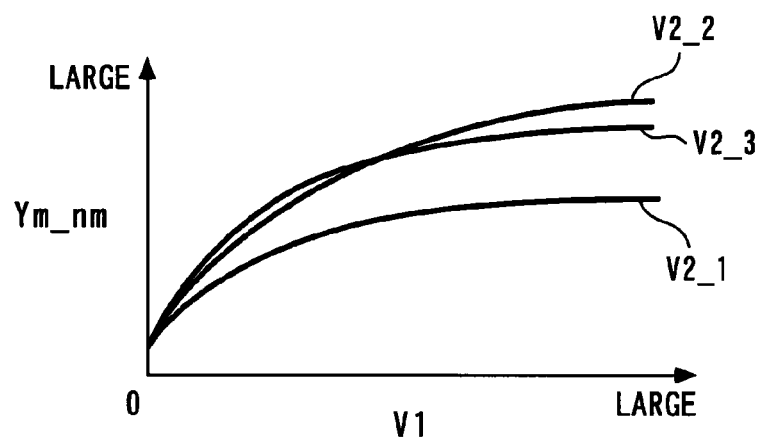
F I G. 1 7
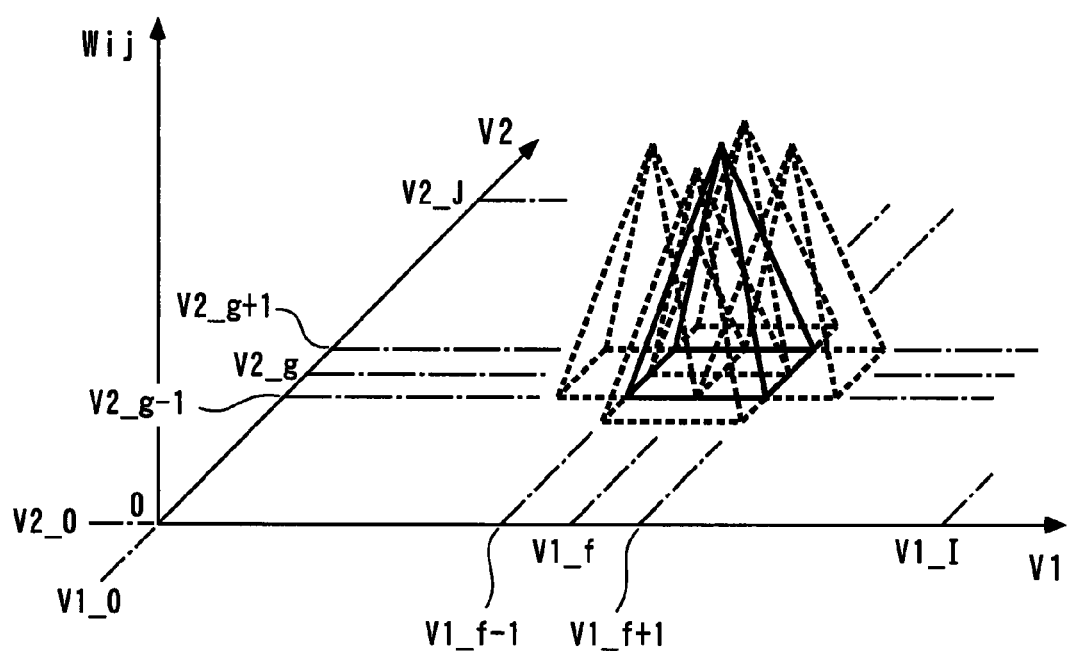

CONTROL APPARATUS, CONTROL METHOD, AND ENGINE CONTROL UNIT

BACKGROUND OF THE INVENTION

1. Field of the Invention

This invention relates to a control apparatus, a control method, and an engine control unit which control a controlled object with a control algorithm using a controlled object model.

2. Description of the Related Art

Conventionally, as a control apparatus of this kind, the present assignee has already proposed a control apparatus disclosed in Japanese Laid-Open Patent Publication (Kokai) No. 2005-23922. The control apparatus controls the rotational speed of a driven shaft as a controlled variable by inputting a control input to a clutch mechanism as a controlled object, and includes a controller for calculating the control input. This controller calculates the control input with a target filter-type two-degree-of-freedom sliding mode control algorithm, based on a controlled object model of a discrete-time system, in which the relationship between the control input and the controlled variable is expressed by a recurrence formula. The control input is input to an actuator of the clutch mechanism, and the controlled variable is controlled such that it is caused to converge to its target value.

Further, the controller shown in FIG. 5 of the Japanese Laid-Open Patent Publication (Kokai) No. 2005-23922 includes an identifier that identifies model parameters of the controlled object with an identification algorithm, e.g. based on the sequential least-squares method. When the sequential least-squares method is employed for the identification algorithm for the identifier, the model parameters are identified onboard, and hence even when the controlled object model ceases to match the characteristics of a clutch mechanism as an actual controlled object due to variation between individual products of the clutch mechanism or aging of the same, causing a modeling error, it is possible to control the clutch mechanism while quickly compensating for the modeling error.

In the control apparatus of the Japanese Laid-Open Patent Publication (Kokai) No. 2005-23922 configured as above, since the control input is calculated with a target filter-type two-degree-of-freedom sliding mode control algorithm, it is possible to separately change the rate and behavior of convergence of the controlled variable to the target value for adjustment, which makes it possible to ensure both high-level stability and accuracy of control. Further, when the sequential least-squares method is employed for the identifier, it is possible to control the clutch mechanism while compensating for the modeling error onboard, which makes it possible to further increase the control accuracy.

When the conventional control apparatus described above is applied to a controlled object having characteristics that a controlled variable thereof takes an extremum value (local maximum value or local minimum value) as a control input (hereinafter referred to as "the controlled object having extremal characteristics") changes, if a target value of the controlled variable is set to a value larger than the local maximum value of the controlled variable or a value smaller than the local minimum value of the same, the controlled variable cannot reach the target value, so that the control input is calculated such that the controlled variable is changed up to the maximum value or the minimum value. As a result, the controlled variable is controlled in a direction largely deviating from the target value. That is, the control system is made unstable, and the accuracy of control is largely degraded.

Further, the identification algorithm, such as one based on the sequential least-squares method used in the above-mentioned identifier, is applicable, insofar as the controlled object model can be expressed by a recurrence formula. However, if the controlled object model cannot be expressed by a recurrence formula, e.g. when the relationship between the control input and the controlled variable in the controlled object is not linear, the identification algorithm is not applicable. In the case of such a controlled object, it is impossible to compensate for a modeling error, which can be undesirably caused due to variation between individual units of the controlled object and aging of the same, and hence the control accuracy is further degraded.

Further, when the sequential least-squares method is employed, if the relationship between the control input and the controlled variable enters a steady state in which there does not occur almost any change, self-exciting conditions cannot be satisfied, which can prevent proper execution of the identification of the model parameters. To avoid this problem, it is sometimes required to add an excitation input to the control input on purpose. In such a case, due to the excitation input as an extra input to the controlled variable, the stability of control can be degraded.

SUMMARY OF THE INVENTION

The present invention has been made to provide a solution to the above-described problems, and an object thereof is to provide a control apparatus, a control method, and an engine control unit, which are capable of ensuring both high-level stability and accuracy of control, even when controlling a controlled object having extremal characteristics or a controlled object a controlled object model of which cannot be expressed by a recurrence formula.

To attain the above object, in a first aspect of the present invention, there is provided a control apparatus comprising correlation parameter-calculating means for using a controlled object model defining a relationship between a control input and a controlled variable in a controlled object, and thereby calculating a correlation parameter indicative of a correlation between the control input and a controlled variable in the controlled object model, target value-setting means for setting a target value as a target of the controlled variable of the controlled object, control input-calculating means for calculating the control input with a predetermined first control algorithm such that the controlled variable of the controlled object is caused to converge to the target value, and determining at least one of an increasing/decreasing rate and an increasing/decreasing direction of the control input according to the correlation parameter, and model corrector means for correcting the controlled object model such that the controlled variable of the controlled object model matches the controlled variable of the controlled object.

With the configuration of the control apparatus according to the first aspect of the present invention, using the controlled object model defining the control input and the controlled variable in the controlled object, the correlation parameter representative of a correlation between the control input and the controlled variable in the controlled object model is calculated. Then, the control input is calculated with the predetermined first control algorithm such that the controlled variable is caused to converge to the target value, and at the same time, at least one of the increasing/decreasing rate or the increasing/decreasing direction of the control input is determined according to the correlation parameter. First, in the case where the increasing/decreasing rate of the control input is determined according to the correlation parameter, even when the sensitivity, i.e. the correlation of the controlled variable to the control input varies according to the value of the control input, since the increasing/decreasing rate of the control input is determined according to the change in the correlation, it is possible to control the controlled variable such that the controlled variable converges to its target value without causing any oscillating behavior or unstable behavior. That is, it is possible to ensure high-level stability of the control.

Further, in the case where the increasing/decreasing direction of the control input is determined according to the correlation parameter, when controlling, for example, a controlled object the controlled variable of which has a local maximum value which it takes as the control input is varied, insofar as the target value is set to a value not larger than the local maximum value, it is possible to cause the controlled variable to converge to the target value with accuracy. On the other hand, if the target value is set to a value larger than the local maximum value, assuming that as the control input is varied, the controlled variable changes past the local maximum value, the correlation between the control input and the controlled variable once increases and then decreases again, and simultaneously, there occurs a change from one of the positive and negative correlations to the other, so that the correlation parameter represents such a change in the correlation. Therefore, by changing the increasing/decreasing direction of the control input according to the correlation parameter, it is possible to maintain the controlled variable at the local maximum value or in its vicinity.

Oppositely to the above case, when controlling a controlled object the controlled variable of which has a local minimum value which it takes as the control input is varied, insofar as the target value is set to a value not smaller than the local minimum value, it is possible to cause the controlled variable to converge to the target value with accuracy. On the other hand, even when the target value is set to a value smaller than the local minimum value, assuming that as the control input is varied, the controlled variable changes past the local minimum value, the correlation between the control input and the controlled variable once increases and then decreases again, and simultaneously, there occurs a change from one of the positive and negative correlations to the other, so that the correlation parameter represents such a change in the correlation. Therefore, by determining the increasing/decreasing direction of the control input according to the correlation parameter, it is possible to maintain the controlled variable at the local minimum value or in its vicinity, whereby both the control stability and control accuracy can be maintained at a high level. As described above, even when controlling the controlled object having extremal characteristics, by determining the increasing/decreasing direction of the control input according to the correlation parameter, it is possible to provide control such that the controlled variable becomes equal to the target value when the target value is in a range which the controlled variable can attain, whereas when the target value is outside the range which the controlled variable can attain, it is possible to maintain the controlled variable at a value closest to the target value within the attainable range, i.e. a value in the vicinity of the extremum value, whereby both the control stability and the control accuracy can be maintained at a high level. In addition thereto, if both the increasing/decreasing rate and the increasing/decreasing direction are determined according to the correlation parameter, it is possible to obtain all the advantageous effects described above.

Further, the controlled object model is corrected such that the controlled variable of the controlled object model matches the controlled variable of the controlled object, and hence even when the modeling error occurs due to the variation between individual units of the controlled object and the aging of the same, it is possible to quickly accommodate the modeling error, and increase the accuracy of calculation of the correlation parameter. As a result, it is possible to improve the control accuracy. (It should be noted that throughout the specification, "calculation", "determination", "setting", and "correction" as in "calculation of the correlation parameter", "calculation or determination of the control input", "setting of the target value", and the correction of the controlled object model" are not limited to execution of computation, determination, setting, and correction by a program, but include generating electric signals representative of them.)

Preferably, the model corrector means calculates a plurality of correction parameters for use in correction of the controlled object model, in a manner associated with a plurality of regions obtained by dividing a region where the control input is variable respectively, and calculating ones of the correction parameters corresponding to ones of the regions where the calculated control input exists, with a predetermined second control algorithm, such that the controlled variable of the controlled object model matches the controlled variable of the controlled object.

With this configuration of the preferred embodiment, a plurality of correction parameters for use in correcting the controlled object model are calculated in a manner associated with a plurality of regions formed by dividing a region within which the control input is variable, and ones of the correction parameters corresponding to ones of the regions in which the control input exists are calculated with a predetermined second control algorithm such that the controlled variable of the controlled object model matches the controlled variable of the controlled object. Therefore, even when the modeling error is different between the regions, it is possible to correct the controlled object model on a region-by-region basis using such correction parameters respectively associated with the regions. As a result, differently from the prior art, even in the cases where the controlled object model cannot be expressed using a recurrence formula, where the controlled object has characteristics suffering from a local error or aging in a certain one of the regions, or where the controlled object has characteristics which vary among the regions, it is possible to cause the controlled object model to properly match the actual characteristics of the controlled object. As a result, in controlling such a controlled object, when a modeling error occurs due to variation between individual units of the controlled object and aging of same, it is possible to compensate for the modeling error, and improve the robustness of the control apparatus against the modeling error. This makes it possible to further improve the control accuracy. In addition thereto, differently from the conventional cases where the sequential least-squares method is used for the identification algorithm, it is not necessary to add an oscillating input to the control input so as to satisfy self-exciting conditions, which makes it possible to further improve the control stability, more specifically, the degree of convergence (setting properties) of the controlled variable to the target value.

More preferably, the predetermined second control algorithm includes a predetermined response-specifying control algorithm.

With the configuration of this preferred embodiment, the correction parameters are calculated with an algorithm including a predetermined response-specifying control algorithm, such that the controlled variable of the controlled object model matches the controlled variable of the controlled object. Therefore, even in the case of controlling a non-linear controlled object the controlled object model of which cannot be expressed using a recurrence formula, it is possible to calculate the correction parameters as values that do not cause an unstable behavior, such as an oscillating behavior or overshooting, and using the correction parameters thus calculated, it is possible to control the controlled object while correcting the controlled object model. As a result, it is possible to prevent the transient response of the control system from becoming oscillatory or unstable, and improve the control accuracy during a transition period.

More preferably, the model corrector means corrects the controlled object model using values obtained by multiplying values of a plurality of functions by the correction parameters, respectively, adjacent two of the regions overlapping each other, and the functions have respective characteristics such that the functions each take the maximum value in a center or its vicinity of each of the respective associated regions and change linearly or curvilinearly, and each two of the functions corresponding to each two overlapping ones of the regions are set such that the functions intersect with each other in portions where the functions change linearly or curvilinearly.

With the configuration of the preferred embodiment, the controlled object model is corrected using values obtained by multiplying values of the functions by the correction parameters, respectively, and each adjacent two of the regions overlap each other. Further, these functions have characteristics that with respect to the control inputs in the respective regions, they each take the maximum value in the center or its vicinity of each of the associated regions, and change linearly or curvilinearly, and are set such that each two of the functions in the respective overlapping regions intersect with each other, in portions where they change linearly or curvilinearly. Therefore, in correcting the controlled object model, it is possible to correct the same continuously over the regions of the control inputs, so that the corrected controlled object model has no discontinued points. This makes it possible to prevent the transient response of the control system from becoming temporarily unstable due to the discontinued points of the controlled object model, and further improve the control accuracy during the transient time.

More preferably, the model corrector means calculates the correction parameters using an integral value of a value based on a difference between the controlled variable of the controlled object model and the controlled variable of the controlled object, while at the same time subjecting the integral value to a predetermined forgetting process.

With the configuration of the preferred embodiment, the correction parameters are calculated using the integral value of the value based on the difference between the controlled variable of the controlled object model and the controlled variable of the controlled object. Therefore, unless the integral value is subjected to the forgetting process, even when the corrected control object model fully matches the actual characteristics of the controlled object, making the difference equal to 0, and the difference ceases to accurately represent the error information on the model, correction of the controlled object model is continued by the influence of the integral value. As a result, there is a fear of the controlled object model being improperly corrected. In contrast, according to this control apparatus, the integral value is calculated while subjecting the integral values to the predetermined forgetting process. Therefore, it is possible to correct the controlled object model without being influenced by the integral value, such that the controlled object model fully matches the actual characteristics of the controlled object, whereby the accuracy of correction of the controlled object model can be improved. As a result, it is possible to further increase the control accuracy.

Preferably, the controlled object is an internal combustion engine.

With the configuration of the preferred embodiment, even when the controlled variable of the engine takes the extremum value with respect to the control input, insofar as the target value is in a range which can be attained by the controlled variable, it is possible to control the controlled variable of the engine without causing an oscillating behavior or unstable behavior such that it converges to the target value, and even when the controlled variable exceeds the attainable range, it is possible to maintain the controlled variable at the extremum value or in its vicinity, whereby both the control stability and the control accuracy can be secured for the engine.

To attain the above object, in a second aspect of the present invention, there is provided a control apparatus comprising correlation parameter-calculating means for using a controlled object model defining a relationship between a plurality of control inputs and a controlled variable in a controlled object, and thereby calculating a plurality of correlation parameters respectively indicative of correlations between the control inputs and a controlled variable in the controlled object model, target value-setting means for setting a target value as a target of the controlled variable of the controlled object, control input-calculating means for calculating each of the control inputs with a predetermined first control algorithm such that the controlled variable of the controlled object is caused to converge to the target value, and determining at least one of an increasing/decreasing rate and an increasing/decreasing direction of each control input according to each of the correlation parameters, and model corrector means for correcting the controlled object model such that the controlled variable of the controlled object model matches the controlled variable of the controlled object.

With the configuration of the control apparatus according to the second aspect of the present invention, using the controlled object model defining the control inputs and the controlled variable in the controlled object, the correlation parameters representative of correlations between the control inputs and the controlled variable in the controlled object model are calculated. The control inputs are each calculated with the predetermined first control algorithm such that the controlled variable is caused to converge to the target value, and at the same time, at least one of the increasing/decreasing rate or the increasing/decreasing direction of each control input is determined according to each of the correlation parameters. First, when the control input is determined according to each correlation parameter, e.g. if the increasing/decreasing rate of one of the control inputs with a higher correlation is set to be larger, and the increasing/decreasing rate of the other of the control inputs with a lower correlation is set to be smaller, it is possible to cause the controlled variable to converge to the target value while suppressing interaction between the control inputs and causing them to cooperate.

Further, in the case where the increasing/decreasing direction of each control input is determined according to each correlation parameter, as described hereinafter, even when controlling the controlled object the controlled variable of which has an extremum value (local maximum value or local minimum value) which it takes as any of the controlled inputs is varied, it is possible to maintain both the control stability and the control accuracy at a high level. Hereafter, the control input responsive to variation of which the controlled variable takes the extremum value (local maximum value or local minimum value) is referred to as "extremizing control input"). When controlling a controlled object the controlled variable of which has a local maximum value which it takes as the extremizing control input is varied, insofar as the target value is set to a value not larger than the local maximum value, it is possible to cause the controlled variable to converge to the target value with accuracy. On the other hand, if the target value is set to a value larger than the local maximum value, assuming that as the extremizing control input is varied, the controlled variable changes past the local maximum value, the correlation between the control input and the controlled variable once increases and then decreases again, and simultaneously, there occurs a change from one of the positive and negative correlations to the other, so that the correlation parameter associated with the extremizing control input represents such a change in the correlation. Therefore, by changing the increasing/decreasing direction of the extremizing control input according to the correlation parameter associated with the extremizing control input, it is possible to maintain the controlled variable at the local maximum value or in its vicinity, whereby both the control stability and control accuracy can be maintained at a high level.

Further, oppositely to the above, when controlling a controlled variable the controlled variable of which has a local minimum value which it takes as the extremizing control input is varied, insofar as the target value is set to a value not smaller than the local minimum value, it is possible to cause the controlled variable to converge to the target value with accuracy. On the other hand, even when the target value is set to a value smaller than the local minimum value, assuming that in response a change in the extremizing control input, the controlled variable changes past the local minimum value, the correlation between the extremizing control input and the controlled variable once increases and then decreases again, and simultaneously, there occurs a change from one of the positive and negative correlations to the other, so that the correlation parameter associated with the extremizing control input represents such a change in the correlation. Therefore, by determining the increasing/decreasing direction of the extremizing control input according to the correlation parameter associated with the extremizing control input, it is possible to maintain the controlled variable at the local minimum value or in its vicinity, whereby both the control stability and control accuracy can be maintained at a high level. As described above, even when controlling the controlled object the controlled variable of which has a local maximum value or a local minimum value with it can take as the control input is varied, it is possible to maintain the control stability and the control accuracy at a high level. In addition thereto, if both the increasing/decreasing rate and the increasing/decreasing direction of each extremizing control input are determined according to each associated correlation parameter, it is possible to obtain all the advantageous effects described above.

Further, the controlled object model is corrected such that the controlled variable of the controlled object model matches the controlled variable of the controlled object, and hence even when the modeling error occurs due to the variation between individual units of the controlled object and the aging of the same, it is possible to quickly accommodate the modeling error. As a result, it is possible to increase the control accuracy.

Preferably, the model corrector means calculates a plurality of correction parameters for use in correction of the controlled object model, in a manner associated with a plurality of regions obtained by dividing a region where the control inputs are variable respectively, and calculating ones of the correction parameters corresponding to ones of the regions where the calculated control inputs exist, with a predetermined second control algorithm, such that the controlled variable of the controlled object model matches the controlled variable of the controlled object.

With this configuration of the preferred embodiment, a plurality of correction parameters for use in correcting the controlled object model are calculated in a manner associated with a plurality of regions formed by dividing a region within which the control inputs are variable, and ones of the correction parameters corresponding to ones of the regions in which the control inputs exist are calculated with a predetermined second control algorithm such that the controlled variable of the controlled object model matches the controlled variable of the controlled object. Therefore, even when the modeling error is different between the regions, it is possible to correct the controlled object model on a region-by-region basis using such correction parameters respectively associated with the regions. As a result, differently from the prior art, even in the cases where the controlled object model cannot be expressed using a recurrence formula, where the controlled object has characteristics suffering from a local error or aging in a certain one of the regions, or where the controlled object has characteristics which vary among the regions, it is possible to cause the controlled object model to properly match the actual characteristics of the controlled object. As a result, in controlling such a controlled object, when a modeling error occurs due to variation between individual units of the controlled object or aging of same, it is possible to compensate for the modeling error, and improve the robustness of the control apparatus against the modeling error. As a result, it is possible to further improve the control accuracy. In addition thereto, differently from the conventional cases where the sequential least-squares method is used for the identification algorithm, it is not necessary to add an oscillating input to the control input so as to satisfy self-exciting conditions, which makes it possible to further improve the control stability, more specifically, the degree of convergence (setting properties) of the controlled variable to the target value.

More preferably, the predetermined second control algorithm includes a predetermined response-specifying control algorithm.

With the configuration of this preferred embodiment, the correction parameters are calculated with an algorithm including a predetermined response-specifying control algorithm, such that the controlled variable of the controlled object model matches the controlled variable of the controlled object. Therefore, even in the case of controlling a non-linear controlled object the controlled object model of which cannot be expressed using a recurrence formula, it is possible to calculate the correction parameters as values that do not cause an unstable behavior, such as an oscillating behavior or overshooting, and using the correction parameters thus calculated, it is possible to control the controlled object while correcting the controlled object model. As a result, it is possible to prevent the transient response of the control system from becoming oscillatory or unstable, and improve the control accuracy during a transition period.

More preferably, the model corrector means corrects the controlled object model using values obtained by multiplying values of a plurality of functions by the correction parameters, respectively, adjacent two of the regions overlapping each other, and the functions have respective characteristics such that with respect to the control inputs in the regions, the functions each take the maximum value in a center or its vicinity of each of the respective associated regions and change in a planar fashion or in a curviplanar fashion, and each two of the functions corresponding to each two overlapping ones of the regions are set such that the functions intersect with each other in portions where the functions change in a planar fashion or in a curviplanar fashion.

With the configuration of the preferred embodiment, the controlled object model is corrected using values obtained by multiplying values of the functions by the correction parameters, respectively, and each adjacent two of the regions overlap each other. These functions have characteristics that with respect to the control inputs in the respective regions, they each take the maximum value in the center or its vicinity of each of the associated regions, and change in a planar fashion or in a curviplanar fashion, and are set such that each two of the functions in the respective overlapping regions intersect with each other, in portions where they change in a planar fashion or in a curviplanar fashion. Therefore, in correcting the controlled object model, it is possible to correct the same continuously over the regions of the control inputs, so that the corrected controlled object model has no discontinued points. This makes it possible to prevent the transient response of the control system from becoming temporarily unstable due to the discontinued points of the controlled object model, and further improve the control accuracy during the transient time.

More preferably, the model corrector means calculates the correction parameters using an integral value of a value based on a difference between the controlled variable of the controlled object model and the controlled variable of the controlled object, while at the same time subjecting the integral value to a predetermined forgetting process.

With the configuration of the preferred embodiment, the correction parameters are calculated with the integral value of the value based on the difference between the controlled variable of the controlled object model and the controlled variable of the controlled object. Therefore, unless the integral value is subjected to the forgetting process, even when the corrected control object model fully matches the actual characteristics of the controlled object, making make the difference equal to 0, and the difference ceases to accurately represent the error information on the model, correction of the controlled object model is continued by the influence of the integral values. As a result, there is a fear of the controlled object model being improperly corrected. In contrast, according to this control apparatus, the integral value is calculated while subjecting the integral value to the predetermined forgetting process. Therefore, it is possible to correct the controlled object model without being influenced by the integral value, such that the controlled object model fully matches the actual characteristics of the controlled object, whereby the accuracy of correction of the controlled object model can be improved. As a result, it is possible to further increase the control accuracy.

Preferably, the controlled object is an internal combustion engine.

With the configuration of the preferred embodiment, even when the controlled variable of the engine takes the extremum value with respect to at least one of the control inputs, insofar as the target value is in a range which can be attained by the controlled variable, it is possible to control the controlled variable of the engine without causing an oscillating behavior or unstable behavior such that it converges to the target value, and even when the controlled variable exceeds the attainable range, it is possible to maintain the controlled variable at the extremum value or in its vicinity, whereby both the control stability and the control accuracy can be secured for the engine. Further, it is possible to cause the controlled variable to accurately converge to the target value while suppressing interaction between the control inputs and causing the control inputs to cooperate with each other. This makes it unnecessary to carry out preparation of a control program using a large number of setting conditions or setting of data, and hence reduce time taken to develop an engine. In addition, for the same reason, it is possible to avoid a bug or a configuration error caused by an increase in the volume of the control program and data to be set, to thereby improve the accuracy of preparation of the control program and reduce time taken to prepare the control program.

To attain the above object, in a third aspect of the present invention, there is provided a control method comprising a correlation parameter-calculating step of using a controlled object model defining a relationship between a control input and a controlled variable in a controlled object, and thereby calculating a correlation parameter indicative of a correlation between the control input and a controlled variable in the controlled object model, a target value-setting step of setting a target value as a target of the controlled variable of the controlled object, a control input-calculating step of calculating the control input with a predetermined first control algorithm such that the controlled variable of the controlled object is caused to converge to the target value, and determining at least one of an increasing/decreasing rate and an increasing/decreasing direction of the control input according to the correlation parameter, and a model correction step of correcting the controlled object model such that the controlled variable of the controlled object model matches the controlled variable of the controlled object.

With the configuration of the third aspect of the present invention, it is possible to obtain the same advantageous effects as provided by the first aspect of the present invention.

Preferably, the model correction step includes calculating a plurality of correction parameters for use in correction of the controlled object model, in a manner associated with a plurality of regions obtained by dividing a region where the control input is variable respectively, and calculating ones of the correction parameters corresponding to ones of the regions where the calculated control input exists, with a predetermined second control algorithm, such that the controlled variable of the controlled object model matches the controlled variable of the controlled object.

More preferably, the predetermined second control algorithm includes a predetermined response-specifying control algorithm.

More preferably, the model correction step includes correcting the controlled object model using values obtained by multiplying values of a plurality of functions by the correction parameters, respectively, adjacent two of the regions overlapping each other, and the functions have respective characteristics such that the functions each take the maximum value in a center or its vicinity of each of the respective associated regions and change linearly or curvilinearly, and each two of the functions corresponding to each two overlapping ones of the regions are set such that the functions intersect with each other in portions where the functions change linearly or curvilinearly.

More preferably, the model correction step includes calculating the correction parameters using an integral value of a value based on a difference between the controlled variable of the controlled object model and the controlled variable of the controlled object, while at the same time subjecting the integral value to a predetermined forgetting process.

Preferably, the controlled object is an internal combustion engine.

With the configurations of these preferred embodiments, it is possible to obtain the same advantageous effects as provided by the corresponding preferred embodiments of the first aspect of the present invention.

To attain the above object, in a fourth aspect of the present invention, there is provided a control method comprising a correlation parameter-calculating step of using a controlled object model defining a relationship between a plurality of control inputs and a controlled variable in a controlled object, and thereby calculating a plurality of correlation parameters respectively indicative of correlations between the control inputs and a controlled variable in the controlled object model, a target value-setting step of setting a target value as a target of the controlled variable of the controlled object, a control input-calculating step of calculating each of the control inputs with a predetermined first control algorithm such that the controlled variable of the controlled object is caused to converge to the target value, and determining at least one of an increasing/decreasing rate and an increasing/decreasing direction of each control input according to each of the correlation parameters, and a model correction step of correcting the controlled object model such that the controlled variable of the controlled object model matches the controlled variable of the controlled object.

With the configuration of the fourth aspect of the present invention, it is possible to obtain the same advantageous effects as provided by the second aspect of the present invention.

Preferably, the model correction step includes calculating a plurality of correction parameters for use in correction of the controlled object model, in a manner associated with a plurality of regions obtained by dividing a region where the control inputs are variable respectively, and calculating ones of the correction parameters corresponding to ones of the regions where the calculated control inputs exist, with a predetermined second control algorithm, such that the controlled variable of the controlled object model matches the controlled variable of the controlled object.

More preferably, the predetermined second control algorithm includes a predetermined response-specifying control algorithm.

More preferably, the model correction step includes correcting the controlled object model using values obtained by multiplying values of a plurality of functions by the correction parameters, respectively, adjacent two of the regions overlapping each other, and the functions have respective characteristics such that with respect to the control inputs in the regions, the functions each take the maximum value in a center or its vicinity of each of the respective associated regions and change in a planar fashion or in a curviplanar fashion, and each two of the functions corresponding to each two overlapping ones of the regions are set such that the functions intersect with each other in portions where the functions change in a planar fashion or in a curviplanar fashion.

More preferably, the model correction step includes calculating the correction parameters using an integral value of a value based on a difference between the controlled variable of the controlled object model and the controlled variable of the controlled object, while at the same time subjecting the integral value to a predetermined forgetting process.

Preferably, the controlled object is an internal combustion engine.

With the configurations of these preferred embodiments, it is possible to obtain the same advantageous effects as provided by the corresponding preferred embodiments of the second aspect of the present invention.

To attain the above object, in a fifth aspect of the present invention, there is provided an engine control unit including a control program for causing a computer to use a controlled object model defining a relationship between a control input and a controlled variable in a controlled object, and thereby calculate a correlation parameter indicative of a correlation between the control input and a controlled variable in the controlled object model; set a target value as a target of the controlled variable of the controlled object; calculate the control input with a predetermined first control algorithm such that the controlled variable of the controlled object is caused to converge to the target value, and determine at least one of an increasing/decreasing rate and an increasing/decreasing direction of the control input according to the correlation parameter; and correct the controlled object model such that the controlled variable of the controlled object model matches the controlled variable of the controlled object.

With the configuration of the fifth aspect of the present invention, it is possible to obtain the same advantageous effects as provided by the first aspect of the present invention.

Preferably, when causing the computer to calculate the controlled object model, the control program causes the computer to calculate a plurality of correction parameters for use in correction of the controlled object model, in a manner associated with a plurality of regions obtained by dividing a region where the control input is variable respectively, and calculate ones of the correction parameters corresponding to ones of the regions where the calculated control input exists, with a predetermined second control algorithm, such that the controlled variable of the controlled object model matches the controlled variable of the controlled object.

More preferably, the predetermined second control algorithm includes a predetermined response-specifying control algorithm.

More preferably, the control program causes the computer to correct the controlled object model using values obtained by multiplying values of a plurality of functions by the correction parameters, respectively, adjacent two of the regions overlapping each other, and the functions have respective characteristics such that the functions each take the maximum value in a center or its vicinity of each of the respective associated regions and change linearly or curvilinearly, and each two of the functions corresponding to each two overlapping ones of the regions are set such that the functions intersect with each other in portions where the functions change linearly or curvilinearly.

More preferably, when causing the computer to calculate the controlled object model, the control program causes the computer to calculate the correction parameters using an integral value of a value based on a difference between the controlled variable of the controlled object model and the controlled variable of the controlled object, while at the same time subjecting the integral value to a predetermined forgetting process.

Preferably, the controlled object is an internal combustion engine.

With the configurations of these preferred embodiments, it is possible to obtain the same advantageous effects as provided by the corresponding preferred embodiments of the first aspect of the present invention.

To attain the above object, in a sixth aspect of the present invention, there is provided an engine control unit including a control program for causing a computer to use a controlled object model defining a relationship between a plurality of control inputs and a controlled variable in a controlled object, and thereby calculate a plurality of correlation parameters respectively indicative of correlations between the control inputs and a controlled variable in the controlled object model; set a target value as a target of the controlled variable of the controlled object; calculate each of the control inputs with a predetermined first control algorithm such that the controlled variable of the controlled object is caused to converge to the target value, and determine at least one of an increasing/decreasing rate and an increasing/decreasing direction of each control input according to each of the correlation parameters; and correct the controlled object model such that the controlled variable of the controlled object model matches the controlled variable of the controlled object.

With the configuration of the sixth aspect of the present invention, it is possible to obtain the same advantageous effects as provided by the second aspect of the present invention.

Preferably, the control program causes the computer to calculate a plurality of correction parameters for use in correction of the controlled object model, in a manner associated with a plurality of regions obtained by dividing a region where the control inputs are variable respectively, and calculate ones of the correction parameters corresponding to ones of the regions where the calculated control inputs exist, with a predetermined second control algorithm, such that the controlled variable of the controlled object model matches the controlled variable of the controlled object.

More preferably, the predetermined second control algorithm includes a predetermined response-specifying control algorithm.

More preferably, the control program causes the computer to correct the controlled object model using values obtained by multiplying values of a plurality of functions by the correction parameters, respectively, adjacent two of the regions overlapping each other, and the functions have respective characteristics such that with respect to the control inputs in the regions, the functions each take the maximum value in a center or its vicinity of each of the respective associated regions and change in a planar fashion or in a curviplanar fashion, and each two of the functions corresponding to each two overlapping ones of the regions are set such that the functions intersect with each other in portions where the functions change in a planar fashion or in a curviplanar fashion.

More preferably, when causing the computer to calculate the controlled object model, the control program causes the computer to calculate the correction parameters using an integral value of a value based on a difference between the controlled variable of the controlled object model and the controlled variable of the controlled object, while at the same time subjecting the integral value to a predetermined forgetting process.

Preferably, the controlled object is an internal combustion engine.

With the configurations of these preferred embodiments, it is possible to obtain the same advantageous effects as provided by the corresponding preferred embodiments of the second aspect of the present invention.

The above and other objects, features, and advantages of the present invention will become more apparent from the following detailed description taken in conjunction with the accompanying drawings.

BRIEF DESCRIPTION OF THE DRAWINGS

FIG. 3 is a diagram of valve lift curves of an intake valve, which is useful in explaining a valve-opening operation performed by a variable intake valve-actuating mechanism for opening the intake valve;

FIG. 4 is a diagram of valve lift curves of an exhaust valve, which is useful in explaining a valve-opening operation performed by a variable exhaust valve-actuating mechanism for opening the exhaust valve;

FIG. 16 is a diagram of a controlled object model used in the calculation of a basic imaginary controlled variable Ym_nm;

FIG. 17 is a diagram showing an example of a map used by a imaginary controlled variable-calculating section for calculation of the nonlinear weight functions Wij;

DETAILED DESCRIPTION OF PREFERRED EMBODIMENTS

Hereafter, a control apparatus according to a first embodiment of the present invention will be described with reference to the drawings. The control apparatus 1 in the present embodiment controls an internal combustion engine (hereinafter simply referred to as "the engine") 3 shown in FIG. 1, and includes an ECU 2 as shown in FIG. 2. As described hereinafter, the ECU 2 carries out various control processes for controlling an indicated mean effective pressure Pmi (i.e. generated torque) and so forth, depending on operating conditions of the engine 3.

Figure 1:
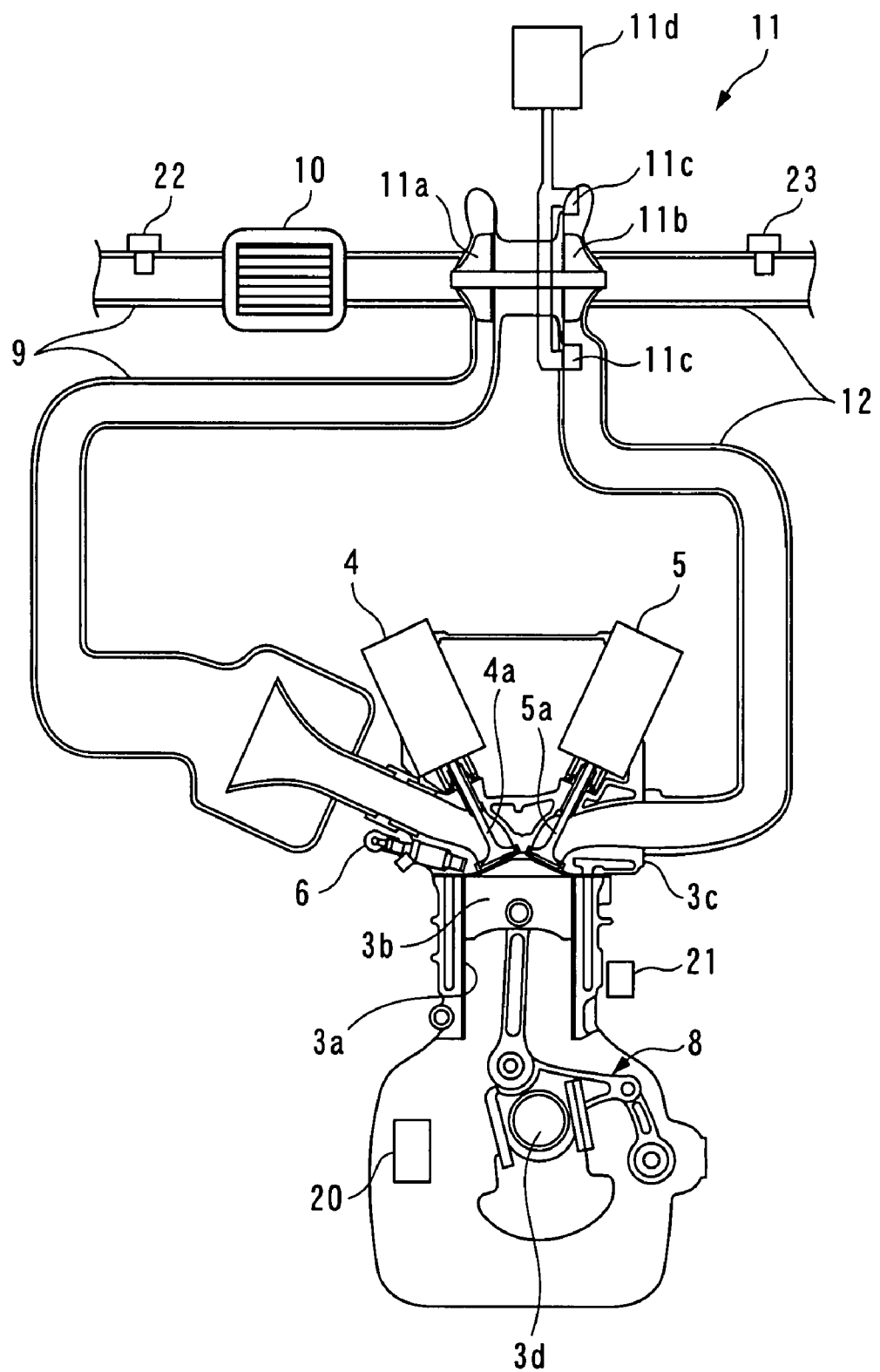
FIG. 1 is a schematic diagram of an internal combustion engine to which is applied a control apparatus according to a first embodiment of the present invention.
Figure 2:
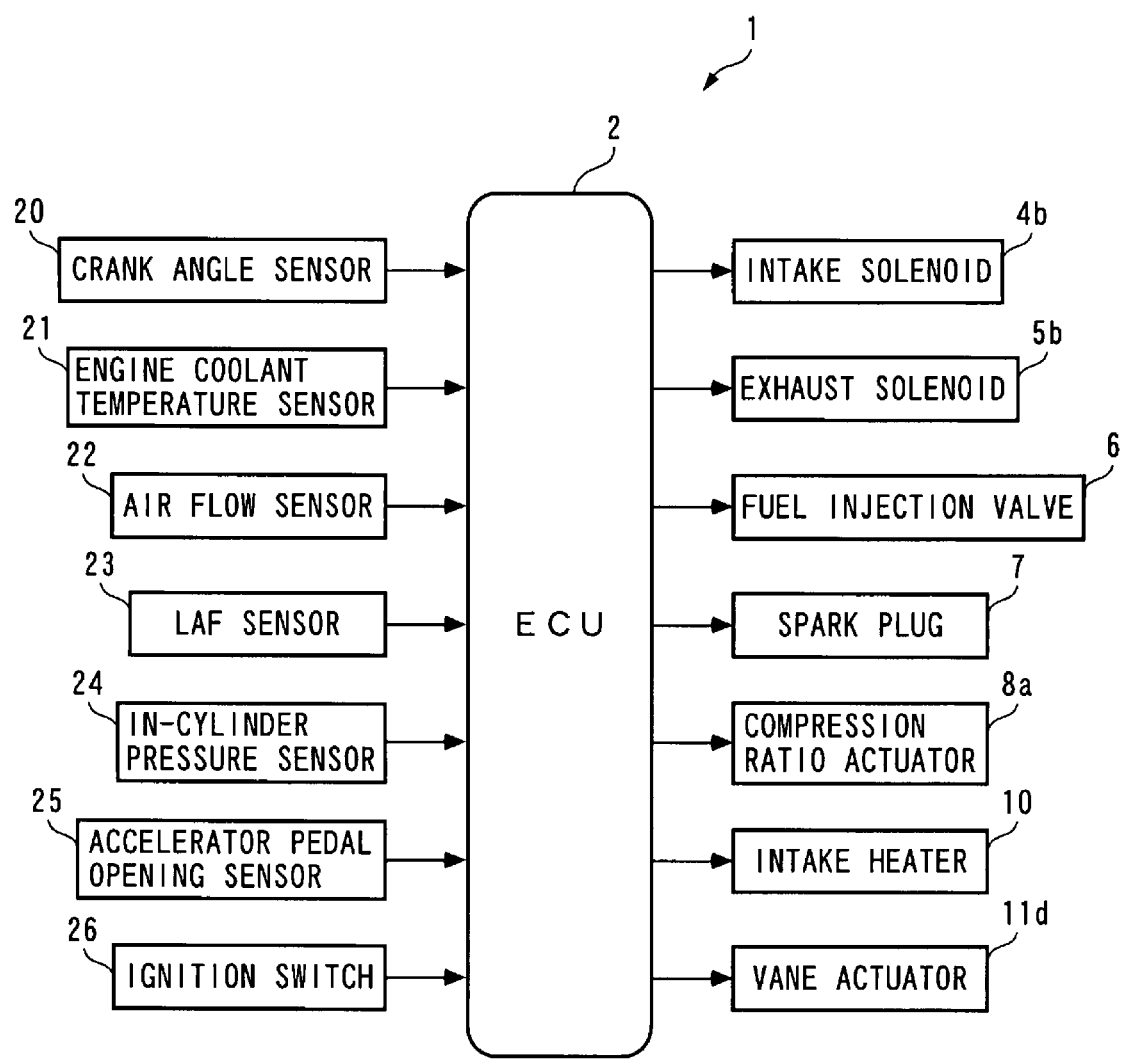
FIG. 2 is a schematic diagram of the control apparatus according to the first embodiment.

Referring to FIG. 1, the engine 3 is an in-line four-cylinder gasoline engine that includes a four pairs of cylinders 3a and pistons 3b (only one pair of which is shown), and is installed on a vehicle, not shown. The engine 3 is capable of performing HCCI (Homogeneous Charge Compression Ignition) operation, that is, premixed compression ignition combustion (hereinafter simply referred to as "compression ignition combustion") operation. More specifically, within a predetermined compression ignition operating region, the engine 3 is operated in compression ignition combustion, whereas in a spark ignition operating region other than the compression ignition region, the engine 3 is operated in spark ignition combustion.

The engine 3 includes, on a cylinder-by-cylinder basis, a variable intake valve-actuating mechanism 4, a variable exhaust valve-actuating mechanism 5, a fuel injection valve 6 (FIG. 2 shows only one), and a spark plug 7 (FIG. 2 shows only one). The variable intake valve-actuating mechanism 4 is of an electromagnetic type that actuates an intake valve 4a by an electromagnetic force to open and close the same, and is comprised of a coil spring for urging the intake valve 4a in the valve-closing direction, an intake solenoid 4b (FIG. 2 shows only one) electrically connected to the ECU 2.

In the variable intake valve-actuating mechanism 4, when the intake solenoid 4b is in a deenergized state, the intake valve 4a is held in the valve-closing position by the urging force of the coil spring. Further, when the intake solenoid 4b is energized by the ECU 2, the intake valve 4a is actuated by the electromagnetic force of the intake solenoid 4b in the valve-opening direction against the urging force of the coil spring, and is held in an open state, whereas when the intake solenoid 4b is deenergized, the intake valve 4a is returned to a closed state by the urging force of the coil spring.

With the above configuration, as shown in FIG. 3, the intake valve 4a has the valve-opening timing and valve-closing timing thereof freely changed by the variable intake valve-actuating mechanism 4, and has a valve lift curve having a substantially trapezoid-like shape. In the present embodiment, the ECU 2 holds constant the valve-opening timing of the intake valve 4a, and controls the valve-closing timing of the same between late closing timing indicated by a solid line in FIG. 3, and early closing timing indicated by a two-dot chain line in FIG. 3. It should be noted that in the following description, during the valve open time period of the intake valve 4a, a duration over which a crankshaft of the engine 3 rotates through crank angles capable of holding the intake valve 4a at its maximum lift is referred to as "the intake opening angle θlin" (see FIG. 3).

The intake opening angle θlin can be changed from 0 to an arbitrary crank angle value by the variable intake valve-actuating mechanism 4 as desired. In the present embodiment, however, with a view to securing excellent combustion state and reduced exhaust emissions, it is changed within a range of the minimum value θlin_min in the early closing timing to the maximum value θlin_max in the late closing timing, as desired.

Similarly to the variable intake valve-actuating mechanism 4, the variable exhaust valve-actuating mechanism 5 is of an electromagnetic type that actuates an exhaust valve 5a by an electromagnetic force to open and close the same, and includes a coil spring for urging the exhaust valve 5a in the valve-closing direction, an exhaust solenoid 5b (FIG. 2 shows only one) electrically connected to the ECU 2, and so forth.

In the variable exhaust valve-actuating mechanism 5, when the exhaust solenoid 5b is in a deenergized state, the exhaust valve 5a is held in the valve-closing position by the urging force of the coil spring. Further, when the exhaust solenoid 5b is energized by the ECU 2, the exhaust valve 5a is actuated by the electromagnetic force of the exhaust solenoid 5b in the valve-opening direction against the urging force of the coil spring, and is held in an open state, whereas when the exhaust solenoid 5b is deenergized, the exhaust valve 5a is returned to a closed state by the urging force of the coil spring.

With the above configuration, as shown in FIG. 4, the exhaust valve 5a has the valve-opening timing and valve-closing timing thereof freely changed by the variable exhaust valve-actuating mechanism 5, and has a valve lift curve having a substantially trapezoid-like shape. In the present embodiment, as shown in FIG. 4, the ECU 2 controls the exhaust valve 5a such that the exhaust valve 5a is opened during the normal exhaust stroke in one combustion cycle, and is reopened during the suction stroke as well.

In this case, the valve timing of the exhaust valve 5a is held constant during the exhaust stroke. On the other hand, in the valve-reopening operation during the intake stroke, the exhaust valve 5a has its valve-opening timing held constant, and its valve-closing timing controlled between late closing timing indicated by a solid line in FIG. 4, and early closing timing indicated by a two-dot chain line in FIG. 4. The valve-reopening operation of the exhaust valve 5a is carried out so as to draw in exhaust gases emitted from an adjacent cylinder 3a into the cylinder 3a to thereby raise the temperature of a mixture within the combustion chamber high enough for performing compression ignition combustion. It should be noted that in the following description, during valve-reopening operation of the exhaust valve 5a, a duration over which the crankshaft of the engine 3 rotates through crank angles capable of holding the exhaust valve 5a at its maximum lift is referred to as "the exhaust reopening angle θrbl" (see FIG. 4). The exhaust reopening angle θrbl is changed by the variable exhaust valve-actuating mechanism 5 as described above within a range of the minimum value in the early closing timing to the maximum value in the late closing timing, as desired.

The fuel injection valve 6 is mounted through an associated one of cylinder heads 3c so as to inject fuel directly into the associated cylinder 3a. In short, the engine 3 is configured as a direct injection engine. Further, the fuel injection valve 6 is electrically connected to the ECU 2, and has its valve open time period and valve-opening timing controlled by the ECU 2. That is, the ECU 2 performs fuel injection control of the fuel injection valve 3.

Further, the spark plug 7 as well is electrically connected to the ECU 2, and when the engine 3 is in the above-described spark ignition operating region, the spark plug 7 has its discharge state controlled by the ECU 2, for burning a mixture within the associated combustion chamber in ignition timing. That is, the ECU 2 performs ignition timing control of the spark plug 7.

Furthermore, the engine 3 is provided with a variable compression ratio mechanism 8, a crank angle sensor 20, and an engine coolant temperature sensor 21. The variable compression ratio mechanism 8 is configured similarly to one proposed by the present assignee in Japanese Laid-Open Patent Publication (Kokai) No. 2005-273634, which is incorporated herein by reference, and hence detailed description thereof is omitted, but it changes the top dead center position of the piston 3b, that is, the stroke of the piston 3b, to thereby continuously change a compression ratio Cr within a predetermined range. The variable compression ratio mechanism 8 includes a compression ratio actuator 8a electrically connected to the ECU 2 (see FIG. 2). The ECU 2 drives the variable compression ratio mechanism 8 via the compression ratio actuator 8a to thereby control the compression ratio Cr such that the compression ratio Cr becomes equal to a target compression ratio Cr_cmd.

The crank angle sensor 20 is formed by a combination of a magnet rotor and an MRE pickup, and delivers a CRK signal and a TDC signal, which are both pulse signals, to the ECU 2 in accordance with rotation of the crankshaft 3d.

Each pulse of the CRK signal is generated whenever the crankshaft rotates through 1°. The ECU 2 determines a rotational speed (hereinafter referred to as "the engine speed") NE of the engine 3, based on the CRK signal. The TDC signal indicates that the piston 3b has come to a predetermined crank angle position immediately before the TDC position at the start of the intake stroke, on a cylinder-by-cylinder basis, and in the four-cylinder engine 3 according to the present embodiment, each pulse of the TDC signal is generated whenever the crankshaft rotates through 180°.

The engine coolant temperature sensor 21 senses an engine coolant temperature TW which is the temperature of an engine coolant circulating through a cylinder block of the engine 3, and delivers a signal indicative of the sensed engine coolant temperature TW to the ECU 2.

In an intake passage 9 of the engine 3, there are arranged an air flow sensor 22, an intake heater 10, and a turbocharger 11 from upstream to downstream in the mentioned order at respective locations of the intake passage 9. The air flow sensor 22 is implemented by a hot-wire air flow meter, and detects a flow rate of air flowing through the intake passage 9 to deliver a signal indicative of the sensed air flow rate to the ECU 2. The ECU 2 calculates the amount of air drawn into the cylinder 3a based on the signal from the air flow sensor 22.

The intake heater 10 is electrically connected to the ECU 2, and when turned on by the ECU 2, heats air flowing through the intake passage 9 to raise the temperature thereof.

Further, the turbocharger 11 is comprised of a compressor blade 11a disposed at a location downstream of the air flow sensor 22 in the intake passage 9, a turbine blade 11b disposed in an intermediate portion of an exhaust passage 12, for rotating in unison with the compressor blade 11a, a plurality of variable vanes 11c (only two of which are shown), and a vane actuator 11d for actuating the variable vanes 11c.

In the turbocharger 11, when the turbine blade 11b is driven for rotation by exhaust gases flowing through the exhaust passage 12, the compressor blade 11a integrally formed with the turbine blade 11b is also rotated, whereby air within the intake passage 9 is pressurized. In short, supercharging is carried out.

Further, the variable vanes 11c change boost pressure generated by the turbocharger 11, and are pivotally mounted on a wall of a turbine blade-accommodating portion of a housing. The ECU 2 changes the degree of opening of the variable vanes 11c via the vane actuator 11d to change the amount of gases blown to the turbine blade 11b, whereby the rotational speed of the turbine blade 11b, that is, the rotational speed of the compressor blade 11a is changed to control the boost pressure Pc such that it becomes equal to a target boost pressure Pc_cmd.

A LAF sensor 23 is disposed at a location downstream of the turbine blade 11b in the exhaust passage 12 of the engine 3. The LAF sensor 23 is comprised of a zirconia layer and platinum electrodes, and linearly detects the concentration of oxygen in exhaust gases flowing through the exhaust passage 12, in a broad air-fuel ratio range from a rich region richer than a stoichiometric air-fuel ratio to a very lean region, and delivers a signal indicative of the sensed oxygen concentration to the ECU 2. The ECU 2 calculates a detected air-fuel ratio AF indicative of the air-fuel ratio in exhaust gases, based on the value of the signal from the LAF sensor 23, and controls the detected air-fuel ratio AF such that it becomes equal to a target air-fuel ratio AF_cmd.

Further, as shown in FIG. 2, to the ECU 2 are connected in-cylinder pressure sensors 24, an accelerator pedal opening sensor 25, and an ignition switch (hereinafter referred to as "the IG·SW") 26. The in-cylinder pressure sensors 24 are of a piezoelectric element type integrally formed with an associated one of the spark plugs 7, and are provided on a cylinder-by-cylinder basis (only one of which is shown). The in-cylinder pressure sensor 24 is bent with a change in pressure in each cylinder 3a, i.e., in-cylinder pressure Pcyl, thereby detecting the in-cylinder pressure Pcyl to deliver a signal indicative of the sensed in-cylinder pressure Pcyl to the ECU 2. The ECU 2 calculates the indicated mean effective pressure Pmi (i.e. generated torque) based on the signal from the in-cylinder pressure sensor 24.

The accelerator pedal opening sensor 25 detects a stepped-on amount AP of an accelerator pedal, not shown, of the vehicle (hereinafter referred to as "the accelerator pedal opening AP") and delivers a signal indicative of the sensed accelerator pedal opening AP to the ECU 2. Further, the IG·SW 28 is turned on or off by operation of an ignition key, not shown, and delivers a signal indicative of the ON/OFF state thereof to the ECU 2.

The ECU 2 is implemented by a microcomputer comprised of a CPU, a RAM, a ROM, and an I/O interface (none of which are specifically shown). The ECU 2 determines operating conditions of the engine 3, based on the signals from the aforementioned sensors 20 to 25 and the ON/OFF signal from the IG·SW 26, and executes the control processes. More specifically, the ECU 2 controls the indicated mean effective pressure Pmi and so forth according to the operating conditions of the engine 3, as described hereinafter.

It should be noted that in the present embodiment, the CPU 2 corresponds to correlation parameter-calculating means, target value-setting means, control input-calculating means, and model corrector means. Further, the data calculated in the following description are assumed to be stored in the RAM of the ECU 2.

Figure 5:
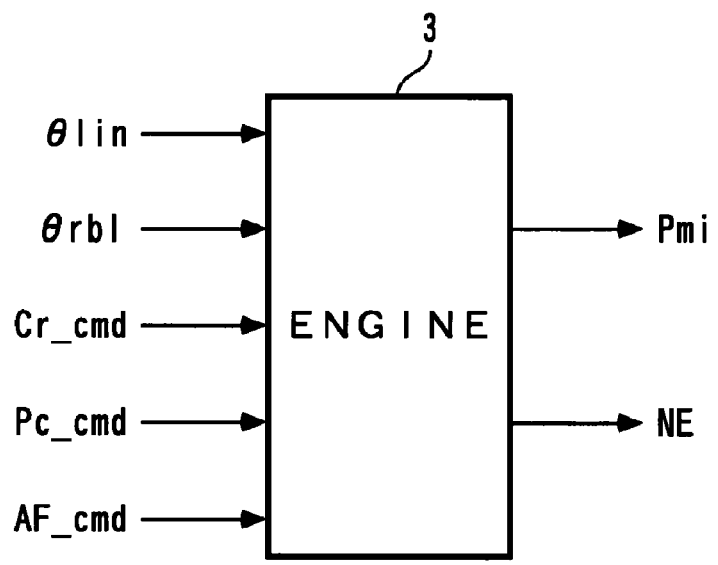
FIG. 5 is a diagram of control inputs and controlled variables input to and output from the engine regarded as a controlled object of a multi-input multi-output system.

Next, a description will be given of the control apparatus 1 according to the present embodiment. As described hereinafter, the control apparatus 1 controls the indicated mean effective pressure Pmi using the intake opening angle θlin and the exhaust reopening angle θrbl by regarding the engine 3 as a controlled object to which the intake opening angle θlin and the exhaust reopening angle θrbl are input as control inputs and from which the indicated mean effective pressure Pmi is output as a controlled variable, for the following reason:

First, when the engine 3 in the present embodiment is studied, as shown in FIG. 5, as a controlled object, the engine 3 is configured such that the two parameters Pmi and NE vary with changes in the five parameters θlin, θrbl, Cr_cmd, Pc_cmd, and AF_cmd, and therefore the engine 3 can be regarded as a so-called multi-input multi-output system that controls two controlled variables by five control inputs. Further, in the case of the engine 3 in the present embodiment, the intake heater 10 is controlled such that the amount of heat generated thereby is constant, due to low responsiveness in a transient state thereof, and hence in the control system shown in FIG. 5, the operating condition of the intake heater 10 is not taken into account.

Now, when attention is paid to the indicated mean effective pressure Pmi as the controlled variable, in the engine 3 operated in the compression ignition combustion as in the present embodiment, control of the temperature of a mixture within the combustion chamber is the most important factor of the compression ignition combustion, and hence the intake opening angle θlin and the exhaust reopening angle θrbl are the most important control inputs that have the most significant influence on the control of the engine 3. For the above reason, in the control apparatus 1, the engine 3 is modeled as a response surface model shown in FIG. 6 and is used as a controlled object model, by assuming that the engine speed NE, the boost pressure Pc, and the detected air-fuel ratio AF are constant, and regarding the engine 3 as a controlled object to which the intake opening angle θlin and the exhaust reopening angle θrbl are input as control inputs and from which the indicated mean effective pressure Pmi is output as the controlled variable.

Figure 6:
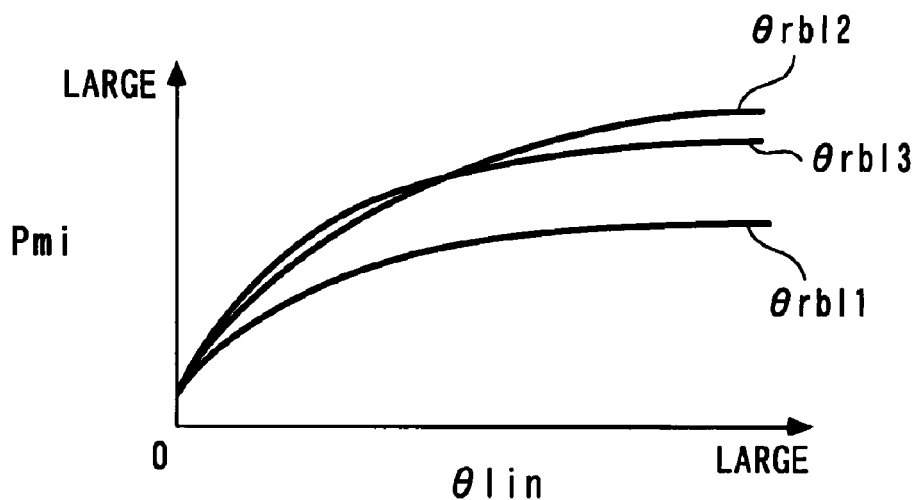
FIG. 6 is a diagram of a controlled object model formed by regarding the engine as a controlled object from which an indicated mean effective pressure Pmi is output as a controlled variable, and to which an intake opening angle $\theta lin$ and an exhaust reopening angle $\theta rbl$ are input as control inputs.

In FIG. 6, θrbl1 to θrbl3 represent predetermined values of the exhaust reopening angle θrbl, and are set to values which satisfy the relationship of θrbl1<θrbl2<θrbl3. In the response surface model, the indicated mean effective pressure Pmi is set such that it takes a larger value as the intake opening angle θlin is larger. This is because as the intake opening angle θlin is larger, the amount of intake air increases. Further, in a region where the value of the intake opening angle θlin is intermediate or larger, the indicated mean effective pressure Pmi is set such that it takes its local maximum value with respect to the direction of increasing or decreasing the exhaust reopening angle θrbl. This is because in the region where the value of the intake opening angle θlin is intermediate or larger, the degree or rate of a rise in the temperature of the mixture, dependent on the intake opening angle θlin, is large, so that even when the exhaust reopening angle θrbl is increased or decreased, the degree of contribution of the exhaust reopening angle θrbl to the rise in the temperature of the mixture is smaller to cause the indicated mean effective pressure Pmi to cease to increase, and further if the exhaust reopening angle θrbl is increased to some extent or more, ignition timing (spontaneous ignition timing) becomes too early (before the top dead center) to thereby suppress the maximum in-cylinder pressure during the compression stroke of the engine 3.

It should be noted that as described hereinabove, the intake opening angle θlin is controlled to be between the minimum value θlin_min and the maximum value θlin_max, and the minimum value θlin_min is set to be an approximately intermediate value in a region of the intake opening angle θlin. Therefore, in the present embodiment, the indicated mean effective pressure Pmi takes the local maximum value with respect to changes in the exhaust reopening angle θrbl.

Figure 7:
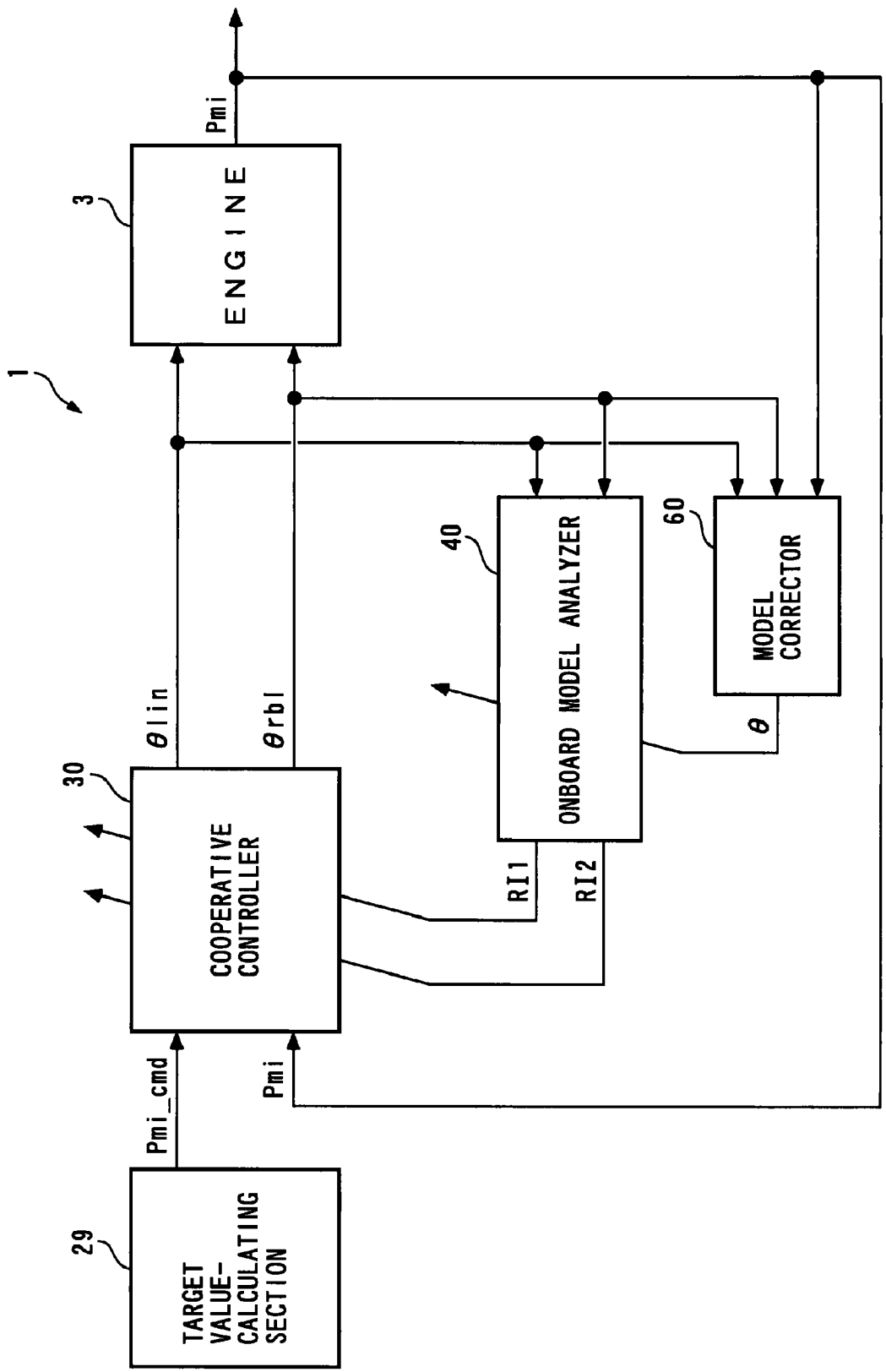
FIG. 7 is a schematic functional block diagram of the control apparatus.

Next, a description will be given of details of the construction of the control apparatus 1. Referring to FIG. 7, the control apparatus 1 is comprised of a target value-calculating section 29, a cooperative controller 30, an onboard model analyzer 40, and a model corrector 60 all of which are implemented by the ECU 2.

First, the target value-calculating section 29 calculates a target value Pmi_cmd of the indicated mean effective pressure by searching a map shown in FIG. 26, described hereinafter, according to the engine speed NE and the accelerator pedal opening AP. It should be noted that in the present embodiment, the target value-calculating section 29 corresponds to the target value-calculating means.

Further, the cooperative controller 30 calculates the intake opening angle θlin and the exhaust reopening angle θrbl using two response indices RI1 and RI2 calculated by the onboard model analyzer 40, as described hereinafter, such that the indicated mean effective pressure Pmi is caused to converge to its target value Pmi_cmd. It should be noted that in the present embodiment, the cooperative controller 30 corresponds to the control input-calculating means.

Further, as described hereinafter, the onboard model analyzer 40 calculates the first and second response indices RI1 and RI2 using the intake opening angle θlin and the exhaust reopening angle θrbl calculated by the cooperative controller 30, the model correction parameter matrix θ calculated by the model corrector 60, and the above-described controlled object model. It should be noted that in the present embodiment, the onboard model analyzer 40 corresponds to the correlation parameter-calculating means, and the model corrector means, and the first and second response indices RI1 and RI2 correspond to a plurality of correlation parameters.

On the other hand, the model corrector 60 calculates the model correction parameter matrix θ, as described hereinafter. It should be noted that in equations (1) to (11) described hereinafter, discrete data with a symbol (k) indicates that it is data sampled or calculated at a predetermined control period ΔTk (at a repetition period in synchronism with generation of each TDC signal pulse, i.e. whenever the crankshaft rotates through 180°), and the symbol k indicates a position in the sequence of sampling or calculating cycles of respective discrete data. For example, the symbol k indicates that discrete data therewith is a value sampled or calculated in the current control timing, and a symbol k−1 indicates that discrete data therewith is a value sampled or calculated in the immediately preceding control timing. Further, in the following description, the symbol (k) and the like provided for the discrete data are omitted as deemed appropriate.

The model correction parameter matrix θ is for modifying the controlled object model, and as shown in the following equation (1), it is defined as a matrix with (I+1) rows and (J+1) columns of the elements of model correction parameters θij $$\theta(k) = \begin{bmatrix} \theta 00(k) & \cdots & \theta f1(k) & \cdots & \theta I1(k) \\ \vdots & \ddots & \vdots & \iddots & \vdots \\ \theta 0g(k) & \cdots & \theta fg(k) & \cdots & \theta Ig(k) \\ \vdots & \iddots & \vdots & \ddots & \vdots \\ \theta 0J(k) & \cdots & \theta fJ(k) & \cdots & \theta IJ(k) \end{bmatrix} \quad (1)$$

It should be noted that in the present embodiment, the model corrector 60 corresponds to the model corrector means, and the model correction parameter θij to a plurality of correction parameters.

Figure 8:
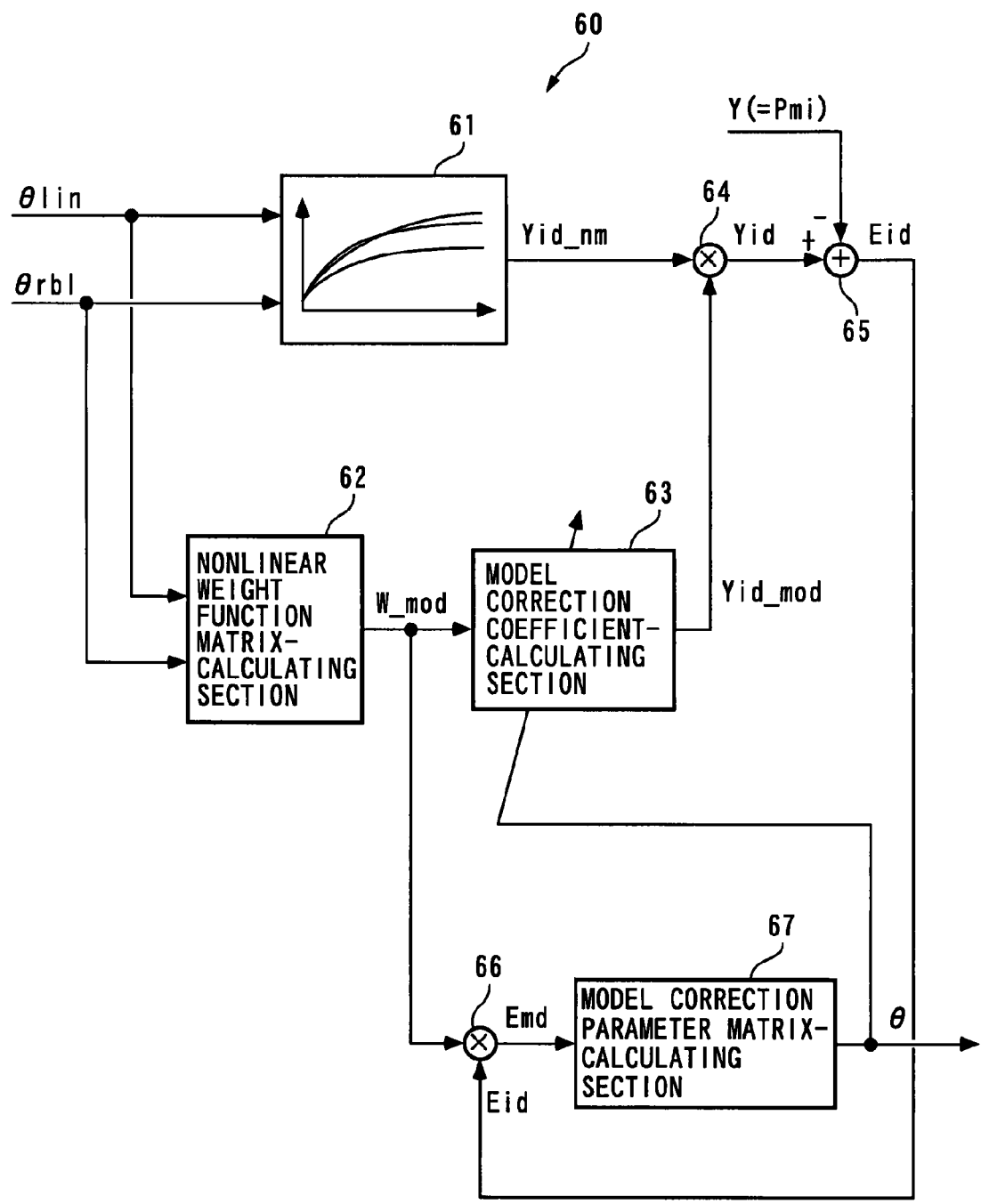
FIG. 8 is a schematic functional block diagram of a model corrector.

Referring to FIG. 8, the model corrector 60 is comprises of a basic estimated controlled variable-calculating section 61, a nonlinear weight function matrix-calculating section 62, model correction coefficient-calculating section 63, two multipliers 64 and 66, a subtractor 65, and a model correction parameter matrix-calculating section 67.

Figure 9:
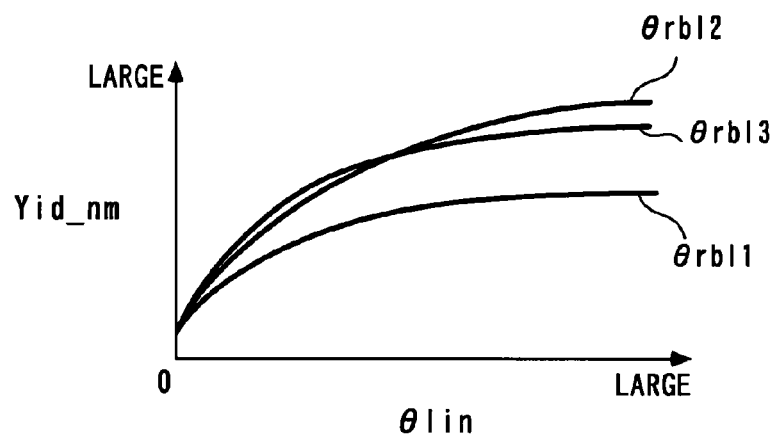
FIG. 9 is a diagram of a controlled object model used in the calculation of a basic controlled variable Yid_nm.

First, the basic estimated controlled variable-calculating section 61 calculates the basic estimated controlled variable Yid_nm(k) by inputting the immediately preceding value θlin(k−1) of the intake opening angle and the immediately preceding value θrbl(k−1) of the exhaust reopening angle to a controlled object model shown in FIG. 9. More specifically, similarly to the normal map search method, according to the immediately preceding values θlin(k−1) and θrbl(k−1), a plurality of values are retrieved, and the basic estimated controlled variable Yid_nm(k) is calculated interpolation of the retrieved values. The controlled object model shown in FIG. 9 is formed by replacing Pmi set to the vertical axis by Yid_nml, in the above-described controlled object model shown in FIG. 6. In short, it is substantially the same as that in FIG. 6. It should be noted that in the present embodiment, the basic estimated controlled variable Yid_nm corresponds to the controlled variable of the controlled object model.

It should be noted that the respective immediately preceding values θlin(k−1) and θrbl(k−1), of the intake opening angle and the exhaust reopening angle are used in the basic estimated controlled variable-calculating section 61, because the indicated mean effective pressure ⊘the present value Pmi(k) used for calculating a corrected error Eid, referred to hereinafter, is obtained as a result of inputting the immediately preceding value θlin(k−1) of the intake opening angle and the immediately preceding value θrbl(k−1) of the exhaust reopening angle to the engine 3.

Further, the nonlinear weight function matrix-calculating section 62 calculates a nonlinear weight function matrix W_mod(θline(k−1), θrbl(k−1)), as referred to hereinafter. The nonlinear weight function matrix W_mod(θline(k−1), θrbl(k−1)) is defined by the following equation (2):

$$W\_mod(\theta lin(k-1), \theta rbl(k-1)) = \begin{bmatrix} W00(\theta lin(k-1), \theta rbl(k-1)) & \cdots & Wf0(\theta lin(k-1), \theta rbl(k-1)) & \cdots & WI0(\theta lin(k-1), \theta rbl(k-1)) \\ \vdots & \ddots & \vdots & \iddots & \vdots \\ W0g(\theta lin(k-1), \theta rbl(k-1)) & \cdots & Wfg(\theta lin(k-1), \theta rbl(k-1)) & \cdots & WIg(\theta lin(k-1), \theta rbl(k-1)) \\ \vdots & \iddots & \vdots & \ddots & \vdots \\ W0J(\theta lin(k-1), \theta rbl(k-1)) & \cdots & WfJ(\theta lin(k-1), \theta rbl(k-1)) & \cdots & WIJ(\theta lin(k-1), \theta rbl(k-1)) \end{bmatrix} \quad (2)$$

(i=0 to I, and j=0 to J). Here, I and J are positive integers, and f and g are positive elements which satisfy 0<f<I and 0<g<J, respectively.

Figure 10:
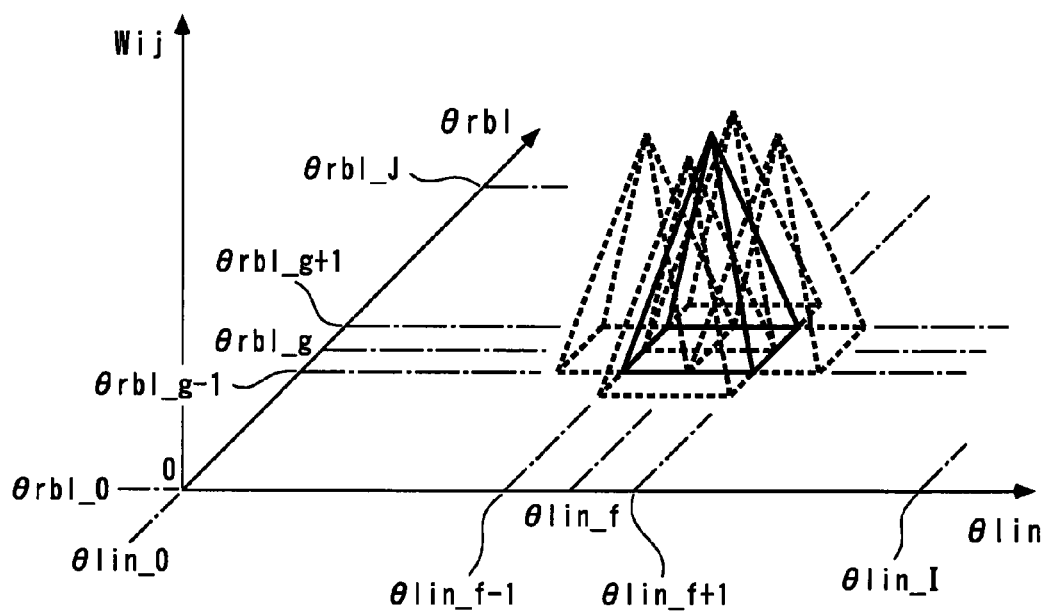
FIG. 10 is a diagram showing an example of a map for use in the calculation of nonlinear weight functions Wij.

As shown in the equation (2), the nonlinear weight function matrix W_mod is a matrix with (I+1) rows and (J+1) columns of the elements of values of nonlinear weight functions Wij (θlin(k−1), θrbl(k−1)), and as shown in FIG. 10, the nonlinear weight functions Wij are function whose values are determined according to the intake opening angle θlin and the exhaust reopening angle θrbl. In the map shown in FIG. 10, the range of the intake opening angle θlin which is variable by the variable intake valve-actuating mechanism 4 is equally divided by (I+1) values θlin_i (i=0 to I), and the range of the exhaust reopening angle θrbl which is variable by the variable exhaust valve-actuating mechanism 5 is equally divided by (J+1) values θrbl_j (j=0 to J). The nonlinear weight functions Wij are set in a manner associated respectively with a plurality of regions defined by combinations of three consecutive values of the intake opening angle θlin_i and three consecutive values of the exhaust reopening angle θrbl_j. It should be noted in the present embodiment, the nonlinear weight functions Wij correspond to the plurality of functions.

Further, each of the nonlinear weight functions Wij takes the maximum value of 1 with respect to the values of the intake opening angle θlin and the exhaust reopening angle θrbl in a center of each associated region, and in an area other than the center, it takes a value which changes as on inclined surfaces of a square pyramid. Outside the regions, it takes a value of 0. In addition, each adjacent two of a plurality of regions to which correspond the nonlinear weight functions Wij, respectively, overlap each other, whereby the adjacent two of the nonlinear weight functions Wij intersect with each other, in respective portions whereby they change as on inclined surfaces of a square pyramid.

Figure 11:
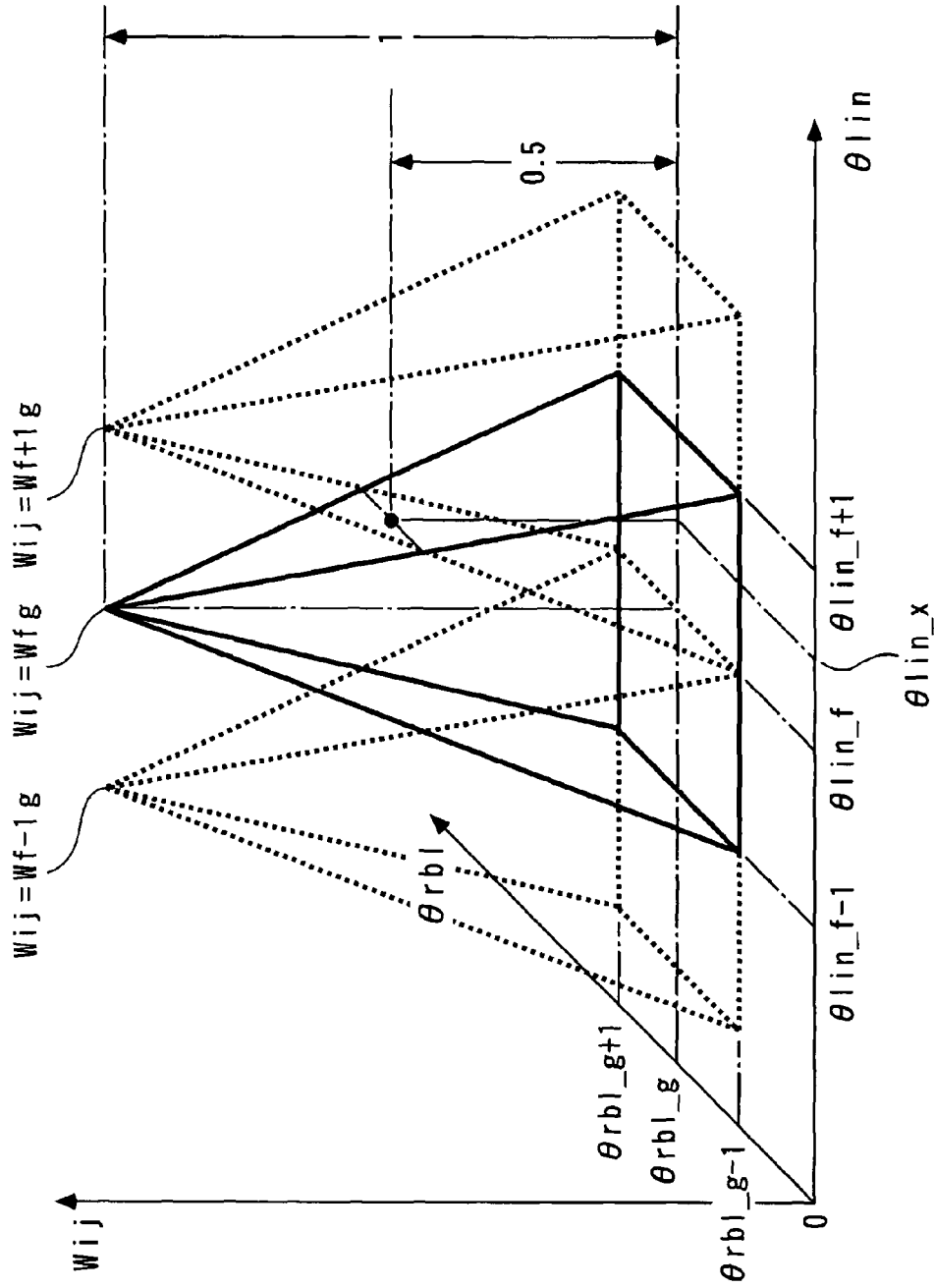
FIG. 11 is a diagram which is useful in explaining a method of calculating the nonlinear weight functions Wij.

For example, as shown in FIG. 11, a nonlinear weight function Wfg corresponding to a region of θlin_f−

$1 \leq \theta\text{lin} \leq \theta\text{lin\_f}+1$ and $\theta\text{rbl\_g}-1 \leq \theta\text{rbl} \leq \theta\text{rbl\_g}+1$ takes the maximum value of 1 when the intake opening angle θlin and the exhaust reopening angle θrbl are equal to values in respective centers of the region, i.e. when θlin=θlin_f and θrbl=θrbl_g hold, but with respect to values θlin and θrbl other than the values corresponding to the respective centers, the value of the nonlinear weight function Wfg changes as on inclined surfaces of a square pyramid. Further, it is configured such that when the two values θlin and θrbl are outside the above region, i.e. when θlin<θlin_f−1, θlin_f+1<θlin, θrbl<θrbl_g−1 or θrbl_g+1<θrbl holds, the nonlinear weight function Wfg takes a value of 0.

Further, inclined surfaces of a square pyramid on which the value of the nonlinear weight function Wfg changes intersect with inclined surfaces of square pyramids on which change the respective values of the nonlinear weight functions Wf−1g and Wf+1g corresponding to regions adjacent to the region of the nonlinear weight function Wfg, in portions of these regions where they overlap each other. Therefore, as shown in FIG. 11, assuming that θlin_x is a value in the center between the values θlin_f and θlin_f+1, e.g. when θlin=θlin_x and θrbl=θrbl_g hold, the values of the two nonlinear weight functions Wfg and Wf+1g are such that Wfg=Wf+1g=0.5 holds, and all the values of the nonlinear weight functions Wij other than these become equal to 0. In addition, when θlin_x<θlin<θlin_f+1 and rbl=θrbl_g holds, the value of the nonlinear weight function Wfg becomes such that 0<Wfg<<0.5 holds, while the value of the non-liner weight function Wf+1g becomes equal to (1−Wfg), and all the values of the other nonlinear weight functions Wij other than these become equal to 0.

Figure 12:
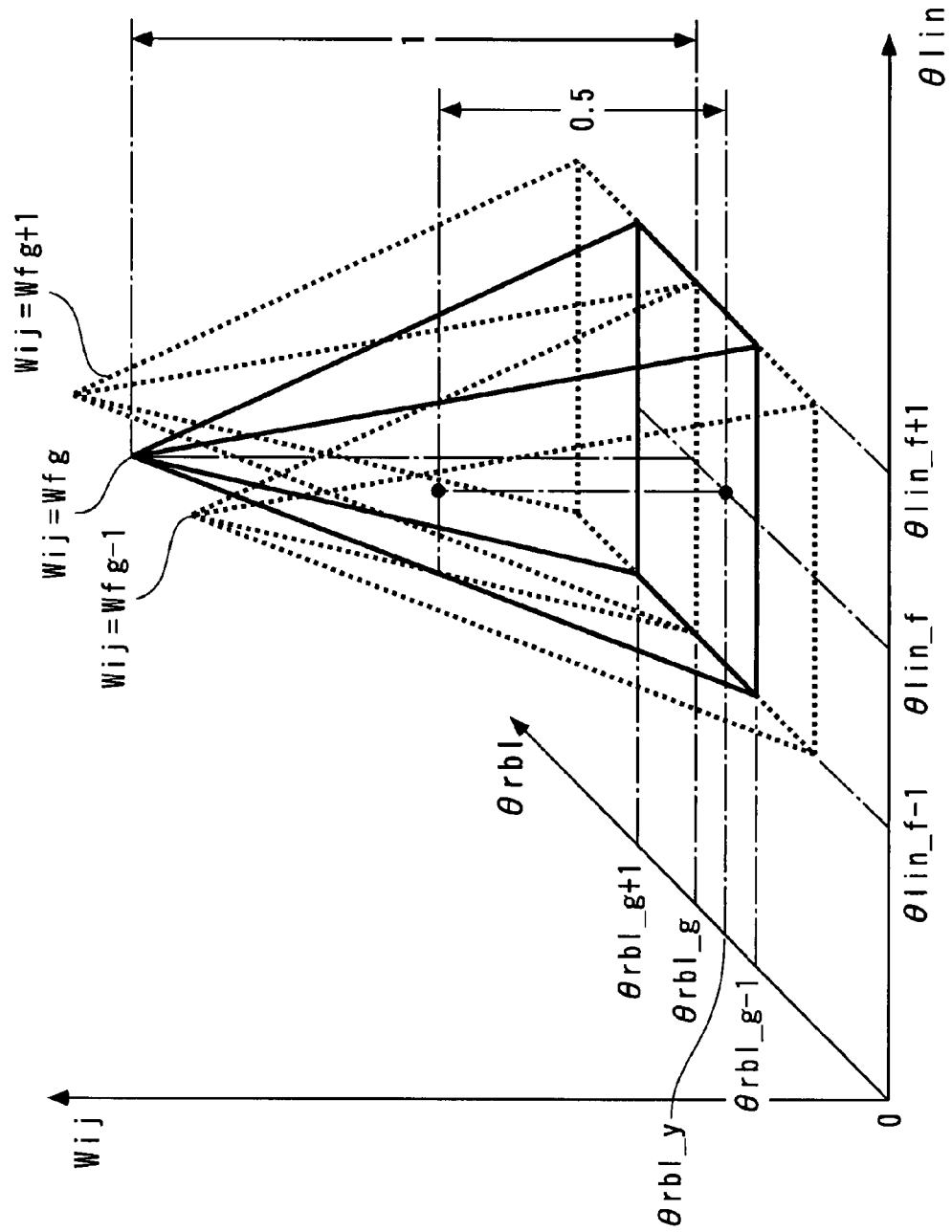
FIG. 12 is a diagram which is useful for explaining a method of calculating the nonlinear weight functions Wij.

Further, as shown in FIG. 12, in overlapping portions of respective regions of the nonlinear weight function Wfg and the nonlinear weight functions Wfg−1 and Wfg+1 in adjacent thereto, i.e. portions where they change on inclined surfaces, the inclined surfaces intersect with each other. Therefore, as shown in FIG. 12, assuming that θrbl_y is a value in the center between θrbl_g−1 and θrbl_g, e.g. when θlin=θlin_f and θrbl1=θrbl_7 hold, the values of the two nonlinear weight functions Wfg−1 and Wfg are such that Wfg−1=Wfg=0.5 holds, and the values of the other nonlinear weight functions Wij are all equal to 0. In addition thereto, when θlin=θlin_f and θrbl_y<θrbl<θrbl_g hold, the value of the nonlinear weight function Wfg−1 becomes 0<Wfg−1<0.5, and the value of the nonlinear weight function Wfg becomes equal to (1−Wfg−1), but the values of the other nonlinear weight functions Wij are all equal to 0.

It should be noted that although not shown, in overlapping portions of respective regions of the nonlinear weight function Wfg and the nonlinear weight functions Wf+1g−1 and Wf−1g+1 adjacent thereto, i.e. portions where they change as on inclined surfaces, the inclined surfaces intersect with each other.

As described above, the nonlinear weight function matrix-calculating section 62 calculates the values of the nonlinear weight functions Wij as the elements of the nonlinear weight function matrix W_mod, by searching the map shown in FIG. 10 according to the immediately preceding values θlin(k−1) of the intake opening angle and the immediately preceding value θrbl(k−1) of the exhaust reopening angle. In this case, the elements Wij corresponding to the regions where the two values θlin(k−1) and θrbl(k−1) exist, as positive values not larger than 1, whereas the elements Wij corresponding to the other regions are all calculated as 0. Therefore, the nonlinear weight function matrix W_mod is calculated as a matrix in which only the elements Wij corresponding to regions where the combinations of the two values θlin(k−1) and θrbl(k−1) exist have positive values (i.e. weights) not larger than 1.

Further, the model correction coefficient-calculating section 63 calculates the model correction coefficient Yid_mod(k) using the nonlinear weight function matrix W_mod(θline(k−1), θrbl(k−1)) calculated by the nonlinear weight function matrix-calculating section 62 as described above, and the immediately preceding value θ(k−1) of the model correction parameter matrix calculated by a model correction parameter matrix-calculating section 67, referred to hereinafter, by the following equation (3).

$$\text{Yid\_mod}(k) = \text{Yid\_base} + \sum_{i=0}^{I} \sum_{j=0}^{J} \theta ij(k-1) \cdot \qquad (3)$$
$$Wij(\theta lin(k-1), \theta rbl(k-1))$$
$$= \text{Yid\_base} + \theta 00(k-1) \cdot W00(\theta lin(k-1),$$
$$\theta rbl(k-1)) + \cdots + \theta fg(k-1) \cdot Wfg(\theta lin(k-1),$$
$$\theta rbl(k-1)) + \cdots + \theta IJ(k-1) \cdot WIJ(\theta lin(k-1),$$
$$\theta rbl(k-1))$$

In the equation (3), Yid_base is a predetermined basic value, and is set to 1 in the present embodiment. The reason for this will be described hereinafter. As shown in the equation (3), the model correction coefficient Yid_mod(k) is calculated by multiplying the nonlinear weight function matrix W_mod(θline(k−1), θrbl(k−1)) by the immediately preceding value θ(k−1) of the model correction parameter matrix, on an element-by-element basis, and adding the sum of the products to the basic value Yid_base.

Next, the multiplier 64 calculates a corrected estimated controlled variable Yid by the following equation (4):

$$Yid(k) = Yid\_nm(k) \cdot Yid\_mod(k) \qquad (4)$$

As shown in the equation (4), the corrected estimated controlled variable Yid is calculated by multiplying the basic estimated controlled variable Yid_nm by the model correction coefficient Yid_mod. That is, the model correction coefficient Yid_mod corrects the basic estimated controlled variable Yid_nm, which, as a result, corrects the controlled object model in FIG. 9. In this case, the corrected controlled object model corresponds to one with the control inputs of two values θlin and θrbl and the controlled variable of the corrected estimated controlled variable Yid. As described above, the model correction coefficient Yid_mod is calculated as a value for correcting the controlled object model in FIG. 9.

Further, the subtractor 65 calculates an estimation error Eid by the following equation (5). More specifically, the estimation error Eid is calculated as the difference between the corrected model controlled variable Yid, which is the controlled variable of the corrected controlled object model, and the indicated mean effective pressure Pmi, which is an actual controlled variable Y.

$$Eid(k) = Yid(k) - Y(k) \qquad (5)$$
$$= Yid(k) - Pmi(k)$$

On the other hand, the multiplier 66 calculates a corrected estimation error matrix Emd by the following equation (6):

$$Emd(k) = \begin{bmatrix} Emd00 & \cdots & Emdf0 & \cdots & EmdI0 \\ \vdots & \ddots & \vdots & \iddots & \vdots \\ Emd0g & \cdots & Emdfg & \cdots & EmdIg \\ \vdots & \iddots & \vdots & \ddots & \vdots \\ Emd0J & \cdots & EmdfJ & \cdots & EmdIj \end{bmatrix} \quad (6)$$

$$= W\_mod(\theta lin(k-1), \theta rbl(k-1)) \cdot Eid(k)$$

$$= \begin{bmatrix} W00(\theta lin(k-1), \theta rbl(k-1)) & \cdots & Wf0(\theta lin(k-1), \theta rbl(k-1)) & \cdots & WI0(\theta lin(k-1), \theta rbl(k-1)) \\ \vdots & \ddots & \vdots & \iddots & \vdots \\ W0g(\theta lin(k-1), \theta rbl(k-1)) & \cdots & Wfg(\theta lin(k-1), \theta rbl(k-1)) & \cdots & WIg(\theta lin(k-1), \theta rbl(k-1)) \\ \vdots & \iddots & \vdots & \ddots & \vdots \\ W0J(\theta lin(k-1), \theta rbl(k-1)) & \cdots & WfJ(\theta lin(k-1), \theta rbl(k-1)) & \cdots & WIJ(\theta lin(k-1), \theta rbl(k-1)) \end{bmatrix} \cdot Eid(k)$$

As shown in the equation (6), the corrected estimation error matrix Emd is calculated by multiplying the estimation error Eid by the nonlinear weight function matrix W_mod, and hence is calculated as a matrix in which only the elements corresponding to the regions where the combination of the two values $\theta lin(k-1)$ and $\theta rbl(k-1)$ exists have values weighted by the elements Wij of the nonlinear weight function matrix W_mod, and the other elements are all equal to 0.

Further, the model correction parameter matrix-calculating section 67 calculates the model correction parameter matrix $\theta$ with a sliding mode control algorithm expressed by the following equations (7) to (11):

$$\theta(k) = \theta rch(k) + \theta nl(k) + \theta adp(k) \quad (7)$$

$$\theta rch(k) = -Qrch \cdot \delta(k) \quad (8)$$

$$\theta nl(k) = -Qnl \cdot sgn(\delta(k)) \quad (9)$$

$$\theta adp(k) = \lambda \cdot \theta adp(k-1) - Qadp \cdot \delta(k) \quad (10)$$

$$\delta(k) = Emd(k) + R \cdot Emd(k-1) \quad (11)$$

As shown in the equation (7), the model correction parameter matrix $\theta$ is calculated as the sum of a reaching law input matrix $\theta rch$, a non-linear input matrix $\theta nl$, and an adaptive law input matrix $\theta adp$, and the reaching law input matrix $\theta rch$ is calculated by the equation (8). Qrch in the equation (8) is a predetermined reaching law gain, and $\delta$ is a switching function as defined by the equation (11). R in the equation (11) represents a switching function-setting parameter set such that $-1 < R < 0$ holds. It should be noted that in the present embodiment, the adaptive law input matrix $\theta adp$ corresponds to an integral value, and the switching function $\delta$ corresponds to a value based on the difference.

Further, the non-linear input matrix $\theta nl$ is calculated by the equation (9), and Qnl in the equation (9) represents a predetermined non-linear gain. Further, $sgn(\delta(k))$ represents a sign function, the value of which is set such that when $\delta(k) \geq 0$, $sgn(\delta(k)) = 1$ holds, and when $\delta(k) < 0$, $sgn(\delta(k)) = -1$ holds. It should be noted that the value of the sign function $sgn(\delta(k))$ may be configured such that when $\delta(k) = 0$, $sgn(\delta(k)) = 0$ holds.

Further, the adaptive law input matrix $\theta adp$ is calculated by the equation (10). Qadp in the equation (10) is a predetermined adaptive law gain, and $\lambda$ is a forgetting function set such that $0 < \lambda < 1$ holds. The reason for the use of the forgetting function is as follows:

Even when Yid≈Pmi comes to hold as the computation process proceeds, each element of the corrected estimation error matrix Emd does not strictly converge to 0, nor the average value of the elements of the corrected estimation error matrix Emd does not become equal to 0. In this case, as shown in the equation (10), the adaptive law input matrix $\theta adp$ is calculated as an integral value obtained by cumulatively calculating a negative value of the product of the switching function $\delta$ and the adaptive law gain Qadp, and hence if the forgetting function $\lambda$ is not used (i.e. assuming $\lambda = 1$), the absolute value of each element of the adaptive law input matrix $\theta adp$ continues to increase by the integrating effect, so that the model correction parameter matrix $\theta$ comes to be calculated as an improper value. That is, the estimation error remains in the model correction parameter matrix $\theta$, and even in the subsequent computations, the estimation errors are cumulated, so that there is a possibility that the accuracy of calculation of the model correction parameter matrix $\theta$ can be lowered.

In contrast, in the present embodiment, as shown in the equation (10), the immediately preceding value $\theta adp(k-1)$ of the adaptive law input matrix is multiplied by the forgetting function, and hence when the equation (10) is expanded by a recurrence formula, the m-th preceding value $\theta adp(k-m)$ is multiplied by $\lambda^m$ ($\approx 0$), whereby as the computation process proceeds, Yid≈Pmi comes to hold, and at the time each element of the corrected estimation error matrix Emd converges to approximately 0, each element of the adaptive law input matrix $\theta adp$ converge to approximately 0. As a result, it is possible to prevent the estimation error in the model correction parameter matrix $\theta$ from remaining. This makes it possible to calculate the model correction parameter matrix $\theta$ as an appropriate value to increase the accuracy of the calculation and increase the stability of the control system. Therefore, to obtain the above-described forgetting effect, in the present embodiment, the forgetting function $\lambda$ is used. That is, the model correction parameter matrix $\theta$ is calculated while subjecting the immediately preceding value $\theta adp(k-1)$ of the adaptive law input matrix as the integral value to a forgetting process by a forgetting coefficient $\lambda$.

Further, for example, when each element of the corrected estimation error matrix Emd converges to 0, each element of the adaptive law input matrix $\theta adp$ converges to 0 by the forgetting effect of the forgetting function $\lambda$, and each element of the reaching law input matrix $\theta rch$ and each element of non-linear input matrix $\theta nl$ also converge to 0, whereby all the elements of the model correction parameter matrix $\theta$ come to be equal to 0. In this case, in the aforementioned equation (3), all the terms other than the basic value Yid_base become equal to 0. Therefore, in the present embodiment, the basic value Yid_base is set to 1 so as to cause Yid_nm=Yid, i.e. Yid_mod=1 to hold when each element of the corrected estimation error matrix Emd converges to 0 to make it unnecessary to correct the controlled object model.

It should be noted that when the forgetting effect by the forgetting coefficient $\lambda$ as described above is unnecessary, it is only required that the forgetting coefficient λ in the equation (10) is set to 1, and at the same time the basic value Yid_base in the aforementioned equation (3) is set to 0.

The model corrector 60 according to the present embodiment calculates the model correction parameter matrix θ with the sliding mode control algorithm as described above, and hence when Eid≠0, i.e. Yid−Pmi≠0 holds, only the elements θij of the model correction parameter matrix θ corresponding to a region where the combination of the two values θlin(k−1) and θrbl(k−1) exist are calculated as values which cause Eid to converge to 0, and the other elements θij are calculated as 0. Further, as described hereinabove, the model correction coefficient Yid_mod is calculated by adding the basic value Yid_base to the sum of the products of the immediately preceding values θ(k−1) of the model correction parameter matrix calculated as above and respective corresponding elements of the nonlinear weight function matrix W_mod. Therefore, the controlled object model in FIG. 9 is corrected for regions where the combination of the two values θlin(k−1) and θrbl(k−1) exists, such that Yid=Pmi holds. Therefore, the model corrector 60 calculates the model correction parameter matrix θ while correcting the controlled object model in FIG. 9 onboard by the model correction coefficient Ym_mod such that the model correction parameter matrix θ matches the actual characteristics of the controlled object.

Figure 13:
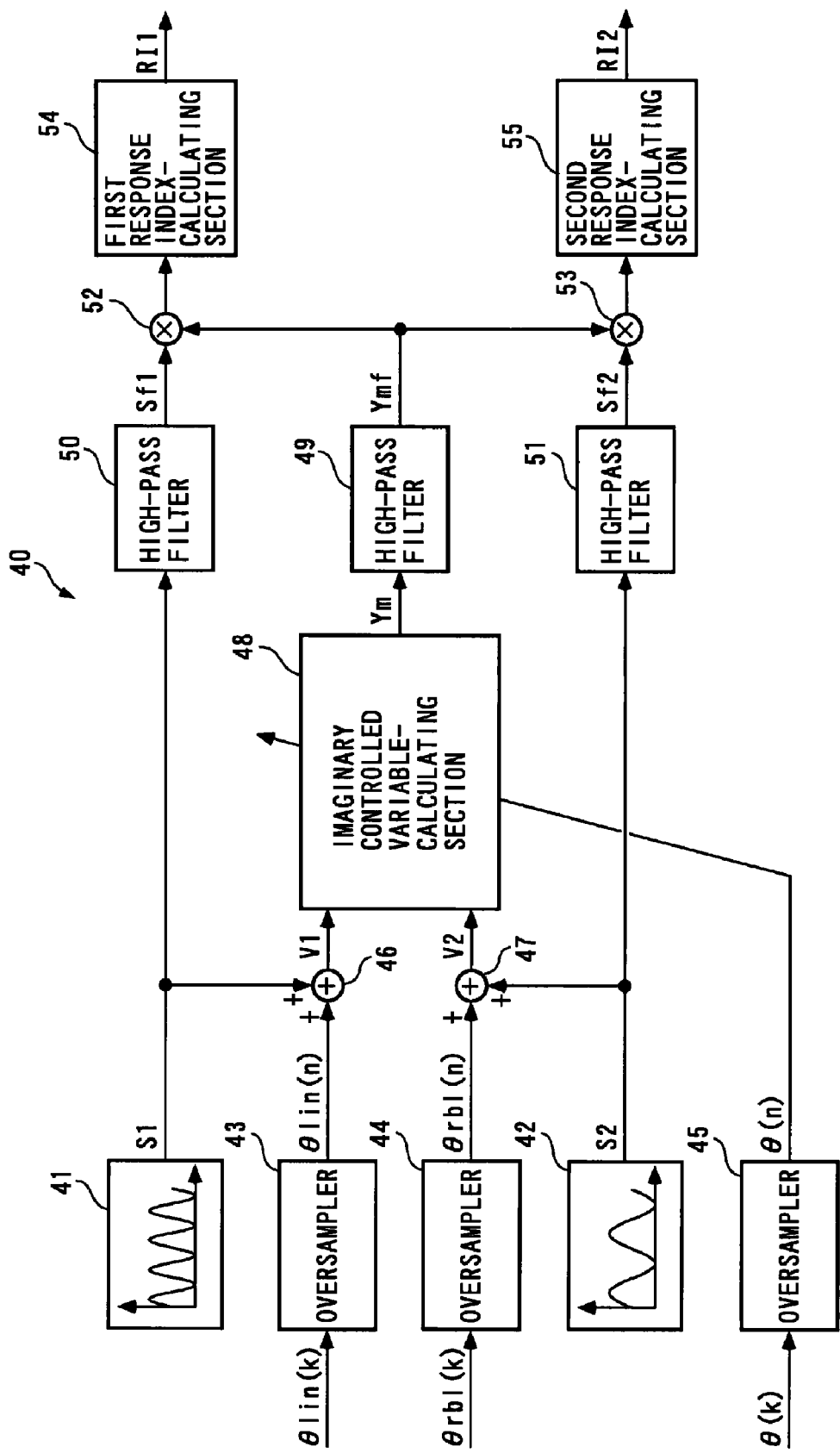
FIG. 13 is a schematic functional block diagram of an onboard model analyzer.

Next, a description will be given of the aforementioned onboard model analyzer 40. Referring to FIG. 13, the onboard model analyzer 40 is comprised of a first periodic signal value-calculating section 41, a second periodic signal value-calculating section 42, three oversamplers 43 to 45, two adders 46 and 47, an imaginary controlled variable-calculating section 48, three high-pass filters 49 to 51, two multipliers 52 and 53, a first response index-calculating section 54, and a second response index-calculating section 55.

It should be noted that in equations (12) to (24) referred to hereinafter, discrete data with a symbol (n) indicates that it is data sampled or calculated at a predetermined control period ΔTn (at a repetition period during which a total of five consecutive pulses of the CRK signal are generated, i.e. whenever the crankshaft rotates through 5°), and the symbol n indicates a position in the sequence of sampling or calculating cycles of discrete data. Further, in the following description, the symbol (n) and the like provided for the discrete data are omitted as deemed appropriate.

First, the onboard model analyzer 40 calculates first and second periodic signal values S1 and S2 by the first and second periodic signal value-calculating sections 41 and 42 using the following equations (12) and (13).

$$S1(n)=A1 \cdot S1'(n) \quad (12)$$

$$S2(n)=A2 \cdot S2'(n) \quad (13)$$

Figure 14:
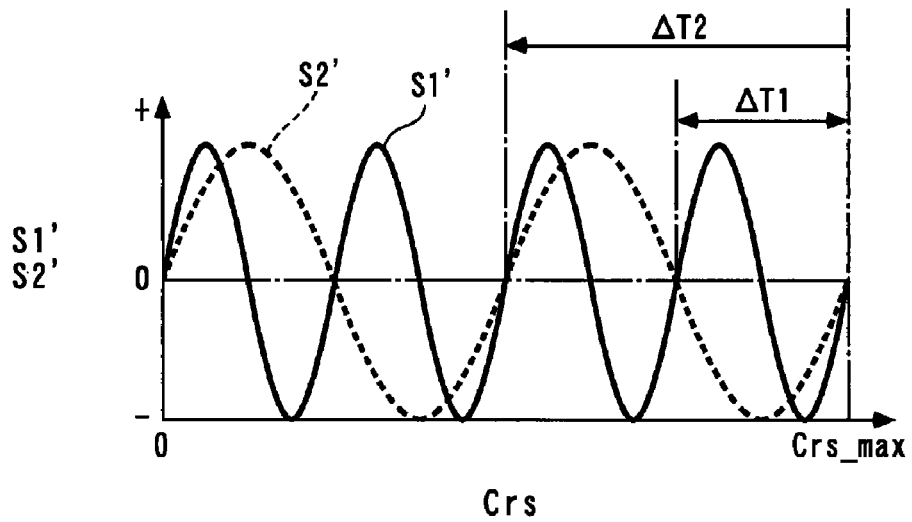
FIG. 14 is a view of an example of a map for use in the calculation of respective basic values S1' and S2' of first and second periodic signal values.

In the above equation (12), A1 represents a first predetermined amplitude gain, and S1' represents a basic value of the first periodic signal value, which is calculated by searching a map shown in FIG. 14, according to a counter value Crs. As described hereinafter, the counter value Crs is counted up from 0 to its maximum value Crs_max by incrementing 1 per the control period ΔTn. When the counter value Crs reaches the maximum value Crs_max, it is reset to 0. It should be noted that a repetition period at which the basic value S1' of the first periodic signal value is calculated, i.e. the repetition period ΔT1 at which the first periodic signal value S1 is calculated is set such that ΔT1=ΔTn·(Crs_max/N1) hold wherein Crs_max is a multiple of 4, not smaller than a value of 8, and N1 is a multiple of 4, not smaller than a value of 4.

In the case of the present embodiment, the repetition period ΔT1 is set to a crank angle of 45° by setting Crs_max=36 and N1=4.

Further, in the above equation (13), A2 represents a second predetermined amplitude gain, and S2' represents a basic value of the second periodic signal value and is calculated by searching the map shown in FIG. 14, according to the counter value Crs. It should be noted that a repetition period at which the basic value S2' of the second periodic signal value is calculated, i.e. the repetition period ΔT2 at which the second periodic signal value S2 is calculated is set such that ΔT2=ΔTn·(Crs_max/N2) holds wherein Crs_max is a multiple of 4, not smaller than a value of 8, and, and N2 is a multiple of 2, which is set such that N2<N1 holds. In the case of the present embodiment, the repetition period ΔT2 is set to a crank angle of 90° by setting Crs_max=36 and N2=2.

Further, the oversamplers 43 and 44 oversample an intake opening angle θlin(k) and an exhaust reopening angle θrbl(k) at the aforementioned control period ΔTn, to thereby calculate respective oversampled values θlin(n) and θrbl(n) of the intake opening angle and the exhaust reopening angle. It should be noted that the intake opening angle θlin(k) and the exhaust reopening angle θrbl(k) are calculated by the cooperative controller 30 at the aforementioned control period ΔTk.

Then, the adders 46 and 47 calculate the first and second imaginary control inputs V1 and V2 using the following equations (14) and (15):

$$V1(n)=S1(n)+\theta lin(n) \quad (14)$$

$$V2(n)=S2(n)+\theta rbl(n) \quad (15)$$

Further, the oversampler 45 oversamples the model correction parameter matrix θ calculated by the model corrector 60 at the control period ΔTn, thereby calculating the oversampled values θ(n) of the model correction parameter matrix. The oversampled values θ(n) are defined by the following equation (16):

$$\theta(n) = \begin{bmatrix} \theta 00(n) & \cdots & \theta f1(n) & \cdots & \theta I1(n) \\ \vdots & \ddots & \vdots & \ddots & \vdots \\ \theta 0g(n) & \cdots & \theta fg(n) & \cdots & \theta Ig(n) \\ \vdots & \ddots & \vdots & \ddots & \vdots \\ \theta 0J(n) & \cdots & \theta fJ(n) & \cdots & \theta IJ(n) \end{bmatrix} \quad (16)$$

Figure 15:
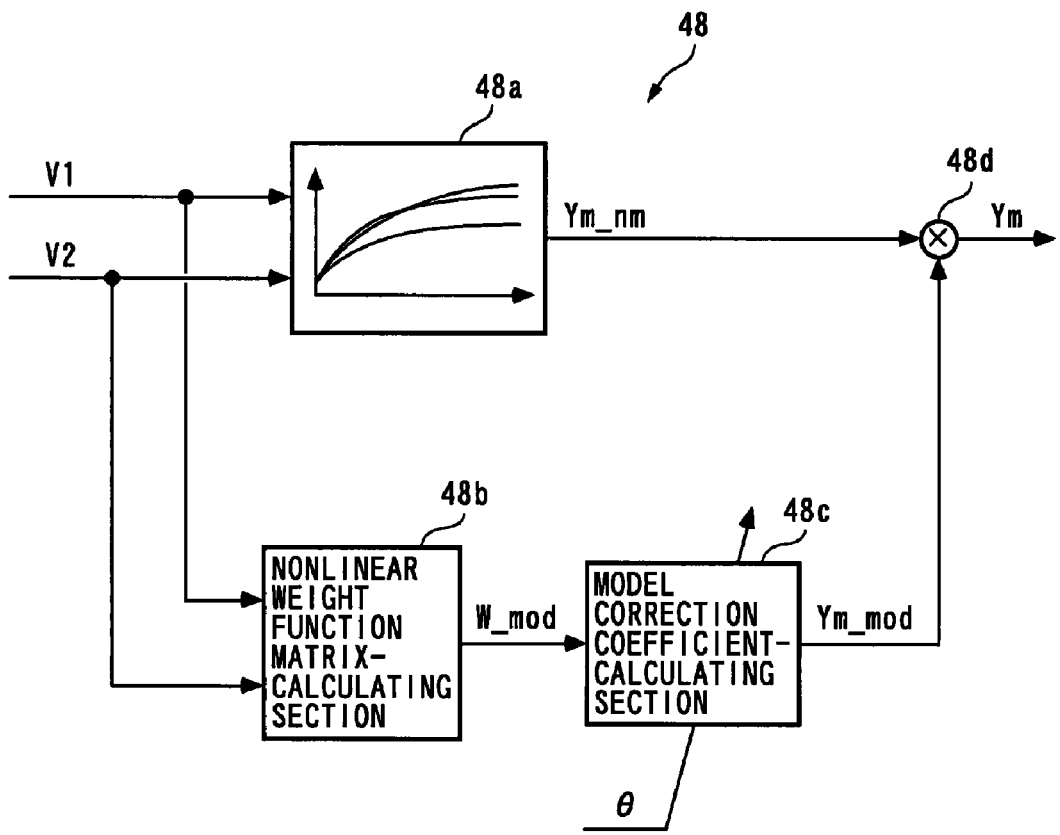
FIG. 15 is a schematic functional block diagram of an imaginary controlled variable-calculating section.

Next, a description will be given of the imaginary controlled variable-calculating section 48. The imaginary controlled variable-calculating section 48 calculates the imaginary controlled variable Ym according to the first and second imaginary control inputs V1 and V2 and the oversampled values θ(n), and as shown in FIG. 15, is comprised of a basic imaginary controlled variable-calculating section 48a, a nonlinear weight function matrix-calculating section 48b, a model correction coefficient-calculating section 48c, and a multiplier 48d.

First, the imaginary controlled variable-calculating section 48a calculates the basic imaginary controlled variable Ym_nm(n) by inputting the first and second imaginary control inputs V1 and V2 to a controlled object model shown in FIG. 16. The controlled object model in FIG. 16 is formed by replacing the indicated mean effective pressure Pmi, the intake opening angle θlin, and the three predetermined values θrbl1 to θrbl3 of the exhaust reopening angle θrbl in the controlled object model in FIG. 6 by the basic imaginary controlled variable Ym_nm, the first imaginary controlled variable V1, and three predetermined values V2_1 to V2_3 of the second imaginary controlled input V2, respectively, and hence is substantially the same as the controlled object model in FIG. 6. It should be noted that in the present embodiment, the basic imaginary controlled variable Ym_nm corresponds to the controlled variable of the controlled object model.

Further, the nonlinear weight function matrix-calculating section 48b calculates the nonlinear weight function matrix W_mod(V1(n), V2(n)) in the same manner as the nonlinear weight function matrix-calculating section 62 described above. The nonlinear weight function matrix W_mod(V1(n), V2(n)) is defined by the following equation (17):

$$W\_mod(V1(n), V2(n)) = \begin{bmatrix} W00(V1(n),V2(n)) & \cdots & Wf0(V1(n),V2(n)) & \cdots & WI0(V1(n),V2(n)) \\ \vdots & \ddots & \vdots & \cdot^{\cdot^{\cdot}} & \vdots \\ W0g(V1(n),V2(n)) & \cdots & Wfg(V1(n),V2(n)) & \cdots & WIg(V1(n),V2(n)) \\ \vdots & \cdot^{\cdot^{\cdot}} & \vdots & \ddots & \vdots \\ W0J(V1(n),V2(n)) & \cdots & WfJ(V1(n),V2(n)) & \cdots & WIJ(V1(n),V2(n)) \end{bmatrix} \quad (17)$$

As shown in the equation (17), the nonlinear weight function matrix W_mod(V1(n), V2(n)) is a matrix with (I+1) rows and (J+1) columns of the elements of the values of the nonlinear weight functions Wij(V1(n), V2(n)), and the nonlinear weight functions Wij(V1,V2) are functions the values of which are determined according to the values of the first and second imaginary control inputs V1 and V2, as shown in FIG. 17.

The map shown in FIG. 17 is formed by replacing the nonlinear weight functions Wij(θlin, θrbl) and the intake opening angle θlin and the exhaust reopening angle θrbl in the aforementioned map in FIG. 10 by the nonlinear weight functions Wij(V1, V2) and the first and second imaginary control inputs V1 and V2, respectively. Therefore, the values of the nonlinear weight functions Wij(V1, V2) are calculated by searching the map in FIG. 17 according to the values of the first and second imaginary control inputs V1 and V2, as mentioned above.

Next, the model correction coefficient-calculating section 48c calculates a model correction coefficient Ym_mod(n) by the following equation (18):

$$Ym\_mod(n) = Ym\_base + \sum_{i=0}^{I}\sum_{j=0}^{J} \theta ij(n) \cdot Wij(V1(n), V2(n)) \quad (18)$$
$$= Ym\_base + \theta 00(n) \cdot W00(V1(n), V2(n)) + \cdots + \theta fg(n) \cdot Wfg(V1(n), V2(n)) + \cdots + \theta IJ(n) \cdot WIJ(V1(n), V2(n))$$

In the above equation (18), Ym_base represents a predetermined basic value, and for the same reason as described as to the aforementioned basic value Yid_base, it is set to 1. As shown in the equation (18), the model correction coefficient Ym_mod(n) is calculated by multiplying each element of the nonlinear weight function matrix W_mod(V1(n), V2(n)) and a corresponding element of the oversampled values θ(n) of the model correction parameter matrix by each other, and adding the sum of the products to the basic value Ym_base.

Then, the multiplier 48d calculates the imaginary controlled variable Ym by the following equation (19):

$$Ym(n)=Ym\_nm(n) \cdot Ym\_mod(n) \quad (19)$$

As shown in the equation (19), the imaginary controlled variable Ym is calculated by calculating the basic imaginary controlled variable Ym_nm by the model correction coefficient Ym_mod. In other words, the model correction coefficient Ym_mod corrects the basic imaginary controlled variable Ym_nm, which, as a result, corrects the controlled object model in FIG. 16. In this case, the corrected controlled object model corresponds to one with the control inputs of the first and second imaginary control inputs V1 and V2 and the controlled variables of the imaginary controlled variable Ym. In this way, the model correction coefficient Ym_mod is calculated as a value for correcting the controlled object model in FIG. 16.

As described above, the imaginary controlled variable-calculating section 48 calculates the model correction coefficient Ym_mod(n) by adding the sum of products each obtained by multiplying each oversampled value θ(n) of the model correction parameter matrix by a corresponding element of the nonlinear weight function matrix W_mod(V1, V2) to the basic value Ym_base, and the model correction coefficient Ym_mod(n) corrects the controlled object model in FIG. 16. The model correction coefficient Ym_mod(n) is calculated in the same manner as the model correction coefficient Yid_mod(k) described above except for the calculation repetition period, and has the same meaning. In addition, the controlled object model in FIG. 16 is substantially the same as the controlled object model in FIG. 6, i.e. the controlled object model in FIG. 9.

Therefore, the imaginary controlled variable-calculating section 48 corrects the controlled object model in FIG. 16 calculated as described above, by the model correction coefficient Ym_mod for regions where the combination of the two values V1(n) and V2(n) exists, such that Ym=Pmi holds. As a result, the model correction coefficient Ym_mod corrects the controlled object model in FIG. 16 onboard such that it matches the actual characteristics of the controlled object.

Referring again to FIG. 13, the high-pass filter 49 in FIG. 13 calculates a filtered value Ymf of the imaginary controlled variable through a high-pass filtering process expressed by the following equation (20):

$$Ymf(n)=b0 \cdot Ym(n)+b1 \cdot Ym(n-1)+\ldots+bm^* \cdot Ym(n-m^*)+ a1 \cdot Ymf(n-1)+a2 \cdot Ymf(n-2)+\ldots+ak^* \cdot Ymf(n-k^*) \quad (20)$$

In the above equation (20), b0 to bm* and a0 to ak* represent predetermined filter coefficients, and m* and k* predetermined integers.

On the other hand, the high-pass filters 50 and 51 calculate filtered values Sf1 and Sf2 of the first and second periodic signal values through high-pass filtering processes expressed by the following equations (21) and (22), respectively.

$$Sf1(n)=b0 \cdot S1(n)+b1 \cdot S1(n-1)+\ldots+bm^* \cdot S1(n-m^*)+ a1 \cdot Sf1(n-1)+a2 \cdot Sf1(n-2)+\ldots+ak^* \cdot Sf1(n-k^*) \quad (21)$$

$$Sf2(n)=b0 \cdot S2(n)+b1 \cdot S2(n-1)+ \ldots +bm^* \cdot S2(n-m^*)+ \\ a1 \cdot Sf2(n-1)+a2 \cdot Sf2(n-2)+ \ldots +ak^* \cdot Sf2(n-k^*) \quad (22)$$

Then, the multipliers 52 and 53 calculate products Ymf·Sf1 and Ymf·Sf2 by multiplying the filtered value Ymf of the imaginary controlled variable by the respective filtered values Sf1 and Sf2 of the first and second periodic signal values. Then, the first and second response index-calculating sections 54 and 55 calculate the first and second response indices RI1 and RI2 based on (h+1) (h=Crs_max) time-series data of the products Ymf·Sf1 and Ymf·Sf2, by the following equations (23) and (24), respectively:

$$RI1(n) = Kr1 \cdot \sum_{j=n-h}^{n} Ymf(j)Sf1(j) \quad (23)$$

$$RI2(n) = Kr2 \cdot \sum_{j=n-h}^{n} Ymf(j)Sf2(j) \quad (24)$$

In the above equations (23) and (24), Kr1 and Kr2 represent response gain correction coefficients, which correct the influence of the damping characteristics of gains due to the high-pass filters 50 and 51, and makes the two values Ymf·Sf1 and Ymf·Sf2 equal in gain.

As described above, in the onboard model analyzer 40, the sum of items of the time-series data of the value Ymf·Sf1 obtained by multiplying the filtered value of the imaginary controlled variable by the filtered value of the first periodic signal value, and the sum of items of the time-series data of the value Ymf·Sf2 obtained by multiplying the filtered value of the imaginary controlled variable by the filtered value of the second periodic signal value, are multiplied by the respective response gain correction coefficients Kr1 and Kr2, whereby the first and second response indices RI1 and RI2 are calculated. Therefore, the values RI1 and RI2 are calculated as values close to a cross-correlation function between the first periodic signal value S1 and the imaginary controlled variable Ym, and a cross-correlation function between the second periodic signal value S2 and the imaginary controlled variable Ym, respectively. That is, the first response index RI1 is calculated as a value indicative of a correlation between the first periodic signal value S1 and the imaginary controlled variable Ym, and the second response index RI2 is calculated as a value indicative of a correlation between the second periodic signal value S2 and the imaginary controlled variable Ym.

Now, as described hereinafter, the repetition period ΔTk at which the intake opening angle θlin included in the first imaginary control input V1 is calculated is considerably longer than the repetition period ΔTn at which the first response index RI1 is calculated, so that the first response index RI1 is by far larger in the degree of reflection on the imaginary controlled variable Ym, and the intake opening angle θlin becomes a steady component, which is hardly reflected on the imaginary controlled variable Ym. Accordingly, the first response index RI1 is calculated as a value indicative of a correlation between the intake opening angle θlin and the indicated mean effective pressure Pmi. More specifically, the absolute value of the first response index RI1 becomes larger as the above correlation is higher, and becomes closer to 0 as the correlation is lower. Further, when the correlation between the intake opening angle θlin and the indicated mean effective pressure Pmi changes from one of a positive one and a negative one to the other, the sign of the first response index RI1 is inverted.

Further, as described hereinafter, the repetition period ΔTk at which the exhaust reopening angle θrbl included in the second imaginary control input V2 is calculated is also considerably longer than the repetition period ΔTn at which the first response index RI1 is calculated, so that for the same reason as described hereinabove, the second response index RI2 is calculated as a value indicative of the correlation between the exhaust reopening angle θrbl and the indicated mean effective pressure Pmi. More specifically, as the correlation between the exhaust reopening angle θrbl and the indicated mean effective pressure Pmi is higher, the absolute value of the second response index RI2 becomes larger, and as the correlation is lower, the absolute value thereof becomes closer to 0. Further, when the correlation between the exhaust reopening angle θrbl and the indicated mean effective pressure Pmi changes from one of a positive one and a negative one to the other, the sign of the second response index RI2 is inverted.

Furthermore, the reason for using the respective filtered values Sf1 and Sf2 of the first and second periodic signal values, and the filtered value Ymf of the imaginary controlled variable is as follows: As described hereinbefore, the repetition period ΔTk at which the intake opening angle θlin included in the first imaginary control input V1 is calculated is considerably longer than the repetition period ΔTn at which the imaginary control input V1 is calculated, and the intake opening angle θlin becomes a steady component, which can cause an error in the calculation of the first response index RI1. Therefore, to eliminate the intake opening angle θlin as a steady component from the imaginary controlled variable Ym, the imaginary controlled variable Ym is subjected to a high-pass filtering process to use the value Ymf obtained thereby, and to make the first periodic signal value S1 in phase with the value Ymf, the first periodic signal value S1 is subjected to the same high-pass filtering process to use the value Sf1 obtained thereby. Similarly, to eliminate the exhaust reopening angle θrbl as a steady component from the imaginary controlled variable Ym, the imaginary controlled variable Ym is subjected to a high-pass filtering process to use the value Ymf obtained thereby, and to make the second periodic signal in phase with the value Ymf, the second periodic signal value S2 is subjected to the same high-pass filtering process to use the value Sf2 obtained thereby. Further, to make the first response index RI1 and the second response index RI2 equal in gain, the response gain correction coefficients Kr1 and Kr2 are used.

Figure 18:
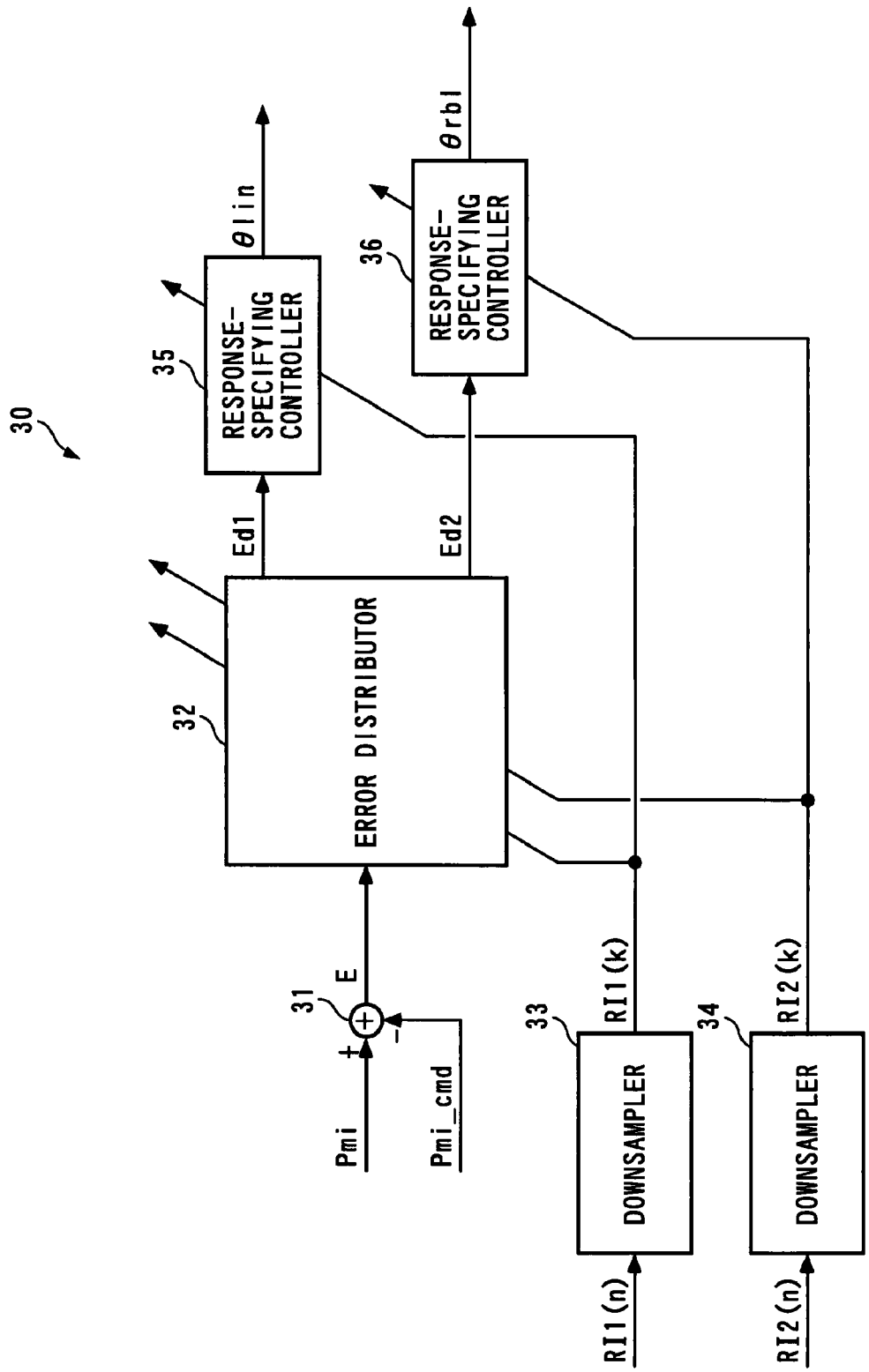
FIG. 18 is a schematic functional block diagram of a cooperative controller.

Next, a description will be given of the aforementioned cooperative controller 30. The cooperative controller 30 calculates the intake opening angle θlin and the exhaust reopening angle θrbl at the same control period ΔTk as the model corrector 60 operates. Referring to FIG. 18, the cooperative controller 30 is comprised of a subtractor 31, an error distributor 32, two downsamplers 33 and 34, and two response-specifying controllers 35 and 36.

The cooperative controller 30 calculates a follow-up error E using the subtractor 31 by the following equation (25):

$$E(k)=Pmi(k)-Pmi\_cmd(k) \quad (25)$$

On the other hand, the downsamplers 33 and 34 downsample the first and second response indices RI1(n) and RI2(n) calculated at the above-described control period ΔTn by the onboard model analyzer 40, at the control period ΔTk, to thereby calculate respective downsampled values RI1(k) and RI2(k) of the first and second response indices.

Then, the error distributor 32 calculates first and second distributed errors Ed1 and Ed2 using the following equations (26) and (27), respectively:

$$Ed1(k) = \frac{|RI1(k)|}{|RI1(k)| + |RI2(k)|} \cdot E(k) \quad (26)$$

$$Ed2(k) = \frac{|RI2(k)|}{|RI1(k)| + |RI2(k)|} \cdot E(k) \quad (27)$$

As shown in the equations (26) and (27), the first and second distributed errors Ed1 and Ed2 are calculated as values obtained by distribution of the follow-up error E according to the ratio of the absolute value |RI1| of the first response index and the absolute value |RI2| of the second response index. It should be noted that in a control process described hereinafter, the value of |RI1| is limited to a predetermined value (e.g. 0.01) close to 0 by a lower limit process so as to avoid the first distributed error Ed1 from becoming equal to 0 (Ed1=0) when RI1=0 holds. Similarly, the value of |RI2| as well is limited to a predetermined value (e.g. 0.01) close to 0 by the lower limit process so as to avoid the second distributed error Ed2 from becoming equal to 0 when RI2=0 holds.

Further, the response-specifying controller 35 calculates the intake opening angle θlin based on the first distributed error Ed1 and the first response index RI1 with a response-specifying control algorithm expressed by the following equations (28) to (32). That is, the intake opening angle θlin is calculated as a value which causes the first distributed error Ed1 to converge to 0.

$$\theta lin(k) = U1(k) = Urch1(k) + Uadp1(k) \quad (28)$$

$$Urch1(k) = -Krch1 \cdot \sigma1(k) \quad (29)$$

$$Uadp1(k) = -Kadp1 \cdot \sum_{j=0}^{k} \sigma1(j) \quad (30)$$

$$\sigma1(k) = Em1(k) + S \cdot Em1(k-1) \quad (31)$$

$$Em1(k) = \frac{RI1(k)}{RI1\_max} \cdot Ed1(k) \quad (32)$$

In the above equation (28), Urch1 represents a reaching law input, and is calculated using the equation (29). In the equation (29), Krch1 represents a predetermined reaching law gain, and σ1 represents a switching function calculated by the equation (31). In the equation (31), S represents a switching function-setting parameter set such that −1<S<0 holds, and Em1 represents a first follow-up error calculated by the equation (32). In the equation (32), RI1_max represents the maximum value which the absolute value |RI1| of the first response index can take during the control, and a value set in advance in offline is used as RI1_max. Further, in the equation (28), Uadp1 represents an adaptive law input, and is calculated by the equation (30). In the equation (30), Kadp1 represents a predetermined adaptive law gain. It should be noted that these gains Krch1 and Kadp1 are set to such values as will make the control system stable when the absolute value |RI1| of the first response index becomes equal to the maximum value RI1_max.

On the other hand, the response-specifying controller 36 calculates the exhaust reopening angle θrbl based on the second distributed error Ed2 and the second response index RI2 with a response-specifying control algorithm expressed by the following equations (33) to (37). That is, the exhaust reopening angle θrbl is calculated as a value which causes the second distributed error Ed2 to converge to 0.

$$\theta rbl(k) = U2(k) = Urch2(k) + Uadp2(k) \quad (33)$$

$$Urch2(k) = -Krch2 \cdot \sigma2(k) \quad (34)$$

$$Uadp2(k) = -Kadp2 \cdot \sum_{j=0}^{k} \sigma2(j) \quad (35)$$

$$\sigma2(k) = Em2(k) + S \cdot Em2(k-1) \quad (36)$$

$$Em2(k) = \frac{RI2(k)}{RI2\_max} \cdot ED2(k) \quad (37)$$

In the above equation (33), Urch2 represents a reaching law input, and is calculated by the equation (34). In the equation (34), Krch2 represents a predetermined reaching law gain, and σ2 represents a switching function calculated by the equation (36). In the equation (36), Em2 represents a second follow-up error calculated by the equation (37). In the equation (37), RI2_max represents the maximum value which the absolute value |RI2| of the second response index can take during the control, and a value set in advance in offline is used as RI2_max. Further, in the equation (33), Uadp2 represents an adaptive law input, and is calculated by the equation (35). In the equation (35), Kadp2 represents a predetermined adaptive law gain. It should be noted that these gains Krch2 and Kadp2 are set to such values as will make the control system stable when the absolute value |RI2| of the second response index becomes equal to the maximum value RI2_max.

As described above, the cooperative controller 30 calculates the intake opening angle θlin such that the intake opening angle θlin causes the first distributed error Ed1 to converge to 0, and calculates the exhaust reopening angle θrbl such that the exhaust reopening angle θrbl causes the second distributed error Ed2 to converge to 0, with the respective response-specifying control algorithms. As a result, the intake opening angle θlin and the exhaust reopening angle θrbl are calculated such that they cause the follow-up error E to converge to 0, in other words, such that they cause the indicated mean effective pressure Pmi to converge to its target value Pmi_cmd.

At this time, the first and second follow-up errors Em1 and Em2 used in the response-specifying control algorithms are calculated by multiplying the first and second distributed errors Ed1 and Ed2 by the values RI1/RI1_max and RI2/RI2_max, respectively, as shown in the equations (32) and (37), so that as the first response index RI1 becomes closer to its maximum value RI1_max, i.e. as the correlation between the intake opening angle θlin and the indicated mean effective pressure Pmi becomes higher, the increasing/decreasing rate of the intake opening angle θlin as a control input become larger. Similarly, as the second response index RI2 becomes closer to its maximum value RI2_max, i.e. as the correlation between the exhaust reopening angle θrbl and the indicated mean effective pressure Pmi becomes higher, the increasing/decreasing rate of the exhaust reopening angle θrbl as a control input become larger. As described above, even when the sensitivity, i.e. the correlation of the indicated mean effective pressure Pmi as a controlled variable associated with the intake opening angle θlin and the exhaust reopening angle θrbl as control inputs changes according to the values of the control inputs θlin and θrbl, it is possible to determine the increasing/decreasing rates of the control inputs θlin and θrbl according to the change in the correlation, thereby making it possible to control the controlled variable Pmi such that the controlled variable Pmi converges to its target value Pmi_cmd without causing any oscillating behavior or unstable behavior. That is, it is possible to ensure high-level stability of the control.

Further, the first and second follow-up errors Em1 and Em2 are calculated using the aforementioned equations (32) and (37), respectively, and hence when the signs of the first and second response indices RI1 and RI2 are inverted, the signs of the follow-up errors Em1 and Em2 are also inverted, whereby the increasing/decreasing directions of the intake opening angle θlin and the exhaust reopening angle θrbl as control inputs are inverted. More specifically, the increasing/decreasing directions are each inverted from an increasing one to a decreasing one, or from the decreasing one to the increasing one.

In this case, as described hereinabove, the first response index RI1 represents the correlation between the intake opening angle θlin and the indicated mean effective pressure Pmi, and when the correlation therebetween changes from one of the positive and negative correlations to the other, the sign of the first response index RI1 is inverted. Therefore, by inverting the increasing/decreasing direction of the intake opening angle θlin according to the change in the correlation, e.g. even when the indicated mean effective pressure Pmi happens to take its local maximum value along with the change in the intake opening angle θlin, and at the same time the target value Pmi_cmd of the indicated mean effective pressure is set to a value larger than its local maximum value, it is possible to hold the indicated mean effective pressure Pmi close to its local maximum value.

Similarly, the second response index RI2 represents the correlation between the exhaust reopening angle θrbl and the indicated mean effective pressure Pmi, and when the correlation therebetween changes from one of the positive and negative correlations to the other, the sign of the second response index RI2 is inverted. Therefore, in the case of the present embodiment where by inverting the increasing/decreasing direction of the exhaust reopening angle θrbl according to the change in the correlation, as described hereinabove, the indicated mean effective pressure Pmi takes its local maximum value as the exhaust reopening angle θrbl is varied, even when the target value Pmi_cmd of the indicated mean effective pressure is set to a value larger than its local maximum value, it is possible to hold the indicated mean effective pressure Pmi close to its local maximum value.

Further, the first and second distributed errors Ed1 and Ed2 are calculated as values obtained by distribution of the follow-up error E according to the ratio of the absolute value |RI1| of the first response index and the absolute value |RI2| of the second response index, and the intake opening angle θlin and the exhaust reopening angle θrbl are calculated such that they cause the first distributed error Ed1 and the second distributed error Ed2 to converge to 0, respectively. Accordingly, one of the intake opening angle θlin and the exhaust reopening angle θrbl associated with the larger one of the aforementioned ratios of the absolute values, i.e. one having a higher correlation with the indicated mean effective pressure Pmi, is set to a larger increasing/decreasing rate. As described above, one of the intake opening angle θlin and the exhaust reopening angle θrbl, which has a higher correlation with the indicated mean effective pressure Pmi, is set a larger increasing/decreasing rate, and the other, which has a lower correlation with the indicated mean effective pressure Pmi, is set to a smaller increasing/decreasing rate. This makes it possible to cause the indicated mean effective pressure Pmi to accurately converge to its target value Pmi_cmd while avoiding a mutual interaction between the intake opening angle θlin and the exhaust reopening angle θrbl.

Figure 19:
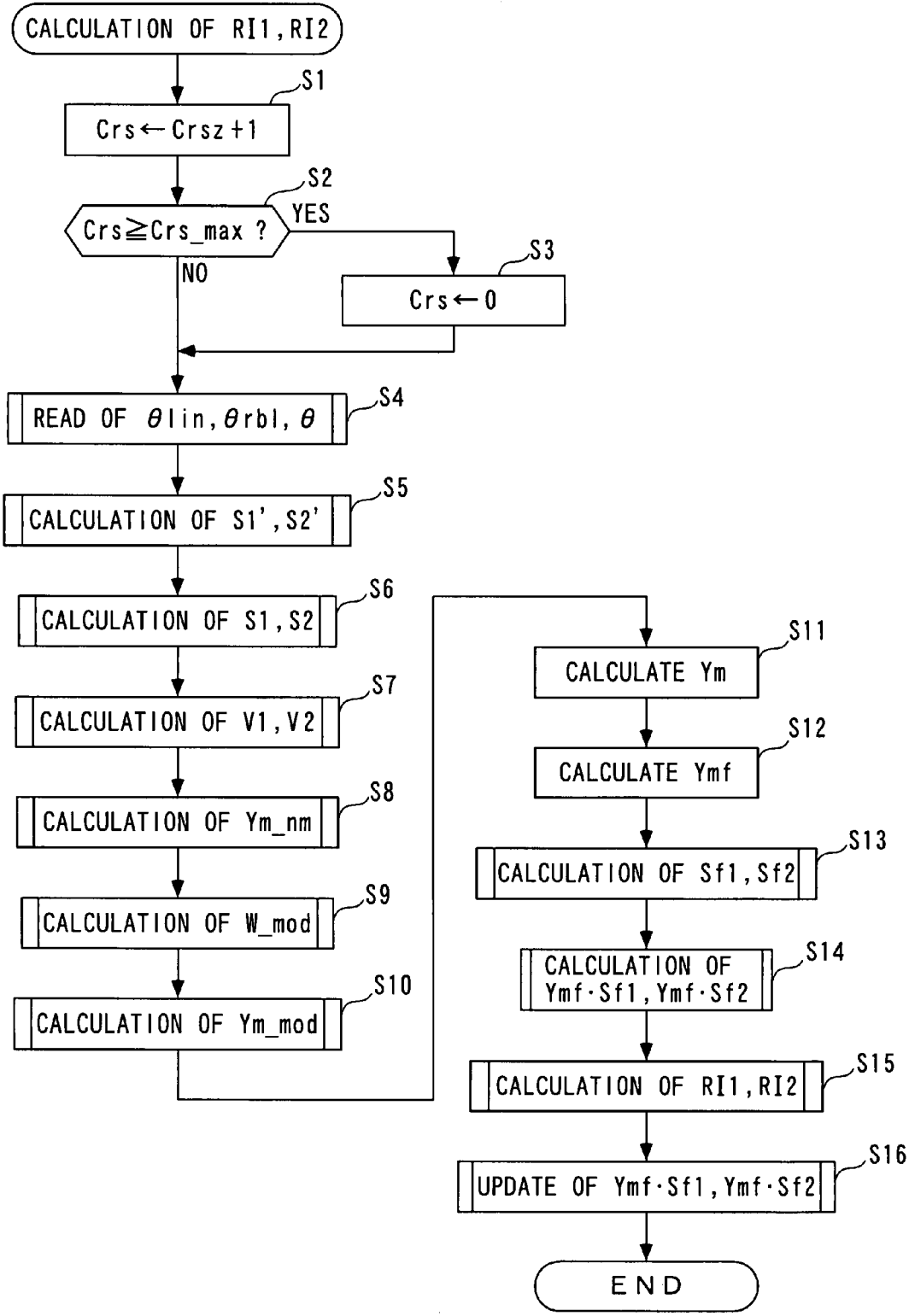
FIG. 19 is a flowchart of a process for calculating first and second response indices RI1 and RI2.

Next, a process for calculating the first and second response indices RI1 and RI2 executed by the ECU 2 will be described with reference to FIG. 19. This process corresponds to the calculation process by the onboard model analyzer 40, and is performed at the control period ΔTn.

In the process, first, in a step 1 (shown as S1 in abbreviated form in FIG. 11; the following steps are also shown in abbreviated form), the counter value Crs is set to a value (Crsz+1) obtained by adding 1 to the immediately preceding value Crsz thereof. That is, the counter value Crs is incremented by 1.

Then, the process proceeds to a step 2, wherein it is determined whether or not the counter value Crs calculated in the step 1 is not smaller than the maximum value Crs_max. If the answer to this question is negative (NO), the process immediately proceeds to a step 4. On the other hand, if the answer to this question is affirmative (YES), the counter value Crs is reset to 0 in a step 3, followed by the process proceeding to the step 4.

In the step 4 following the step 2 or 3, values of the intake opening angle θlin, the exhaust reopening angle θrbl, and the model correction parameter matrix θ stored in the RAM are read in. In this case, although these values θlin, θrbl, and θ are calculated at the aforementioned control period ΔTk, the step 4 is executed at the control period ΔTn shorter than the control period ΔTk. Therefore, the process executed in the step 4 corresponds to calculation of the respective oversampled values θlin(n), θrbl(n), and θ(n) of the intake opening angle θlin, the exhaust reopening angle θrbl, and the model correction parameter matrix θ, respectively.

Then, the process proceeds to a step 5, wherein the basic values S1' and S2' of the first and second periodic signal values are calculated by searching the map shown in FIG. 14, according to the counter value Crs.

After that, in a step 6, the first and second periodic signal values S1 and S2 are calculated using the aforementioned equations (12) and (13), respectively. Then, in a step 7, the first and second imaginary control inputs V1 and V2 are calculated using the aforementioned equations (14) and (15), respectively.

In the step 8 following the step 7, the first and second imaginary control inputs V1 and V2 calculated in the step 7 are input to the aforementioned controlled object model in FIG. 16, whereby the basic imaginary controlled variable Ym_nm is calculated. Then, the process proceeds to a step 9, wherein by searching the aforementioned map in FIG. 17 according to the first and second imaginary control inputs V1 and V2, the nonlinear weight function matrix W_mod is calculated.

Then, in the step 10, the model correction coefficient Ym_mod is calculated by using the aforementioned nonlinear weight function matrix W_mod and the model correction parameter matrix θ read in the step 4, by the aforementioned equation (18), and then the process proceeds to a step 11 wherein the imaginary controlled variable Ym is calculated by the aforementioned equation (19).

In the step 12 following the step 11, the filtered value Ymf of the imaginary controlled variable is calculated by the aforementioned equation (20), whereafter in a step 13, the filtered values Sf1 and Sf2 of the first and second periodic signal values are calculated using the aforementioned equations (21) and (22), respectively.

Then, the process proceeds to a step 14, wherein the two products Ymf·Sf1 and Ymf·Sf2 are calculated by multiplying the filtered value Ymf of the imaginary controlled variable, calculated in the step 12, by the respective filtered values Sf1 and Sf2 of the first and second periodic signal values, calculated in the step 13.

After that, in a step 15, the first and second response indices RI1 and RI2 are calculated using the two products Ymf·Sf1 and Ymf·Sf2 calculated in the step 14, and time-series data of hYmf·Sf1 and Ymf·Sf2 which were calculated in the immediately preceding and further preceding loops are stored in the RAM, by the aforementioned equations (23) and (24), respectively.

Then, the process proceeds to a step 16, wherein the time-series data of the hYmf·Sf1 and Ymf·Sf2 stored in the RAM are updated. More specifically, each value of the Ymf·Sf1 and Ymf·Sf2 in the RAM is set to the immediately preceding value thereof which is a value preceding by one control cycle (for example, the current value Ymf(n)·Sf1(n) is set to the immediately preceding value Ymf(n−1)·Sf1(n−1), and the immediately preceding value Ymf(n−1)·Sf1(n−1) is set to the second preceding value Ymf(n−2)·Sf1(n−2)), followed by terminating the present process Next, a description will be given of a process for calculating the model correction parameter matrix θ, which is executed by the ECU 2 at the control period ΔTk with reference to FIG. 20. This process corresponds to the aforementioned calculating process by the model corrector 60.

Figure 20:
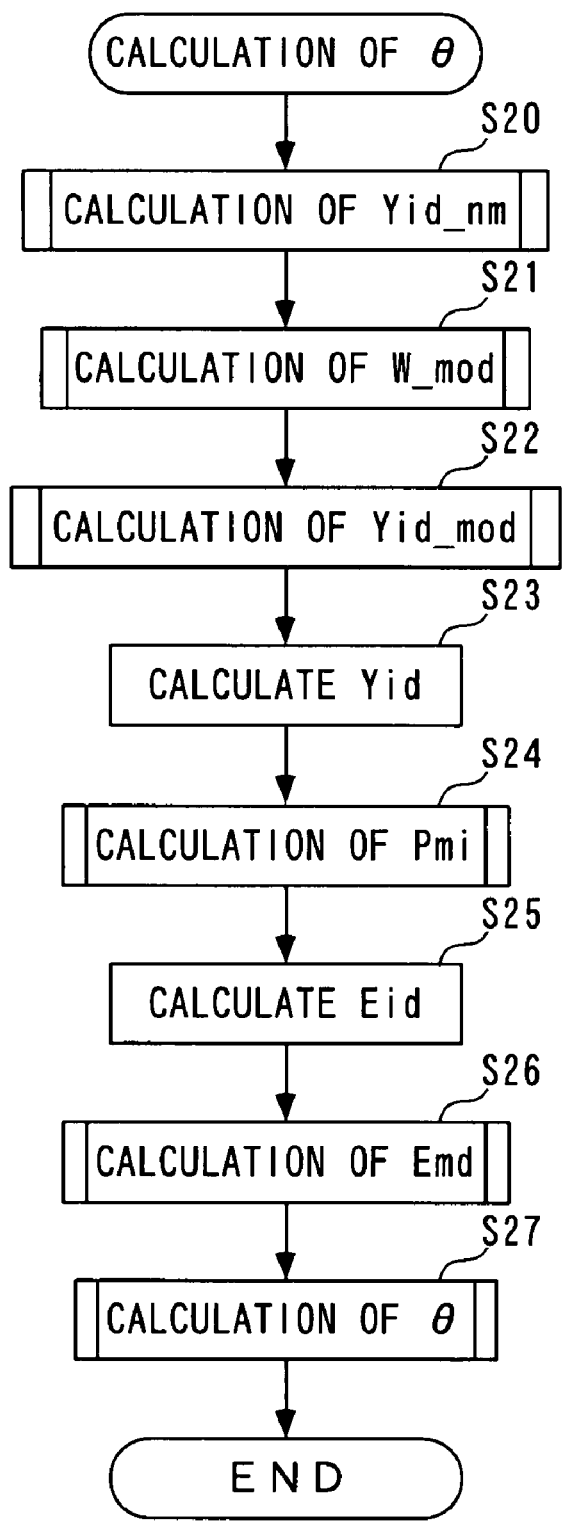
FIG. 20 is a flowchart showing a process for calculating a model correction parameter matrix $\theta$.

As shown in FIG. 20, in this process, first in a step 20, the basic estimated controlled variable Yid_nm is calculated by inputting the immediately preceding values θlin(k−1) of the intake opening angle and the immediately preceding value θrbl(k−1) of the exhaust reopening angle stored in the RAM to the controlled object model described with reference to FIG. 9.

Next, the process proceeds to a step 21, wherein by searching the aforementioned FIG. 10 map according to the immediately preceding values θlin(k−1) of the intake opening angle and the immediately preceding value θrbl(k−1) of the exhaust reopening angle, the nonlinear weight function matrix W_mod is calculated. Then, in a step 22, the model correction coefficient Yid_mod is calculated using the nonlinear weight function matrix W_mod and the immediately preceding value θ(k−1) of the model correction parameter matrix stored in the RAM by the aforementioned equation (3).

In a step 23 following the step 23, the corrected controlled variable Yid is calculated using the basic estimated controlled variable Yid_nm calculated in the step 20 and the model correction coefficient Yid_mod calculated in the step 22 by the aforementioned equation (4). Then, in a step 24, the indicated mean effective pressure Pmi is calculated based on the in-cylinder pressure sensor 24.

Then, the process proceeds to a step 25, wherein the estimation error Eid is calculated using the corrected estimated controlled variable Yid and the indicated mean effective pressure Pmi calculated in the respective steps 23 and 24, by the aforementioned equation (5). Then, in a step 26, the corrected estimation error matrix Emd is calculated using the nonlinear weight function matrix W_mod calculated in the step 21 and the estimation error Eid calculated in the step 25 by the aforementioned equation (6).

Next, the process proceeds to a step 26, wherein the model correction parameter matrix θ is calculated by aforementioned equations (7) to (11), followed by terminating the process.

Figure 21:
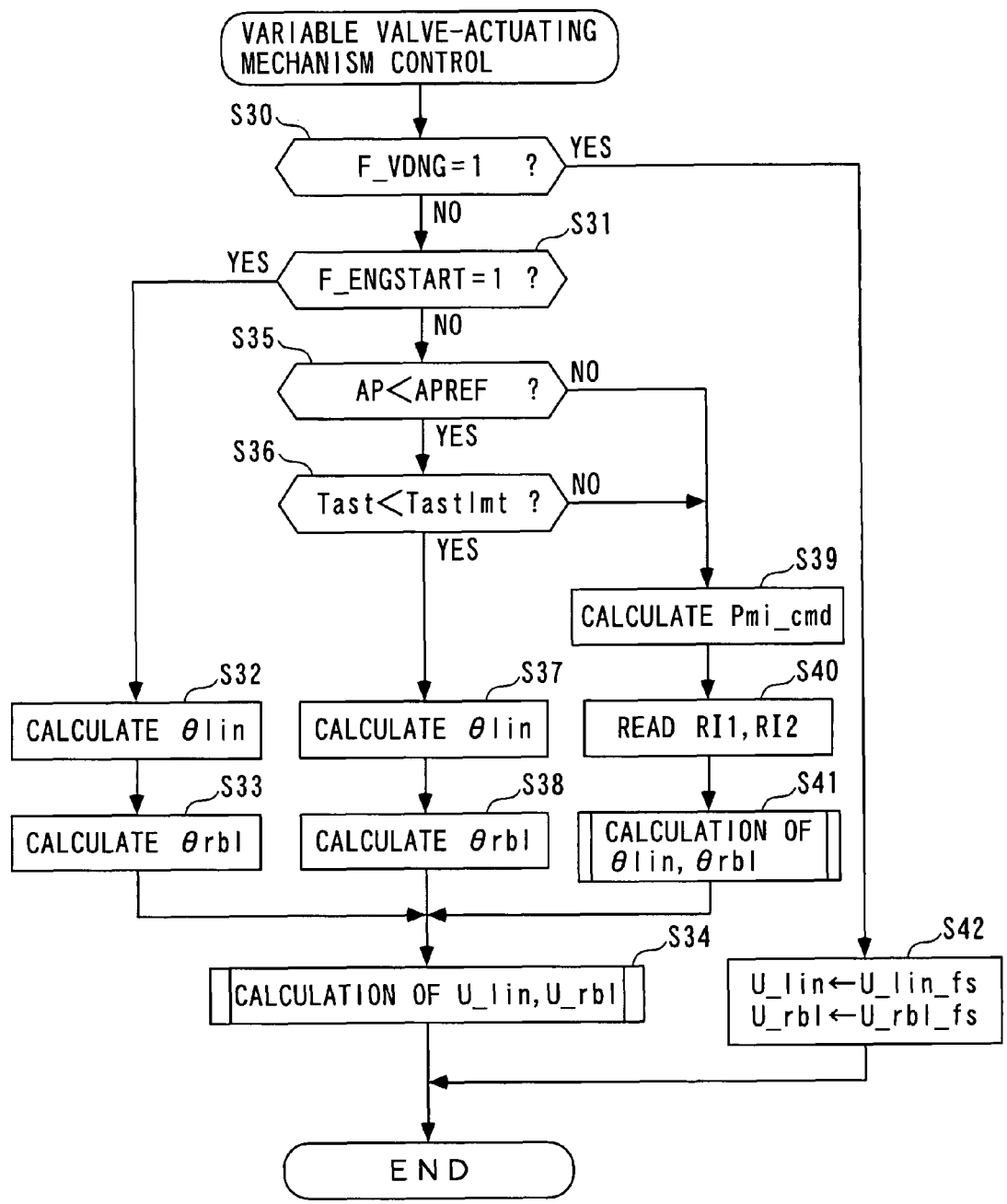
FIG. 21 is a flowchart of a control process for controlling the variable valve-actuating mechanisms.

Hereinafter, the control process of the variable valve-actuating mechanisms, which is carried out by the ECU 2 at the aforementioned control period ΔTk, will be described with reference to FIG. 21. The control process controls the variable intake valve-actuating mechanism 4 and the variable exhaust valve-actuating mechanism 5, to thereby control the indicated mean effective pressure Pmi, and includes steps corresponding to the calculation process performed by the cooperative controller 30. This process is carried out in succession to the process for calculating the model correction parameter matrix θ described above with reference to FIG. 20.

In this control process, first, in a step 30, it is determined whether or not a variable mechanism failure flag F_VDNG is equal to 1. In a determination process, not shown, the variable mechanism failure flag F_VDNG is set to 1 when it is determined that at least one of the variable mechanisms 4 and 5 is faulty, and to 0 when it is determined that the variable mechanisms 4 and 5 are both normal. If the answer to the above question is negative (NO), i.e. if the two variable mechanisms are both normal, the process proceeds to a step 21, wherein it is determined whether or not an engine start flag F_ENGSTART is equal to 1.

The above engine start flag F_ENGSTART is set by determining in a determination process, not shown, whether or not engine start control is being executed, i.e. the engine 3 is being cranked, based on the engine speed NE and the ON/OFF signal output from the IG·SW 26. More specifically, when the engine start control is being executed, the engine start flag F_ENGSTART is set to 1, and otherwise set to 0.

Figure 22:
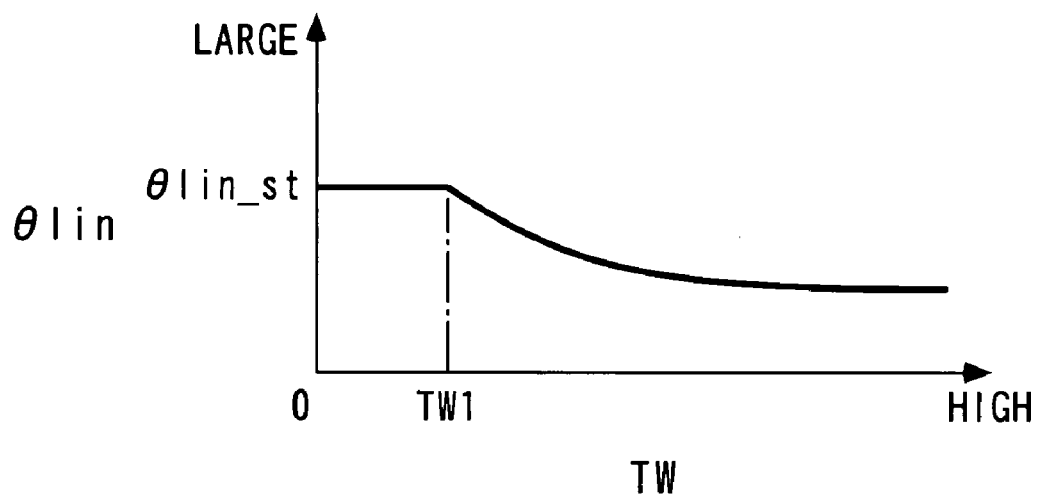
FIG. 22 is a view of an example of a map for use in the calculation of an intake opening angle $\theta lin$ during execution of engine start control.

If the answer to the question of the step 31 is affirmative (YES), i.e. if the engine start control is being executed, the process proceeds to a step 32, wherein the intake opening angle θlin is calculated by searching a map shown in FIG. 22, according to the engine coolant temperature TW.

In this map, in the range where the engine coolant temperature TW is higher than a predetermined value TW1, the intake opening angle θlin is set to a larger value as the engine coolant temperature TW is lower, and in the range where TW≦TW1 holds, the intake opening angle θlin is set to a predetermined value θlin_st. This is to compensate for an increase in friction of the engine 3, which is caused when the engine coolant temperature TW is low.

Figure 23:
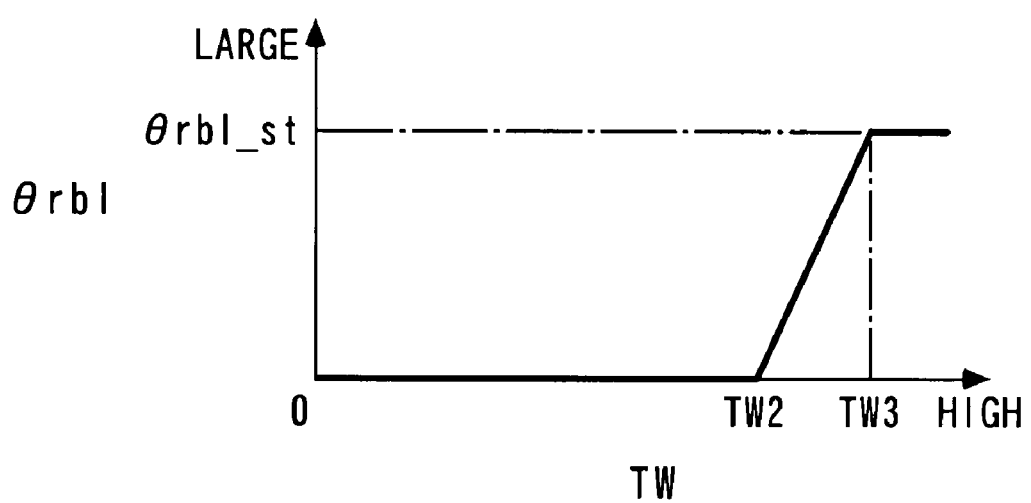
FIG. 23 is a view of an example of a map for use in the calculation of an exhaust reopening angle $\theta rbl$ during execution of the engine start control.

Then, the process proceeds to a step 33, wherein the exhaust reopening angle θrbl is calculated by searching a map shown in FIG. 23, according to the engine coolant temperature TW. In FIG. 23, TW2 and TW3 represent predetermined values of the engine coolant temperature TW which satisfy the relationship of TW2<TW3.

In this map, the exhaust reopening angle θrbl is set to 0 in the range where TW<TW2 holds, and in the range where TW2≦TW≦TW3 holds, the exhaust reopening angle θrbl is set to a larger value as the engine coolant temperature TW is lower, while in the range where TW3<TW holds, the exhaust reopening angle θrbl is set to the predetermined value θrbl1. This is to reopen the exhaust valve 5a during the intake stroke so as to start the engine 3 in the compression ignition combustion for enhancement of exhaust emission, when the engine 3 is restarted in a state where the engine coolant temperature TW is high.

Then, the process proceeds to a step 34, wherein a control input U_lin to the intake solenoid 4b is calculated based on the intake opening angle θlin calculated in the step 32, and a control input U_rbl to the exhaust solenoid 5b is calculated based on the exhaust reopening angle θrbl calculated in the step 33. Thus causes the intake valve 4a to open to the intake opening angle θlin, and the exhaust valve 5a to reopen to the exhaust reopening angle θrbl during the intake stroke as well, followed by terminating the present process.

On the other hand, if the answer to the question of the step 31 is negative (NO), i.e. if the engine start control is not being executed, the process proceeds to a step 35, wherein it is determined whether or not the accelerator pedal opening AP is smaller than a predetermined value APREF. With reference to the predetermined value APREF, it is determined whether the accelerator pedal is not stepped on, and is set to a value (e.g. 1°) so as to enable determination that the accelerator pedal is not stepped on.

If the answer to this question is affirmative (YES), i.e. if the accelerator pedal is not stepped on, the process proceeds to a step 36, wherein it is determined whether or not the count Tast of an after-start timer is smaller than a predetermined value Tastlmt. The after-start timer counts time elapsed after the termination of the engine start control, and is implemented by an up-count timer.

Figure 24:
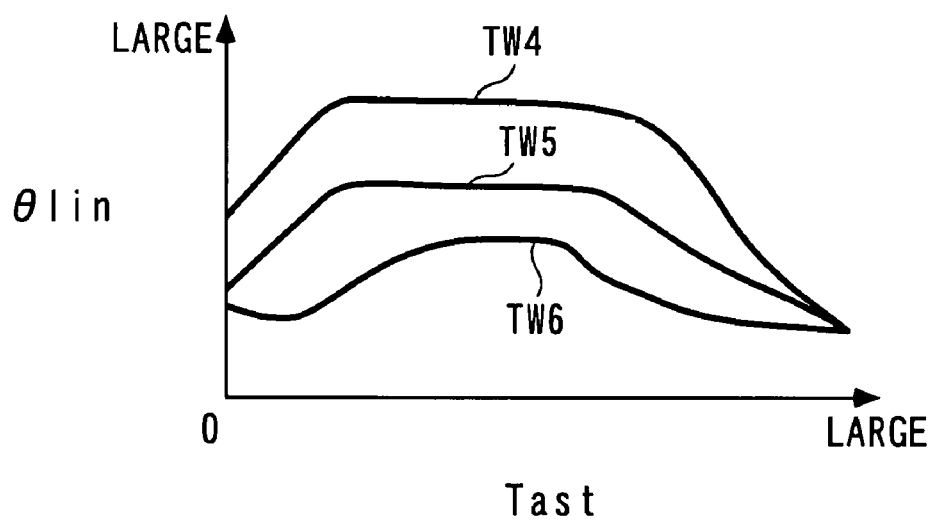
FIG. 24 is a view of an example of a map for use in the calculation of the intake opening angle $\theta lin$ during execution of catalyst warmup control.

If the answer to this question is affirmative (YES), i.e. if Tast<Tastlmt holds, it is judged that the catalyst warmup control should be executed, and the process proceeds to a step 37, wherein the intake opening angle θlin is calculated by searching a map shown in FIG. 24, according to the count Tast of the after-start timer for the catalyst warmup control and the engine coolant temperature TW. In FIG. 24, TW4 to TW6 represent predetermined values of the engine coolant temperature TW, which satisfy the relationship of TW4<TW5<TW6.

In this map, the intake opening angle θlin is set to a larger value as the engine coolant temperature TW is lower. This is because as the engine coolant temperature TW is lower, it takes a longer time period to activate the catalyst, and hence the volume of exhaust gasses is increased to shorten the time period required for activation of the catalyst.

Figure 25:
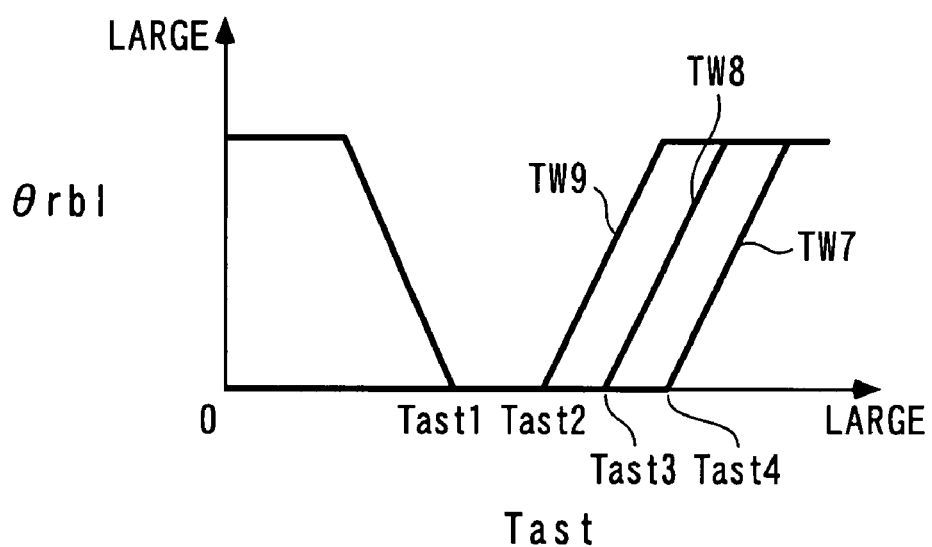
FIG. 25 is a view of an example of a map for use in the calculation of the exhaust reopening angle $\theta rbl$ during execution of the catalyst warmup control.

Next, in a step 38, the exhaust reopening angle θrbl is calculated by searching a map shown in FIG. 25, according to the count Tast of the after-start timer and the engine coolant temperature TW. In FIG. 25, TW7 to TW9 represent predetermined values of the engine coolant temperature TW, which satisfy the relationship of TW7<TW8<TW9, and Tast1 to Tast4 represent predetermined values of the count Tast of the after-start timer, which satisfy the relationship of Tast1<Tast2<Tast3<Tast4.

In this map, the exhaust reopening angle θrbl is set to 0 when the count Tast of the after-start timer is within a predetermined range (between Tast1 and Tast2, between Tast1 and Tast3, or between Tast1 and Tast4), whereas when the count Tast exceeds the predetermined range, the exhaust reopening angle θrbl is set to a larger value as the count Tast is larger. This is for the following reason: During the compression ignition combustion operation, combustion efficiency becomes higher than during the spark ignition combustion operation, and the heat energy of exhaust gases is lower. Therefore, the engine 3 is operated in the spark ignition combustion at the start of the catalyst warmup control, and hence the valve-reopening operation for reopening the exhaust valve 5a during the intake stroke is stopped, and in accordance with the progress of the catalyst warmup control, the reopening operation is restarted during the intake stroke so as to restore the engine 3 from the spark ignition combustion operation to the compression ignition combustion operation. Further, the range where the exhaust reopening angle θrbl is set to 0 is set to be larger as the engine coolant temperature TW is lower. This is because as the engine coolant temperature TW is lower, the temperature of exhaust gases becomes lower, whereby it takes a longer time period to warm up the catalyst.

Then, the step 34 is carried out as described above, followed by terminating the present process.

Figure 26:
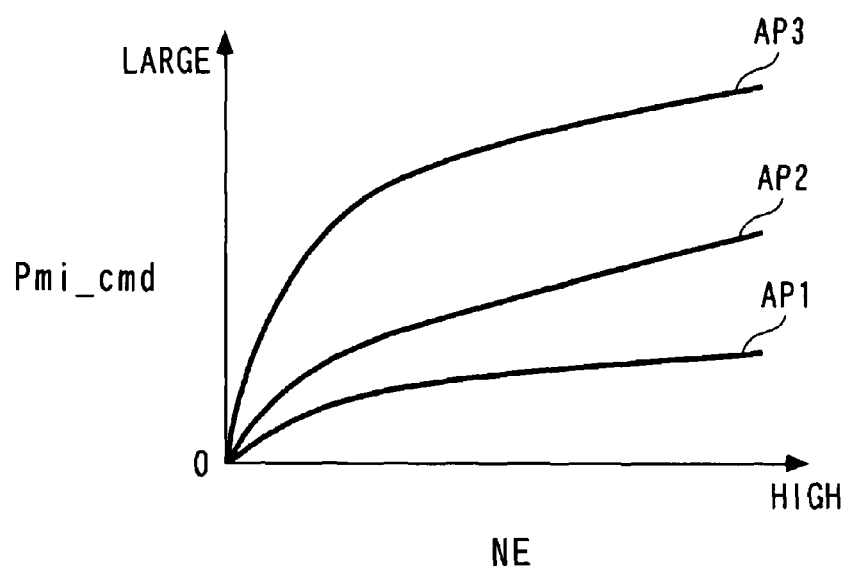
FIG. 26 is a view of an example of a map for use in the calculation of a target value Pmi_cmd of the indicated mean effective pressure during execution of normal control.

On the other hand, if the answer to the question of the step 35 or 36 is negative (NO), i.e. if the accelerator pedal is stepped on, or if Tast≧Tastlmt holds, the process proceeds to a step 39, wherein the target value Pmi_cmd of the indicated mean effective pressure is calculated by searching a map shown in FIG. 26, according to the engine speed NE and the accelerator pedal opening AP. In FIG. 26, AP1 to AP3 represent predetermined values of the accelerator pedal opening AP, which satisfy the relationship of AP1<AP2<AP3.

In this map, the target value Pmi_cmd of the indicated mean effective pressure is set to a larger value as the engine speed NE is higher or as the accelerator pedal opening AP is larger. This is because as the engine speed NE is higher or the accelerator pedal opening AP is larger, the torque demanded of the engine 3 for generation becomes larger.

Then, the process proceeds to a step 40, wherein the values of the first and second response indices RI1 and RI2, stored in the RAM, are read in. In this case, as described hereinbefore, the first and second response indices RI1 and RI2 are calculated at the control period ΔTn shorter than the control period ΔTk of the present process, so that the process performed in the step 40 corresponds to calculation of the downsampled values RI1($k$) and RI2($k$) of the first and second response indices RI1 and RI2.

In a step 41 following the step 40, the intake opening angle θlin is calculated using the aforementioned equations (25), (26), and (28) to (32), and the exhaust reopening angle θrbl is calculated using the aforementioned equations (25), (27), and (33) to (37). In doing this, to avoid the first distributed error Ed1 from becoming equal to 0 when RI1=0 holds, the value of |RI2| in the equation (26) is limited to a predetermined value (e.g. 0.01) close to 0 by lower limit processing. Similarly, the value of |RI2| in the equation (27) is also limited to a predetermined value (e.g. 0.01) close to 0 by lower limit processing so as to avoid the second distributed error Ed2 from becoming equal to 0 when RI2=0 holds. Then, the step 34 is executed, as described above, followed by terminating the present process.

On the other hand, if the answer to the question of the step 30 is affirmative (YES), i.e. if at least one of the two variable valve-actuating mechanisms 4 and 5 is faulty, the process proceeds to a step 42, wherein the control inputs U_lin and U_rbl to the intake solenoid 4b and the exhaust solenoid 5b are set to predetermined failure-time values U_lin_fs and U_rbl_fs, respectively, followed by terminating the present process. This causes idling or starting of the engine 3 to be appropriately performed during stoppage of the vehicle, and a low-speed traveling condition to be maintained during travel of the vehicle.

As described hereinbefore, according to the control apparatus 1 of the present embodiment, the onboard model analyzer 40 calculates the first response index RI1 as a value indicative of the correlation between the intake opening angle θlin and the indicated mean effective pressure Pmi. More specifically, as the correlation therebetween is higher, the absolute value of the first response index RI1 becomes larger, and when the correlation therebetween changes from one of the positive and negative correlations to the other, the sign of the first response index RI1 is inverted. Similarly, the second response index RI2 is calculated as a value indicative of the correlation between the exhaust reopening angle θrbl and the indicated mean effective pressure Pmi. More specifically, as the correlation therebetween is higher, the absolute value of the second response index RI2 becomes larger, and when the correlation therebetween changes from one of the positive and negative correlations to the other, the sign of the second response index RI2 is inverted.

On the other hand, the cooperative controller 30 calculates the intake opening angle θlin and the exhaust reopening angle θrbl with the response-specifying control algorithms such that the indicated mean effective pressure Pmi is caused to converge to its target value Pmi_cmd. At this time, the first and second follow-up errors Em1 and Em2 used in the response-specifying control algorithms are calculated by multiplying the first and second distributed errors Ed1 and Ed2 by the values RI1/RI1_max and RI2/RI2_max, respectively, so that as the first response index RI1 becomes closer to its maximum value RI1_max, i.e. as the correlation between the intake opening angle θlin and the indicated mean effective pressure Pmi becomes higher, the rate of increase/decrease in the intake opening angle θlin as a control input become larger. Similarly, as the second response index RI2 becomes closer to its maximum value RI2_max, i.e. as the correlation between the exhaust reopening angle θrbl and the indicated mean effective pressure Pmi becomes higher, the rate of increase/decrease in the exhaust reopening angle θrbl as a control input become larger. As described above, even when the sensitivity, i.e. the correlation of the indicated mean effective pressure Pmi as a controlled variable to the intake opening angle θlin and the exhaust reopening angle θrbl as control inputs changes according to the values of the control inputs θlin and θrbl, it is possible to determine the increasing/decreasing rates of the control inputs θlin and θrbl according to the changes in the correlation, thereby making it possible to control the controlled variable Pmi such that the controlled variable Pmi converges to its target value Pmi_cmd without causing any oscillating behavior or unstable behavior. That is, it is possible to ensure high-level stability of control.

Further, the first and second follow-up errors Em1 and Em2 are calculated using the aforementioned equations (32) and (37), respectively, and hence when the signs of the first and second response indices RI1 and RI2 are inverted, the signs of the follow-up errors Em1 and Em2 are also inverted, whereby the increasing/decreasing directions of the intake opening angle θlin and the exhaust reopening angle θrbl as control inputs are inverted. More specifically, each increasing/decreasing direction is inverted from the increasing direction to the decreasing direction, or from the decreasing direction to the increasing direction.

Therefore, in the case where when the indicated mean effective pressure Pmi takes its local maximum value as the exhaust reopening angle θrbl is varied, as in the present embodiment, even when the target value Pmi_cmd of the indicated mean effective pressure is set to a value larger than its local maximum value, it is possible to hold the indicated mean effective pressure Pmi close to its local maximum value. That is, even when the controlled object having extremal characteristics is controlled, it is possible to ensure both high-level stability and accuracy of control.

Further, the first and second distributed errors Ed1 and Ed2 are calculated as values obtained by distribution of the follow-up error E according to the ratio of the absolute value |RI1| of the first response index and the absolute value |RI2| of the second response index, and the intake opening angle θlin and the exhaust reopening angle θrbl are calculated as values which cause the first distributed error Ed1 and the second distributed error Ed2 to converge to 0, respectively. Accordingly, one of the intake opening angle θlin and the exhaust reopening angle θrbl, which has a larger absolute value, i.e. a higher correlation with the indicated mean effective pressure Pmi, is set to be larger in the increasing/decreasing rate. As described above, one of the intake opening angle θlin and the exhaust reopening angle θrbl, which has a higher correlation with the indicated mean effective pressure Pmi, is set to be larger in the increasing/decreasing rate, and the other, which has a lower correlation with the indicated mean effective pressure Pmi, is set to be smaller in the increasing/decreasing rate. This makes it possible to cause the indicated mean effective pressure Pmi to accurately converge to its target value Pmi_cmd while avoiding a mutual interaction between the intake opening angle θlin and the exhaust reopening angle θrbl as control inputs, and causing the two control inputs to cooperate with each other. That is, it is possible to ensure both high-level stability and accuracy of control even when a controlled object of the multi-input multi-output system is controlled.

Further, the model corrector 60 calculates the model correction parameter matrix θ, onboard, such that the controlled object model in FIG. 9 matches actual characteristics of the controlled object. Further, the imaginary controlled variable-calculating section 48 of the onboard model analyzer 40 corrects the controlled object model in FIG. 16 which is substantially the same as the controlled object model in FIG. 9, using the model correction parameter matrix θ calculated as described above, onboard, such that it matches the actual characteristics of the controlled object, and hence even when the modeling error occurs due to variation between individual products of the engine 3 and the aging of the same, it is possible to quickly accommodate the modeling error, and increase the accuracy of calculation of the first and second response indices RI1 and RI2.

Further, elements θij of the model correction parameter matrix θ are set in a manner associated with a plurality of regions defined by combinations of three consecutive values of the intake opening angle θlin_i and three consecutive values of the exhaust reopening angle θrbl_j, and only elements θij associated with regions where the combination of two values θlin(k−1) and θrbl(k−1) exists are calculated with a sliding mode control algorithm shown in the equations (7) to (11), as described above, such that the estimation error Eid converges to 0 (more specifically such that the corrected estimated controlled variable Yid converges to the indicated mean effective pressure Pmi), and the other elements θij are calculated as 0. Therefore, Even when the modeling error is different between a plurality of regions, it is possible to correct the controlled object model on a region-by-region basis using the model correction parameter matrix θ. As a result, even in the case of the controlled object, such as the engine 3, in which the controlled object model cannot be expressed using a recurrence formula, when a modeling error occurs due to individual units of the controlled object and aging of the same, it is possible to compensate for the modeling error, and improve the robustness of the control apparatus against the modeling error.

In addition, the model correction parameter matrix θ is calculated with a sliding mode control algorithm, and hence even in the case of the controlled object the controlled object model of which cannot be expressed using a recurrence formula, as in the case of the engine 3, it is possible to calculate the model correction parameter matrix θ as a value that does not cause an unstable behavior, such as an oscillating behavior or overshooting. Further, using the model correction parameter matrix θ thus calculated, it is possible to control the engine 3 while correcting the controlled object model onboard. As a result, it is possible to prevent the transient response of the control system from becoming oscillatory or unstable, and improve the control accuracy during a transition period.

Further, the controlled object mode is corrected by the model correction coefficient Ym_mod, and the model correction coefficient Ym_mod is calculated by adding the basic value Ym_base to the sum of the products of corresponding elements of the model correction parameter matrix θ and the nonlinear weight function matrix W_mod. The nonlinear weight functions Wij as the elements of the nonlinear weight function matrix W_mod have characteristics that with respect to the first and second imaginary control inputs V1 and V2 in a plurality of regions, they take each the maximum value of 1, in the center or its vicinity of each of the associated regions, and take a value of 0 outside the regions, and are set such that each two of the nonlinear weight functions Wij in respective overlapping portions of the regions intersect with each other, in portions where they change in a planar fashion. Therefore, when the model correction coefficient Ym_mod corrects the controlled object model, it can correct the same continuously over a plurality of regions of the first and second imaginary control inputs V1 and V2, whereby the corrected controlled object model no longer has discontinued points. This makes it possible to prevent the transient response of the control system from becoming temporarily unstable due to the discontinued points of the controlled object model, and further improve the control accuracy during the transient time.

Further, in the sliding mode control algorithm used in the calculation of the model correction parameter matrix $\theta$, the immediately preceding value $\theta adp(k-1)$ of the adaptive law input matrix is multiplied by the forgetting coefficient $\lambda$ in the equation (10) for calculating the adaptive law input matrix $\theta adp$, and hence at the time point where each element of the corrected estimation error matrix Emd converges to approximately 0, each element of the adaptive law input matrix $\theta adp$ converges to approximately 0. As a result, it is possible to prevent the estimation error of the model correction parameter matrix $\theta$ from remaining, whereby the model correction parameter matrix $\theta$ can be calculated as appropriate values, and the stability of the control system can be improved.

Further, as described hereinabove, it is possible to cause the indicated mean effective pressure Pmi to accurately converge to the target value Pmi_cmd while suppressing interaction between the intake opening angle $\theta$lin and the exhaust reopening angle $\theta$rbl and causing the control inputs thereto to cooperate with each other. This makes it unnecessary to carry out preparation of a control program using a large number of setting conditions or setting of data, and hence reduce time taken to develop the engine 3. In addition, for the same reason, it is possible to avoid bugs or configuration errors caused by an increase in the volume of the control program and data to be set, to thereby improve the accuracy of preparation of the control program and reduce time taken to prepare the control program.

Although in the first embodiment the response-specifying control algorithm shown in the equations (28) to (37) is used for the predetermined first algorithm, by way of example, the predetermined first algorithm according to the present invention is not limited to this, but any suitable algorithm may be used insofar as it is capable of causing the controlled variable of the controlled object to converge to the target value, and determining the increasing/decreasing rate and/or the increasing/decreasing direction of the control input according to the correlation parameters. For example, as the predetermined first control algorithm, a general feedback control algorithm such as a PID control algorithm, may be used.

Further, although in the first embodiment, the sliding mode control algorithm shown in the equations (7) to (11) is used for the predetermined second control algorithm, by way of example, the predetermined second control algorithm according to the present embodiment is not limited to this, but any suitable algorithm may be used insofar as it is capable of calculating the correction parameter such that the controlled variable of the controlled object model matches the controlled variable of the controlled object. For example, for the predetermined second control algorithm, there may used a general feedback control algorithm, such as a PID control algorithm, or a response-specifying control algorithm, such as a back-stepping control algorithm, other than the sliding mode control algorithm.

Further, although in the first embodiment, as the plurality of functions which are multiplied by the plurality of correction parameters according to the present invention, the nonlinear weight functions Wij are used, by way of example, the values of which change on inclined surfaces of square pyramids associated with a plurality of regions divided by combinations of the intake opening angle $\theta$lin and the exhaust reopening angle $\theta$rbl, the plurality of functions in the present invention are not limited to this, but functions having characteristics that they take the maximum value in the center or in its vicinity of each of a plurality of regions, and change in a planar fashion or in a curviplanar fashion, and ones of the functions corresponding to two overlapping regions intersect with each other, in portions where they change in a planar fashion or in a curviplanar fashion. More preferably, there may be used ones in which the sum of values of two functions at overlapping portions takes a value equal to the maximum value, or ones in which for any combination of the intake opening angle $\theta$lin and the exhaust reopening angle $\theta$rbl, the sum of the values of two functions corresponding thereto takes a value equal to the maximum value.

For example, there may be used functions which are configured such that they continuously change on four side surfaces of a square pyramid with respect to the two values $\theta$lin and $\theta$rbl, or functions which are configured such that they continuously change on four inclined surfaces of a hexahedron which divergently extend from the four inclined surfaces of the square pyramid. Further, there may be used functions the values of which change on curved surfaces with respect to the two values $\theta$lin and $\theta$rbl.

Further, in the first embodiment, the plurality of functions the maximum value of which is set to 1 are used, by way of example, this is not limitative, but there by may be used ones the maximum value of which is set to a value larger than 1 or is set to a value smaller than 1.

Further, in the first embodiment, as the map for calculating the nonlinear weight functions Wij, there is used, by way of example, one shown in FIG. 10 in which the plurality of regions are defined by equally dividing the range within which are variable the intake opening angle $\theta$lin and the exhaust reopening angle $\theta$rbl, this is not limitative, but as the map for calculating nonlinear weight functions Wij, there may be used one in which a plurality of regions are defined by unequally dividing the range within which are variable the intake opening angle $\theta$lin and the exhaust reopening angle $\theta$rbl. In this case, it is only required to use a map in which a plurality of regions are equal in area, and which is configured such that a total of the values of two functions in overlapping portions of two adjacent ones of the nonlinear weight functions Wij is equal to 1.

On the other hand, although in the first embodiment, the first and second response indices RI1 and RI2 are used as the correlation parameters, by way of example, the correlation parameters are not limited to these, but they are only required to represent a control input and a controlled variable in the controlled object model. For example, the response indices RI1 and RI2 as the correlation parameters may be calculated by multiplying a filtered value Ymf of the controlled variable by filtered values Sf1 and Sf2 of two periodic signal values to thereby calculate time-series data of (h+1) products Ymf·Sf1 and Ymf·Sf2, and multiplying the moving average value of the time-series data by the response gain correction coefficients Kr1 and Kr2.

Further, although in the first embodiment, the control apparatus 1 according to the present invention is applied to the engine 3 as the controlled object, by way of example, this is not limitative, but the control apparatus according to the present invention may be applied to various industrial apparatuses, particularly to ones having extremal characteristics, and even to ones the controlled object model of which cannot be expressed by recurrence formulas, i.e. a discrete-time system model.

Further, although in the first embodiment, the controlled object models in FIGS. 6, 9, and 16 are used as the controlled object model, by way of example, this is not limitative, but the control apparatus according to the present invention can employ various controlled object models which cannot be expressed using recurrence formulas.

Next, a control apparatus 1A according to a second embodiment of the present invention will be described with reference to FIGS. 27 to 36. The control apparatus 1A is distinguished from the control system according to the first embodiment only in the configuration of the method of controlling the indicated mean effective pressure Pmi, and hereinafter, the description will be given of the different points.

Figure 27:
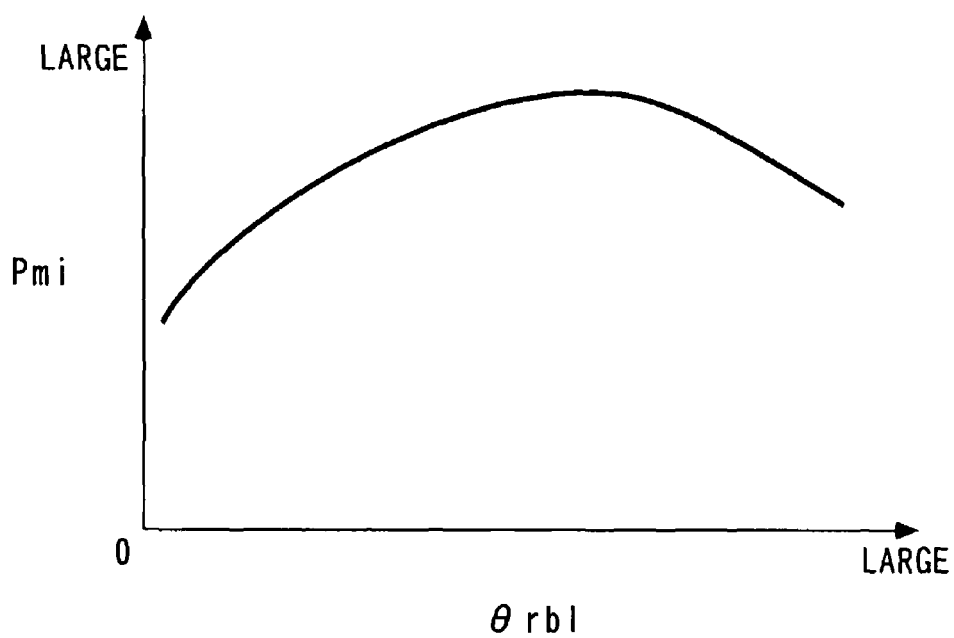
FIG. 27 is a diagram of a controlled object model used in a control apparatus according to a second embodiment of the present invention.

The control apparatus 1A controls the indicated mean effective pressure Pmi only by the exhaust reopening angle θrbl in a state where the intake opening angle θlin is held constant, e.g. when the engine 3 is in a steady operating condition. To this end, the control apparatus 1A uses a controlled object model shown in FIG. 27, in place of the controlled object model according to the first embodiment shown in FIG. 6. As shown in FIG. 27, the controlled object model is configured such that the indicated mean effective pressure Pmi takes the local maximum value with respect to an increase/decrease of the exhaust reopening angle θrbl. The reason for the configuration is the same as described in the explanation given with reference to FIG. 6.

Figure 28:
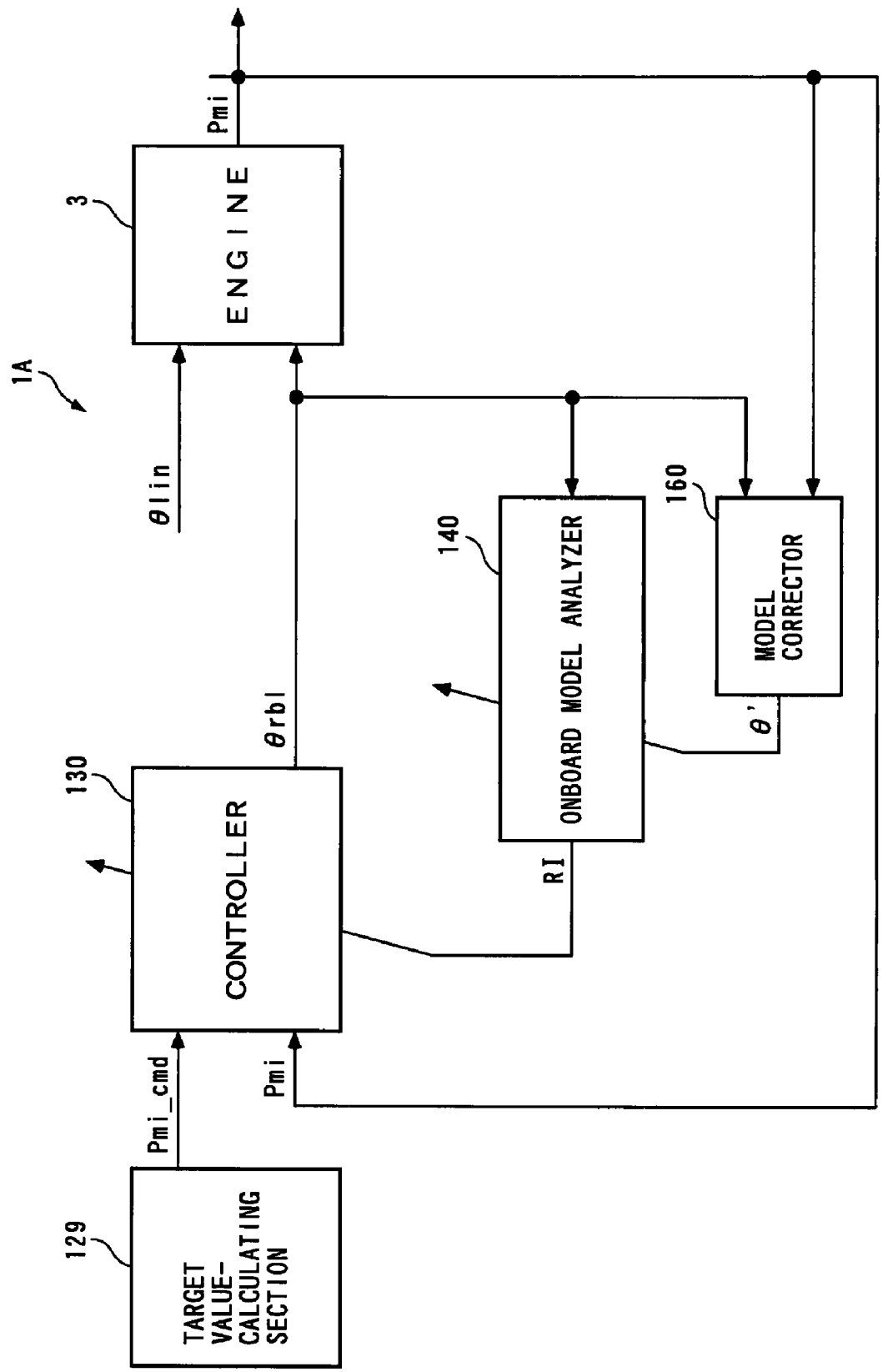
FIG. 28 is a schematic block diagram of the control apparatus according to the present embodiment.

Referring to FIG. 28, the control apparatus 1A is comprised of a target value-calculating section 129, a controller 130, an onboard model analyzer 140, and a model corrector 160 all of which are implemented by the ECU 2.

Similarly to the aforementioned target value-calculating section 29, the target value-calculating section 129 calculates a target value Pmi_cmd of the indicated mean effective pressure by searching the aforementioned map shown in FIG. 26 according to the engine speed NE and the accelerator pedal opening AP. It should be noted that in the present embodiment, the target value-calculating section 129 corresponds to the target value-calculating means.

Further, the controller 130 calculates the exhaust reopening angle θrbl using the response index RI calculated by the onboard model analyzer 140, as described hereinafter, such that the indicated mean effective pressure Pmi is caused to converge to its target value Pmi_cmd. It should be noted that in the present embodiment, the controller 130 corresponds to the control input-calculating means.

Further, as described hereinafter, the onboard model analyzer 140 calculates the response index RI using the exhaust reopening angle θrbl calculated by the controller 130, a model correction parameter vector θ' calculated by the model corrector 160, and the above-described controlled object model. It should be noted that in the present embodiment, the onboard model analyzer 140 corresponds to the correlation parameter-calculating means, and the model corrector means, and the response index RI corresponds to a correlation parameter.

On the other hand, the model corrector 160 calculates the model correction parameter vector θ', as described hereinafter. The model correction parameter vector θ' is defined as a matrix vector of the elements of (J+1) model correction parameters θj (j=0 to J), by the following equation (38):

$$\theta'(k)=[\theta 0(k) \ldots \theta g(k) \ldots \theta J(k)] \quad (38)$$

It should be noted that in the present embodiment, the model corrector 160 corresponds to the model corrector means, and the model correction parameter θj to the plurality of correction parameter.

Figure 29:
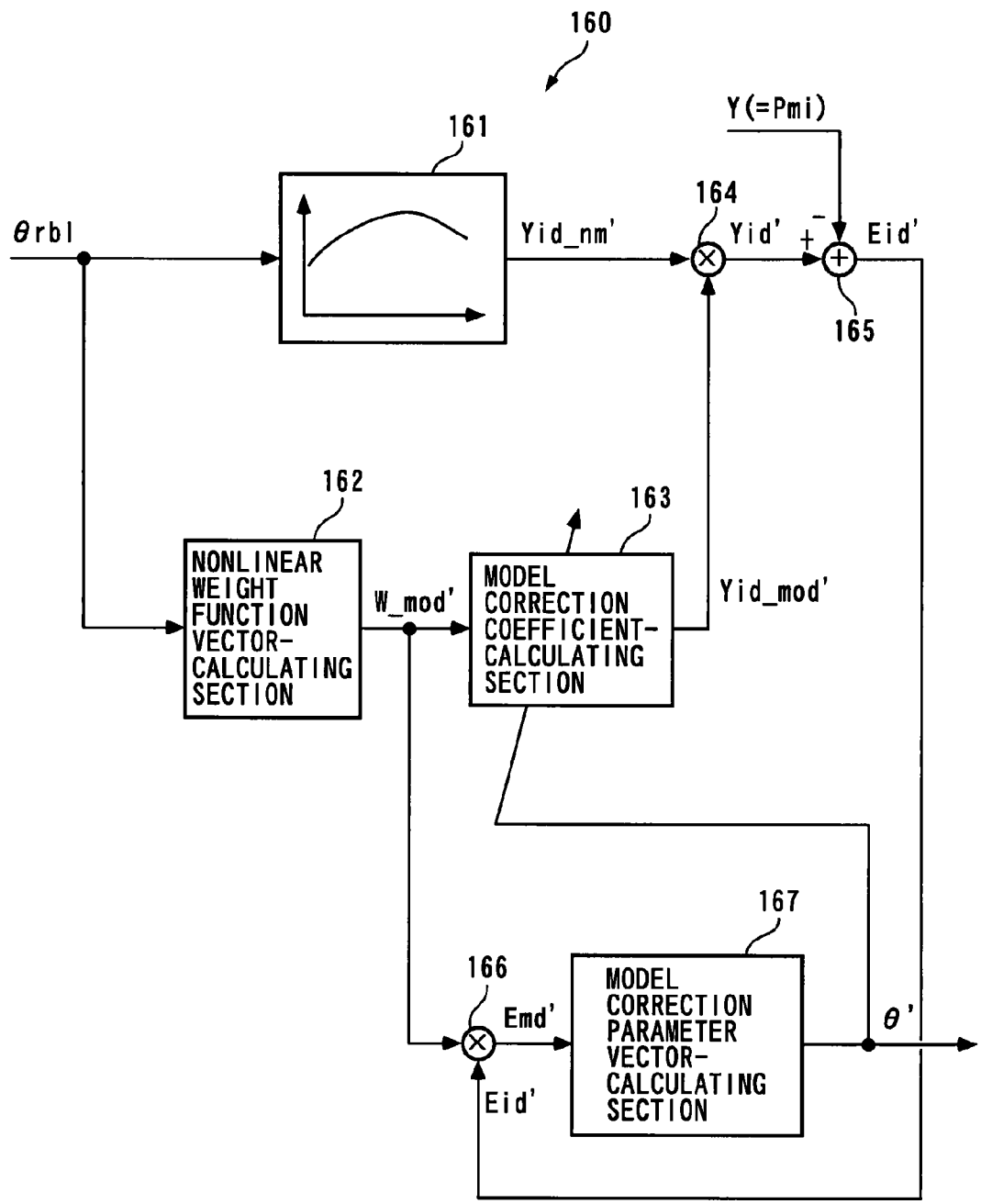
FIG. 29 is a schematic block diagram of a model corrector.

Referring to FIG. 29, the model corrector 160 is comprises of a basic estimated controlled variable-calculating section 161, a nonlinear weight function vector-calculating section 162, model correction coefficient-calculating section 163, two multipliers 164 and 166, a subtractor 165, and a model correction parameter vector-calculating section 167.

Figure 30:
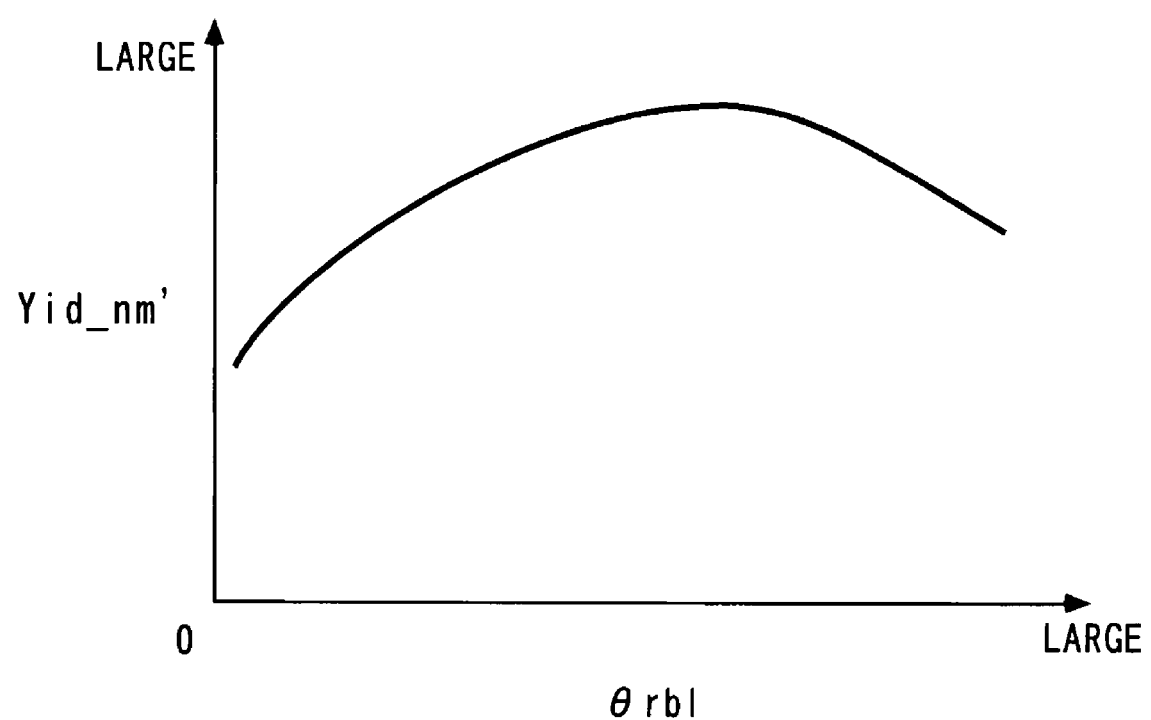
FIG. 30 is a diagram of a controlled object model used in the calculation of a basic controlled variable Yid_nm'.

First, the basic estimated controlled variable-calculating section 161 calculates the basic estimated controlled variable Yid_nm'(k) by inputting the immediately preceding value θrbl(k−1) of the exhaust reopening angle to a controlled object model shown in FIG. 30. The controlled object model shown in FIG. 30 is formed by replacing Pmi set to the vertical axis by Yid_nm', in the above-described controlled object model shown in FIG. 27. In short, it is substantially the same as that in FIG. 27. The immediately preceding value θrbl(k−1) of the exhaust reopening angle is used in the basic estimated controlled variable-calculating section 161 for the same reason as described concerning the basic estimated controlled variable-calculating section 61. It should be noted that in the present embodiment, the basic estimated controlled variable Yid_nm' corresponds to the controlled variable of the controlled object model.

Further, the nonlinear weight function vector-calculating section 162 calculates a nonlinear weight function vector W_mod'(θrbl(k−1)), as referred to hereinafter. The nonlinear weight function vector W_mod'(θrbl(k−1)) is defined as a column vector composed of the elements of values of (J+1) nonlinear weight functions Wj(θrbl(k−1)) by the following equation (39):

$$W\_mod'(\theta rbl(k-1)) = \begin{bmatrix} W0(\theta rbl(k-1)) \\ \vdots \\ Wg(\theta rbl(k-1)) \\ \vdots \\ WJ(\theta rbl(k-1)) \end{bmatrix} \quad (39)$$

Figure 31:
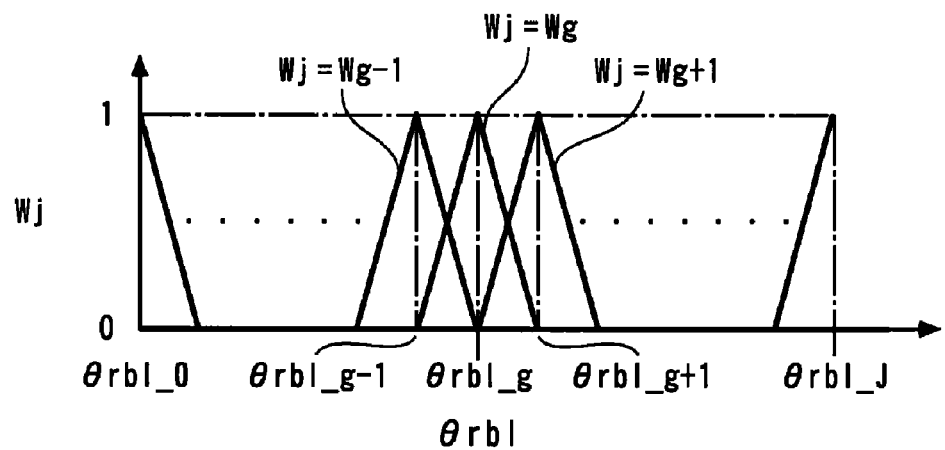
FIG. 31 is a diagram showing an example of a map for use in the calculation of a nonlinear weight function Wj.

As shown in FIG. 31, the nonlinear weight function Wj is a function whose value is determined according to the exhaust reopening angle θrbl. In the map shown in FIG. 31, the range of the exhaust reopening angle θrbl which is variable by the variable exhaust valve-actuating mechanism 5 is equally divided by (J+1) values θrbl_j(j=0 to J), and the nonlinear weight function Wj is set in a manner associated with a plurality of regions defined by combinations of three consecutive values of the exhaust reopening angle θrbl_j. It should be noted in the present embodiment, the nonlinear weight function Wj corresponds to the plurality of functions.

Further, each of the nonlinear weight function Wj takes the maximum value of 1 with respect to the value of the exhaust reopening angle θrbl in a center of each associated region, and in an area other than the center, it takes a value which changes on inclined sides of an isosceles triangle, while taking a value of 0 outside the regions. In addition, in a plurality of regions to which correspond the nonlinear weight functions Wj, each adjacent two of the regions overlap each other, whereby each adjacent two of the nonlinear weight functions Wj intersect with each other, in a portion whereby they change on the inclined sides of an isosceles triangle.

For example, as shown in FIG. 31, a nonlinear weight function Wg corresponding to a region of θrbl_g−

$1 \leq \theta rbl \leq \theta rbl\_g+1$ takes the maximum value of 1, when the exhaust reopening angle $\theta rbl$ is equal to a value in the center of the region (i.e. when $\theta rbl=\theta rbl\_g$), but with respect to values in areas other the center, the value of the nonlinear weight function Wg changes as on the inclined sides of an isosceles triangle. Further, it is configured such that when the value $\theta rbl$ is outside the above regions, i.e. when $\theta rbl<\theta rbl\_g-1$ or $\theta rbl\_g+1<\theta rbl$ holds, the nonlinear weight function Wg takes a value of 0. Further, inclined surfaces of an isosceles triangle on which the value of the nonlinear weight function Wg changes intersects with inclined surfaces of isosceles triangles on which change the respective values of the nonlinear weight functions Wg-1 and Wg+1 corresponding to regions adjacent to the region of the nonlinear weight function Wg, in portions of these regions where they overlap each other.

Figure 32:
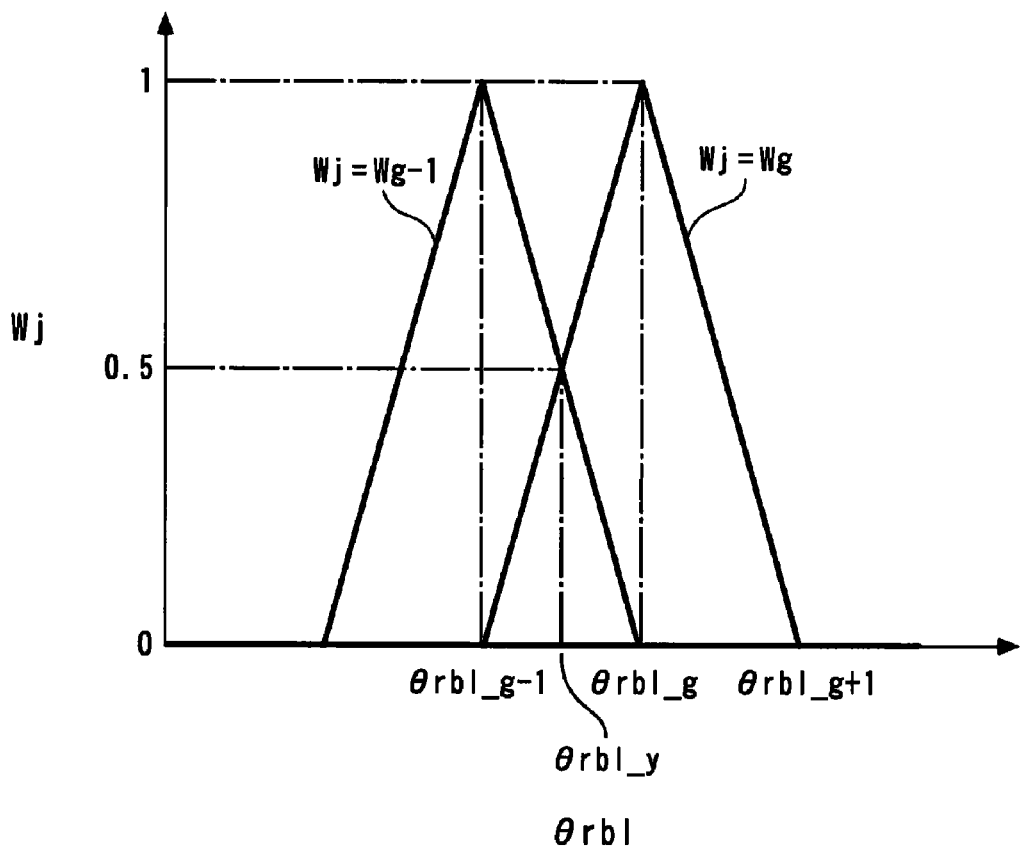
FIG. 32 is a diagram which is useful in explaining a method of calculating the nonlinear weight function Wj.

Therefore, as shown in FIG. 32, assuming that $\theta rbl\_y$ is a value in a center between the values $\theta rbl\_g-1$ and $\theta rbl\_g-1$, when $\theta rbl=\theta rbl\_y$ hold, the values of the two nonlinear weight functions Wg-1 and Wg are such that Wg-1=Wg=0.5 holds, and all the values of the nonlinear weight function Wj other than these become equal to 0. In addition, when $\theta rbl\_y<\theta rbl<\theta rbl\_g$ holds, the value of the nonlinear weight function Wg becomes such that 0.5<Wg<1.0 holds, while the value of the non-liner weight function Wg+1 becomes equal to (1−Wg), and all the values of the nonlinear weight function Wj other than these become equal to 0.

As described above, the nonlinear weight function vector-calculating section 162 calculates the values of the nonlinear weight functions Wj as the elements of the nonlinear weight function vector W_mod'($\theta rbl(k-1)$), by searching the map shown in FIG. 31 according to the immediately preceding value $\theta rbl(k-1)$ of the exhaust reopening angle, whereby the nonlinear weight function vector W_mod'($\theta rbl(k-1)$) is calculated.

Further, the model correction coefficient-calculating section 163 calculates the model correction coefficient Yid_mod'(k) using the nonlinear weight function vector W_mod'($\theta rbl(k-1)$) calculated by the nonlinear weight function vector-calculating section 162 as described above, and the immediately preceding value $\theta'(k-1)$ of the model correction parameter matrix calculated by the model correction parameter vector-calculating section 167, referred to hereinafter, by the following equation (40):

$$\text{Yid\_mod}'(k) = \text{Yid\_base}' + \theta'(k-1) \cdot W\_mod'(\theta rbl(k-1)) \quad (40)$$
$$= \text{Yid\_base}' + \sum_{j=0}^{J} \theta j(k-1) Wj(\theta rbl(k-1))$$
$$= \text{Yid\_base}' + \theta 0(k-1) W0(\theta rbl(k-1)) + \ldots +$$
$$\theta g(k-1) Wg(\theta rbl(k-1)) + \ldots +$$
$$\theta J(k-1) WJ(\theta rbl(k-1))$$

In the equation (40), Yid_base' is a predetermined basic value, and is set to 1 in the present embodiment. The reason for this will be described hereinafter. As shown in the equation (40), the model correction coefficient Yid_mod'(k) is calculated by adding the inner product of the nonlinear weight function vector W_mod'($\theta rbl(k-1)$) and the immediately preceding value $\theta'(k-1)$ of the model correction parameter vector to the basic value Yid_base'.

Next, the multiplier 164 calculates a corrected estimated controlled variable Yid' by the following equation (41). Thus, the corrected estimated controlled variable Yid' is calculated by multiplying the basic estimated controlled variable Yid_nm' by the model correction coefficient Yid_mod', and hence, this corresponds to correction of the controlled object model in FIG. 30 by the model correction coefficient Yid_mod'.

$$Yid'(k)=Yid\_nm'(k)\cdot Yid\_mod'(k) \quad (41)$$

Further, the subtractor 165 calculates an estimation error Eid' by the following equation (42). More specifically, the estimation error Eid' is calculated as the difference between the corrected model controlled variable Yid', which is the controlled variable of the corrected controlled object model, and the indicated mean effective pressure Pmi, which is an actual controlled variable.

$$Eid'(k) = Yid'(k) - Y(k) \quad (42)$$
$$= Yid'(k) - Pmi(k)$$

On the other hand, the multiplier 166 calculates a corrected estimation error vector Emd' by the following equation (43). More specifically, the corrected estimation error vector Emd' is calculated by correcting the estimation error Eid' by the nonlinear weight function vector W_mod'.

$$Emd'(k) = \begin{bmatrix} Emd0 \\ \vdots \\ Emdg \\ \vdots \\ EmdJ \end{bmatrix} \quad (43)$$
$$= W\_mod'(\theta rbl(k-1)) \cdot Eid'(k)$$
$$= \begin{bmatrix} W0(\theta rbl(k-1)) \\ \vdots \\ Wg(\theta rbl(k-1)) \\ \vdots \\ WJ(\theta rbl(k-1)) \end{bmatrix} \cdot Eid'(k)$$

Further, the model correction parameter vector-calculating section 167 calculates the model correction parameter vector $\theta'$ with a sliding mode control algorithm expressed by the following equations (44) to (48):

$$\theta'(k)=\theta rch'(k)+\theta nl'(k)+\theta adp'(k) \quad (44)$$

$$\theta rch'(k)=-Qrch'\cdot\delta'(k) \quad (45)$$

$$\theta nl'(k)=-'Qnl'\cdot sgn(\delta'(k)) \quad (46)$$

$$\theta adp'(k)=\lambda'\cdot\theta adp'(k-1)-Qadp'\cdot\delta'(k) \quad (47)$$

$$\delta'(k)=Emd'(k)+R'\cdot Emd'(k-1) \quad (48)$$

As shown in the equation (44), the model correction parameter vector $\theta'$ is calculated as the sum of a reaching law input $\theta rch'$, a non-linear input $\theta nl'$, and an adaptive law input vector $\theta adp'$, and the reaching law input vector $\theta rch'$ is calculated by the equation (8). Qrch' in the equation (45) is a predetermined reaching law gain, and $\delta'$ is a switching function as defined by the equation (48). R' in the equation (48) represents a switching function-setting parameter set such that $-1<R'<0$ holds. It should be noted that in the present embodiment, the adaptive law input vector $\theta adp'$ corresponds to an integral value, and the switching function $\delta'$ corresponds to a value based on the difference.

Further, the non-linear input vector $\theta nl'$ is calculated by the equation (46), and Qnl' in the equation (46) represents a predetermined non-linear gain. Further, sgn(δ'(k)) represents a sign function, the value of which is set such that when δ'(k)≧0, sgn(δ'(k))=1 holds, and when δ'(k)<0 holds, sgn(δ'(k))=−1 holds. It should be noted that the value of the sign function sgn(δ'(k)) may be configured such that when δ'(k)=0, sgn(δ'(k))=0 holds.

Further, the adaptive law input vector θadp' is calculated by the equation (47). Qadp' in the equation (47) is a predetermined adaptive law gain, and λ' is a forgetting function set such that 0<λ'<1 holds. The reason for the use of the forgetting function is the same as described concerning the forgetting function λ of the first embodiment.

More specifically, by multiplying the immediately preceding value θadp'(k−1) of the adaptive law input vector by the forgetting function λ'.Yid'≈Pmi comes to hold as the computation process proceeds, and at the time the each element of the corrected estimation error vector Emd' converges to approximately 0, each element of the adaptive law input vector θadp' comes to converge to approximately 0. As a result, it is possible to prevent the estimation error in the model correction parameter vector θ' from remaining. This makes it possible to calculate the model correction parameter vector θ' as an appropriate value to increase the accuracy of the calculation. Thus, the model correction parameter vector θ' is calculated while subjecting the immediately preceding value θadp'(k−1) of the adaptive law input vector to a forgetting process by a forgetting coefficient λ'.

Further, for example, when each element of the corrected estimation error vector Emd' converges to 0, if all the elements of the model correction parameter vector θ' become equal to 0, all the terms other than the basic value Yid_base' in the aforementioned equation (40) become equal to 0. Therefore, the basic value Yid_base' is set to 1 so as to cause Yid_nm'=Yid' and Yid_mod'=1 to hold when each element of the corrected estimation error vector Emd' converges to 0 to make it unnecessary to correct the controlled object model. It should be noted that when the forgetting effect by the forgetting coefficient λ' is unnecessary, it is only required that the forgetting coefficient λ' in the equation (47) is set to 1, and at the same time the basic value Yid_base' in the aforementioned equation (40) is set to 0.

The model corrector 160 according to the present embodiment calculates the model correction parameter vector θ' with the sliding mode control algorithm as described above, when Eid'≠0, i.e. Yid'− Pmi≠0 holds, only the element θj of the model correction parameter vector θ' corresponding to a region where the value θrbl(k−1) exists is calculated as a value which causes Eid' to converge to 0, and the other elements θj are calculated as 0. Further, as described hereinabove, the model correction coefficient Yid_mod' is calculated by adding the basic value Yid_base' to the inner product of the immediately preceding value θ'(k−1) of the model correction parameter vector and the nonlinear weight function vector W_mod', calculated as above. Therefore, the controlled object model in FIG. 30 is corrected such that Yid'=Pmi holds in regions where the value θrbl(k−1) exists. Therefore, the model corrector 160 calculates the model correction parameter vector θ' while correcting the controlled object model in FIG. 30 onboard by the model correction coefficient Ym_mod' such that the model correction parameter vector θ' matches the actual characteristic of the controlled object.

Figure 33:
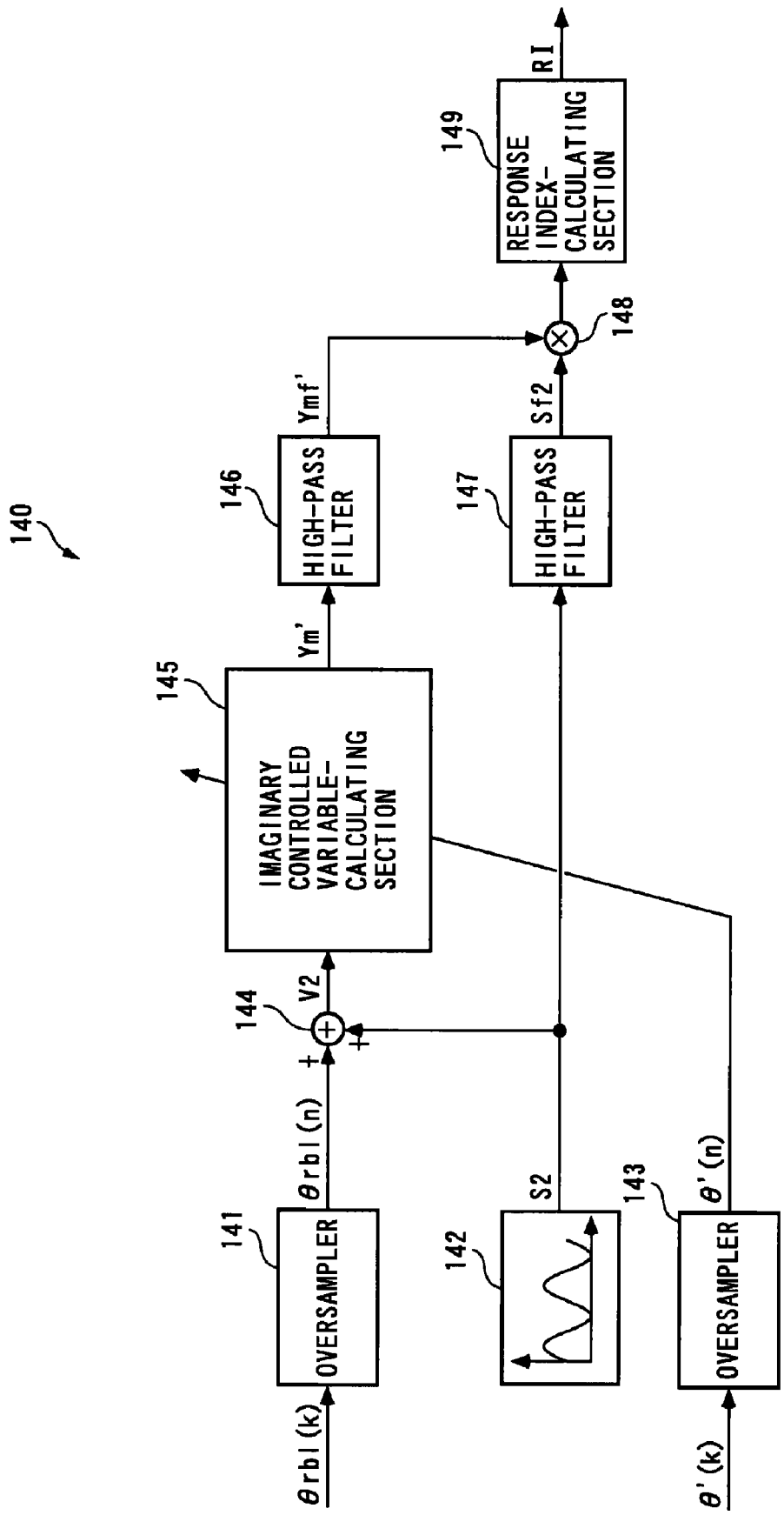
FIG. 33 is a schematic functional block diagram of an onboard model analyzer.

Next, a description will be given of the aforementioned onboard model analyzer 140. Referring to FIG. 33, the onboard model analyzer 140 is comprised of a second periodic signal value-calculating section 142, two oversamplers 141 and 143, an adder 144, an imaginary controlled variable-calculating section 145, two high-pass filters 146 and 147, a multiplier 148, a response index-calculating section 149.

The second periodic signal value-calculating section 142 calculates the second periodic signal value S2(n) by the same method as that of the second periodic signal value-calculating section 42 of the first embodiment.

Further, the oversampler 142 calculates the oversampled values θrbl(n) of the exhaust reopening angle, by oversampling the exhaust reopening angle θrbl(k) at the aforementioned control period ΔTn.

Further, the adder 144 calculates the second imaginary control input V2(n) by adding together the second periodic signal value S2(n) and the oversampled value θrbl(n) of the exhaust reopening angle.

On the other hand, the oversampler 143 oversamples the model correction parameter vector θ' calculated by the model corrector 160 at the control period ΔTn, thereby calculating the oversampled values θ'(n) of the model correction parameter vector. The oversampled values θ'(n) are defined by the following equation (49):

$$\theta'(n)=[\theta 0(n) \ldots \theta g(n) \ldots \theta J(n)] \quad (49)$$

Figure 34:
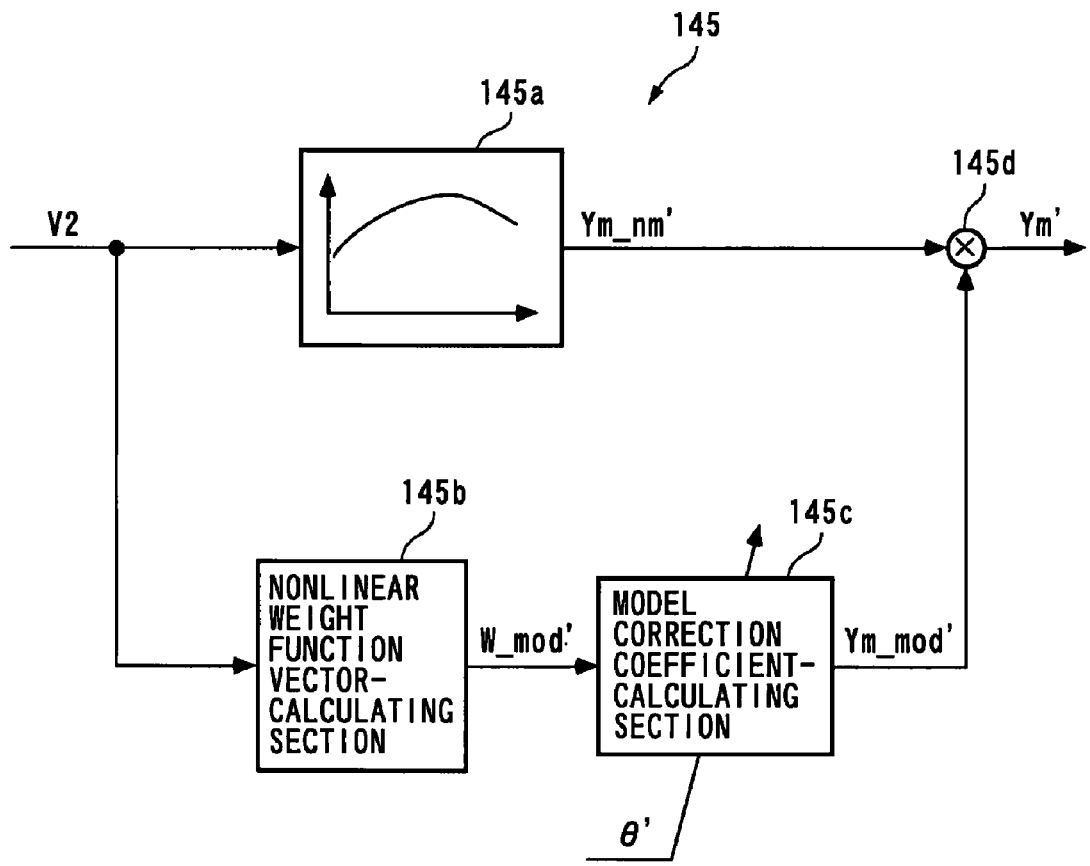
FIG. 34 is a schematic functional block diagram of an imaginary controlled variable-calculating section.

Next, a description will be given of the imaginary controlled variable-calculating section 145. The imaginary controlled variable-calculating section 145 calculates the imaginary controlled variable Ym' according to the oversampled values θ'(n) and the second imaginary control input V2, and as shown in FIG. 34, is comprised of a basic imaginary controlled variable-calculating section 145a, a nonlinear weight function vector-calculating section 145b, a model correction coefficient-calculating section 145c and a multiplier 145d.

Figure 35:
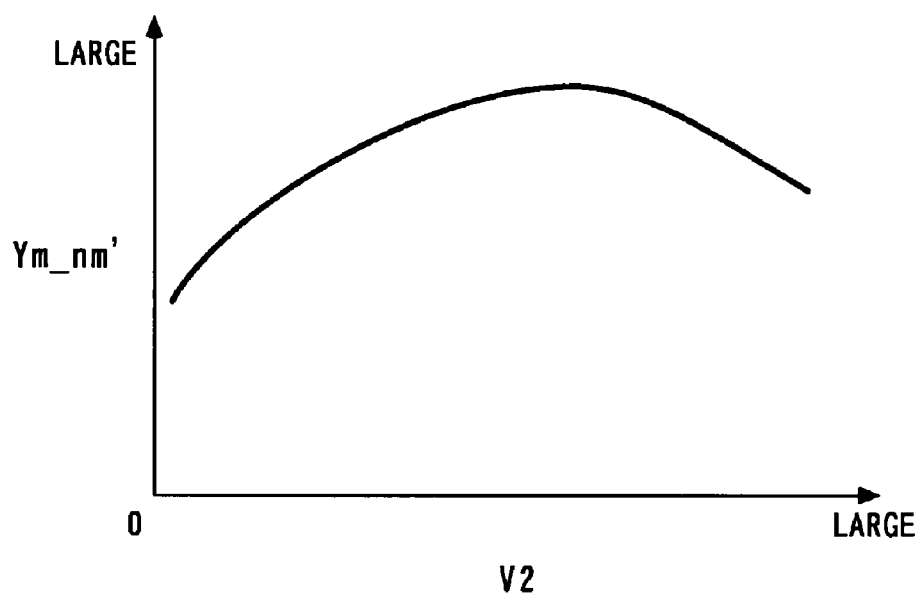
FIG. 35 is a diagram of a controlled object model used in the calculation of a basic imaginary controlled variable Ym_nm'.

First, the imaginary controlled variable-calculating section 145a calculates the basic imaginary controlled variable Ym_nm'(n) by inputting the second imaginary control input V2 to the controlled object model shown in FIG. 35. The controlled object model in FIG. 35 is formed by replacing Pmi set to the vertical axis by Ym_nm', and θrbl set to the horizontal axis by V2 in the controlled object model in FIG. 27, and hence is substantially the same as the controlled object model in FIG. 27. It should be noted that in the present embodiment, the basic imaginary controlled variable Ym_nm' corresponds to the controlled variable of the controlled object model.

Further, the nonlinear weight function vector-calculating section 145b calculates the nonlinear weight function vector W_mod'(V2(n)) in the same manner as the nonlinear weight function vector-calculating section 162. More specifically, the nonlinear weight function vector W_mod'(V2(n)) is calculated by searching a map, not shown, which is prepared by replacing θrbl in FIG. 31 set to the horizontal axis by V2, according to the second imaginary control input V2. The nonlinear weight function vector W_mod'(V2(n)) is defined by the following equation (50):

$$W\_mod'(V2(n)) = \begin{bmatrix} W0(V2(n)) \\ \vdots \\ Wg(V2(n)) \\ \vdots \\ WJ(V2(n)) \end{bmatrix} \quad (50)$$

Next, the model correction coefficient-calculating section 145c calculates the model correction coefficient Ym_mod'(n) by the following equation (51). In the following equation (51), Ym_base' represents a predetermined basic value, and is set to 1 for the same reason as described as to the aforementioned basic value Yid_base'.

$$Ym\_mod'(n) = Ym\_base' + \theta'(n) \cdot W\_mod'(V2(n)) \quad (51)$$
$$= Ym\_base' + \sum_{j=0}^{J} \theta j(n) W j(V2(n))$$
$$= Ym\_base' + \theta 0(n) W 0(V2(n)) + \ldots +$$
$$\theta j(n) W j(V2(n)) + \ldots + \theta J(n) W J(V2(n))$$

Then, the multiplier 145d calculates the imaginary controlled variable Ym' by the following equation (52). Thus, the imaginary controlled variable Ym' is calculated by multiplying the basic imaginary controlled variable Ym_nm' by the model correction coefficient Ym_mod', and hence this is equivalent to correction of the controlled object model in FIG. 35 by the model correction coefficient Ym_mod'.

$$Ym'(n) = Ym\_nm'(n) \cdot Ym\_mod'(n) \quad (52)$$

As described above, the imaginary controlled variable-calculating section 145 calculates the model correction coefficient Ym_mod'(n) by adding the inner product of the oversampled values θ'(n) of the model correction parameter vector and the nonlinear weight function vector W_mod'(V2(n)) to the basic value Ym_base to the basic value Ym_base, and the model correction coefficient Ym_mod'(n) corrects the controlled object model in FIG. 35. The model correction coefficient Ym_mod'(n) is calculated in the same manner as the model correction coefficient Yid_mod'(k) described above, at other than the calculation repetition period, and has the same meaning. In addition, the controlled object model in FIG. 35 is substantially the same as the controlled object model in FIG. 27, i.e. the controlled object model in FIG. 30.

Therefore, the imaginary controlled variable-calculating section 145 corrects the controlled object model in FIG. 35 calculated as described above, by the model correction coefficient Ym_mod' as to regions where the value V2(n) exists, such that Ym'=Pmi holds. As a result, the model correction coefficient Ym_mod' corrects the controlled object model in FIG. 35 onboard such that it matches the actual characteristics of the controlled object.

Referring again to FIG. 33, the high-pass filter 46 calculates a filtered value Ymf' of the imaginary controlled variable through a high-pass filtering process expressed by the following equation (53):

$$Ymf'(n) = b0 \cdot Ym'(n) + b1 \cdot Ym'(n-1) + \ldots + bm^* \cdot Ym'(n-m^*) + a1 \cdot Ymf'(n-1) + a2 \cdot Ymf'(n-2) + \ldots + ak^* \cdot Ymf'(n-k^*) \quad (53)$$

On the other hand, the high-pass filter 147 calculate filtered value Sf2 of the second periodic signal values through high-pass filtering processes expressed by the following equation (54):

$$Sf2(n) = b0 \cdot S2(n) + b1 \cdot S2(n-1) + \ldots + bm^* \cdot S2(n-m^*) + a1 \cdot Sf2(n-1) + a2 \cdot Sf2(n-2) + \ldots + ak^* \cdot Sf2(n-k^*) \quad (54)$$

Then, the multiplier 148 calculate a multiplied value (product) Ymf·Sf2 by multiplying the filtered value Ymf' of the imaginary controlled variable by the filtered value Sf2 of the second periodic signal value. Then, the response index-calculating sections 149 calculates the response index RI based on (h+1) (h=Crs_max) time-series data of the multiplied value (product) Ymf·Sf2, using the following equation (55). It should be noted that Kr in the following equation (55) represents a response gain correction coefficient.

$$RI(n) = Kr \cdot \sum_{j=n-h}^{n} Ymf'(j) Sf2(j) \quad (55)$$

The onboard model analyzer 140 according to the present embodiment calculates the response index Ri by the method described above.

Figure 36:
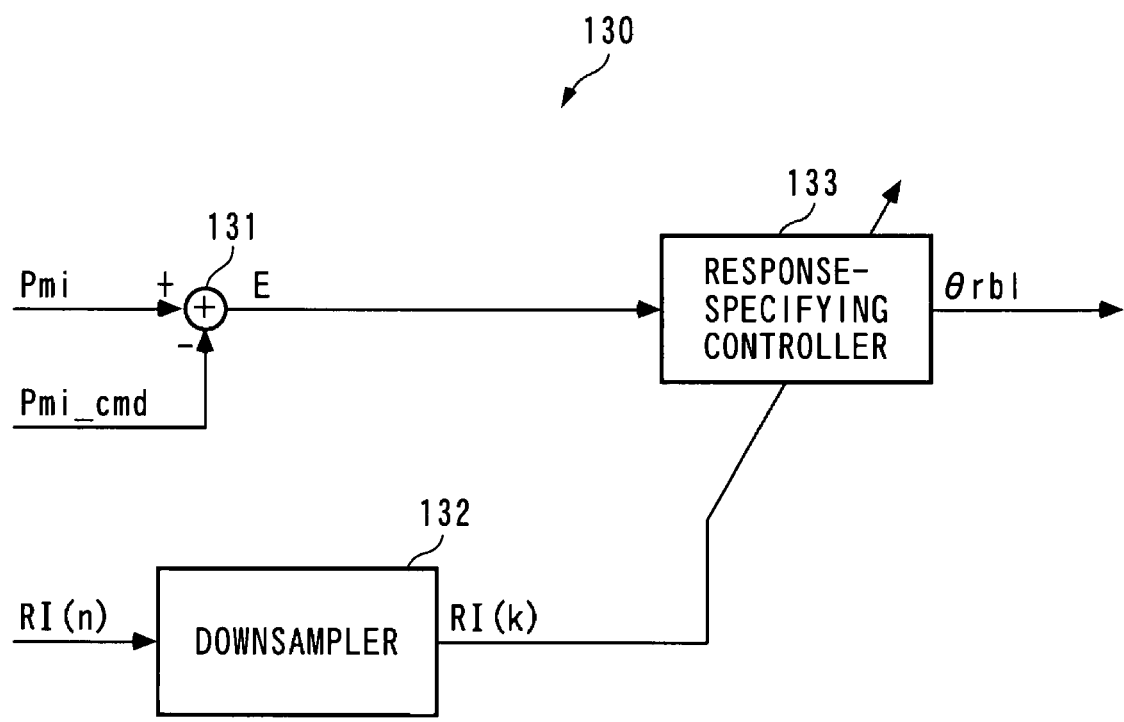
FIG. 36 is a schematic functional block diagram of a controller.

Next, a description will be given of the aforementioned controller 130. The controller 130 calculates the exhaust reopening angle θrbl at the aforementioned control period ΔTk. Referring to FIG. 36, the controller 130 is comprised of a subtractor 131, a downsampler 132, and a response-specifying controller 133.

The controller 130 calculates a follow-up error E using the subtractor 131 by the following equation (56):

$$E(k) = Pmi(k) - Pmi\_cmd(k) \quad (56)$$

On the other hand, the downsampler 132 downsamples the response index RI(n) calculated at the above-described control period ΔTn by the onboard model analyzer 140, at the control period ΔTk, to thereby calculate respective downsampled value RI(k) of the response index.

Further, the response-specifying controller 133 calculates the exhaust reopening angle θrbl based on the downsampled values RI(k) and the follow-up error E with a response specifying control algorithm shown in the following equations (57) to (61):

$$\theta rbl(k) = Urch(k) + Uadp(k) \quad (57)$$
$$Urch(k) = -Krch \cdot \sigma(k) \quad (58)$$
$$Uadp(k) = -Kadp \cdot \sum_{j=0}^{k} \sigma(j) \quad (59)$$
$$\sigma(k) = Em(k) + S' \cdot Em(k-1) \quad (60)$$
$$Em(k) = \frac{RI(k)}{RI\_max} \cdot E(k) \quad (61)$$

In the above equation (57), Urch represents a reaching law input, and is calculated using the equation (58). In the equation (8), Krch represents a predetermined reaching law gain, and σ represents a switching function calculated by the equation (60). In the equation (60), S' represents a switching function-setting parameter set such that −1<S'<0 holds, and Em represents a corrected follow-up error calculated by the equation (61). In the equation (61), RI_max represents the maximum value which the absolute value |RI| of the response index can take during the control, and a value set in advance in offline is used as RI_max. Further, in the equation (57), Uadp represents an adaptive law input, and is calculated by the equation (59). In the equation (59), Kadp represents a predetermined adaptive law gain. It should be noted that these gains Krch and Kadp are set to such values as will make the control system stable when the absolute value |RI| of the response index becomes equal to the maximum value RI_max.

As described above, the controller 130 calculates the exhaust reopening angle θrbl such that the exhaust reopening angle θrbl causes the follow-up error E to converge to 0. In other words, such that they cause the indicated mean effective pressure Pmi to converge to its target value Pmi_cmd.

Figure 37:
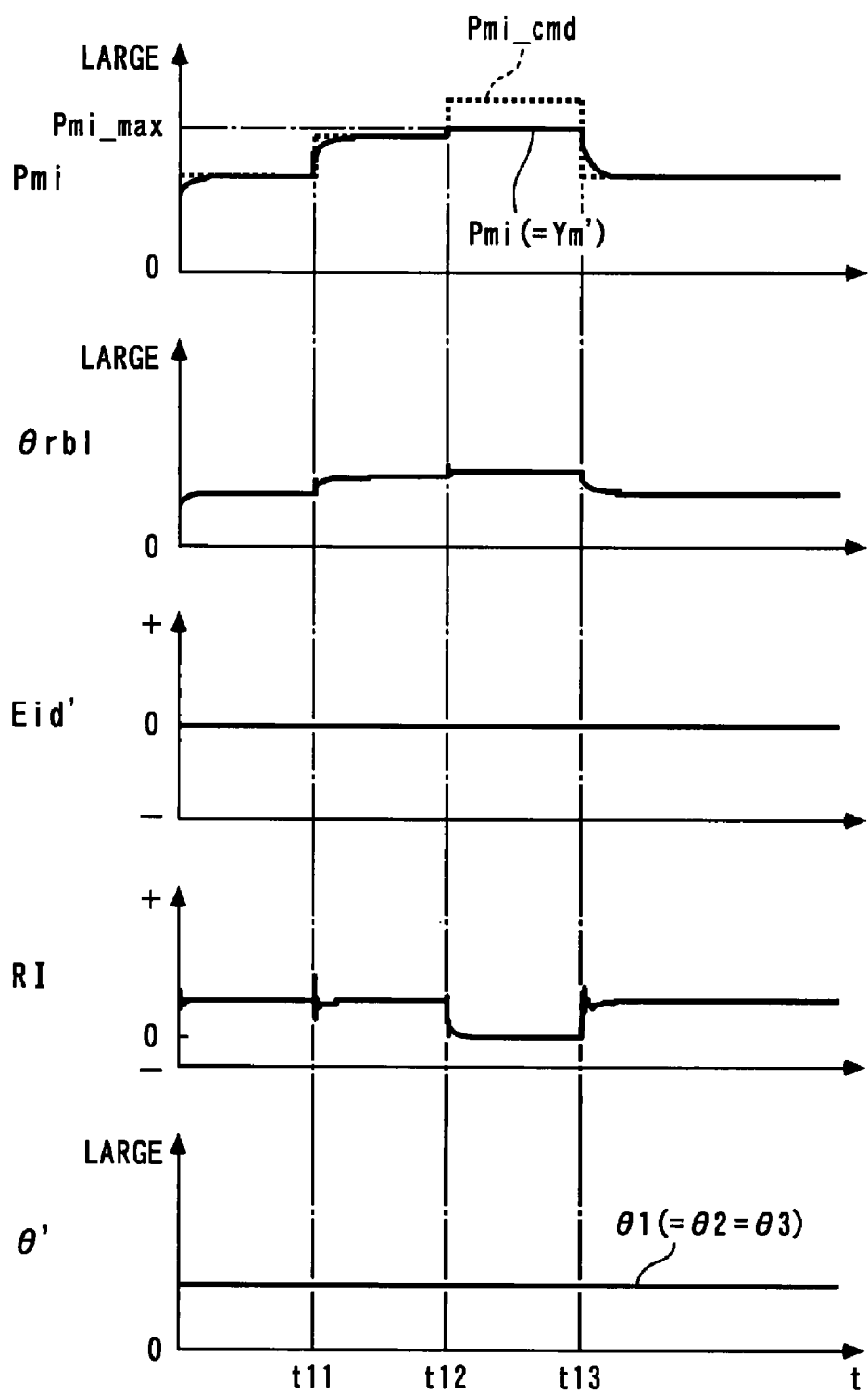
FIG. 37 is a timing diagram showing an example of results of a simulation of control of indicated mean effective pressure Pmi, which is performed by the control apparatus according to the second embodiment when there is no modeling error of the controlled object model.
Figure 38:
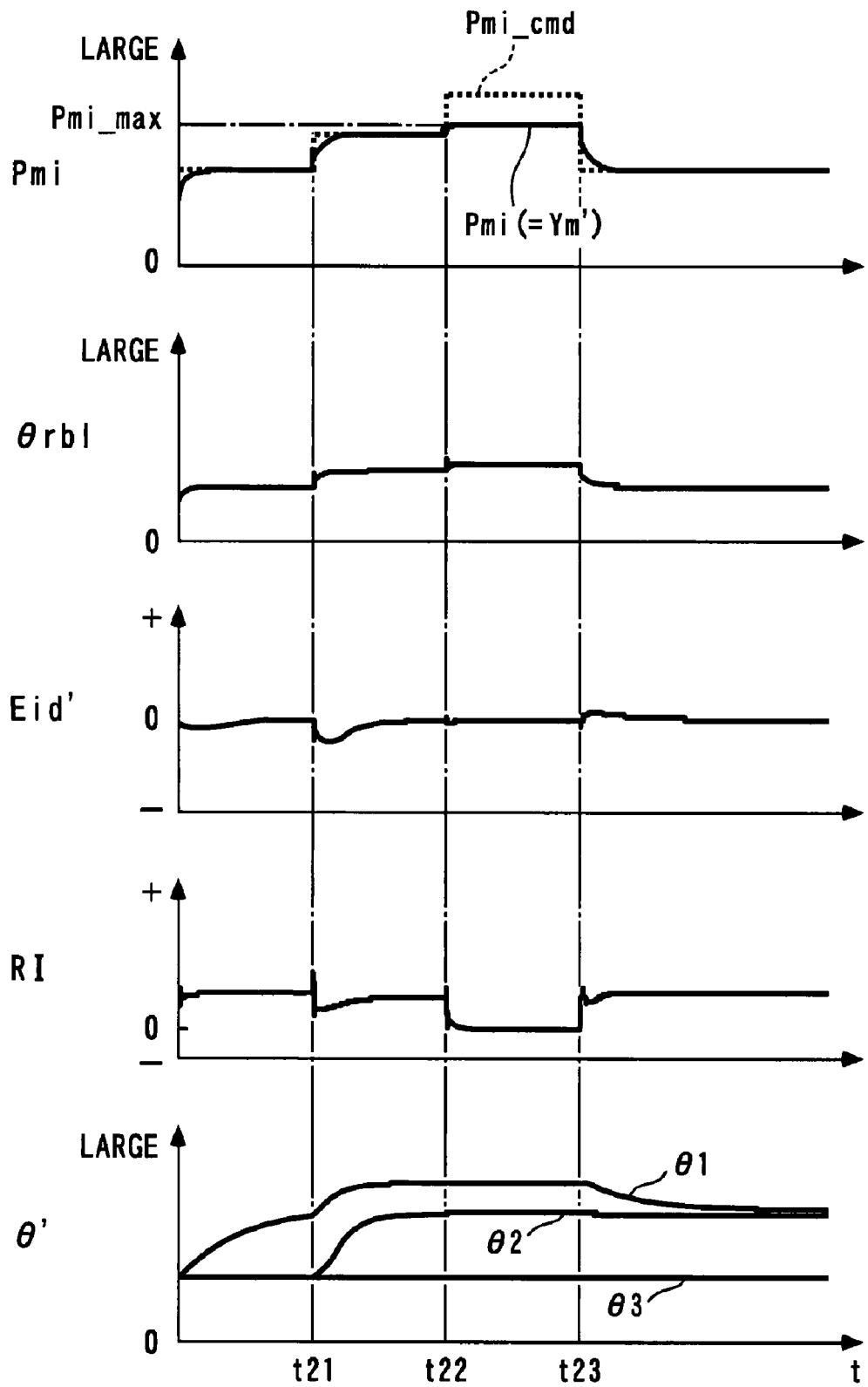
FIG. 38 is a timing diagram showing an example of results of a simulation of the control of the indicated mean effective pressure Pmi, which is performed by the control apparatus according to the second embodiment when there is a modeling error of the controlled object model.

Next, a description will be given of results (hereinafter referred to as "control results") of a simulation of control of the indicated mean effective pressure by the control apparatus 1A according to the second embodiment with reference to FIGS. 37 to 40. FIGS. 37 and 38 show an example of control results obtained when the model correction parameter vector θ' in the model corrector 160 is configured to be formed by three elements θ1 to θ3. FIG. 37 shows control results obtained when the controlled object models in FIGS. 27, 30, and 35 are configured such that there is no modeling error with respect to the actual characteristics of the controlled object. Further, FIG. 38 shows control results obtained when the controlled object models are configured such that there is a modeling error with respect to the same. It should be noted that Pmi_max represents the maximum value of the indicated mean effective pressure Pmi which the engine 3 can produce.

Figure 39:
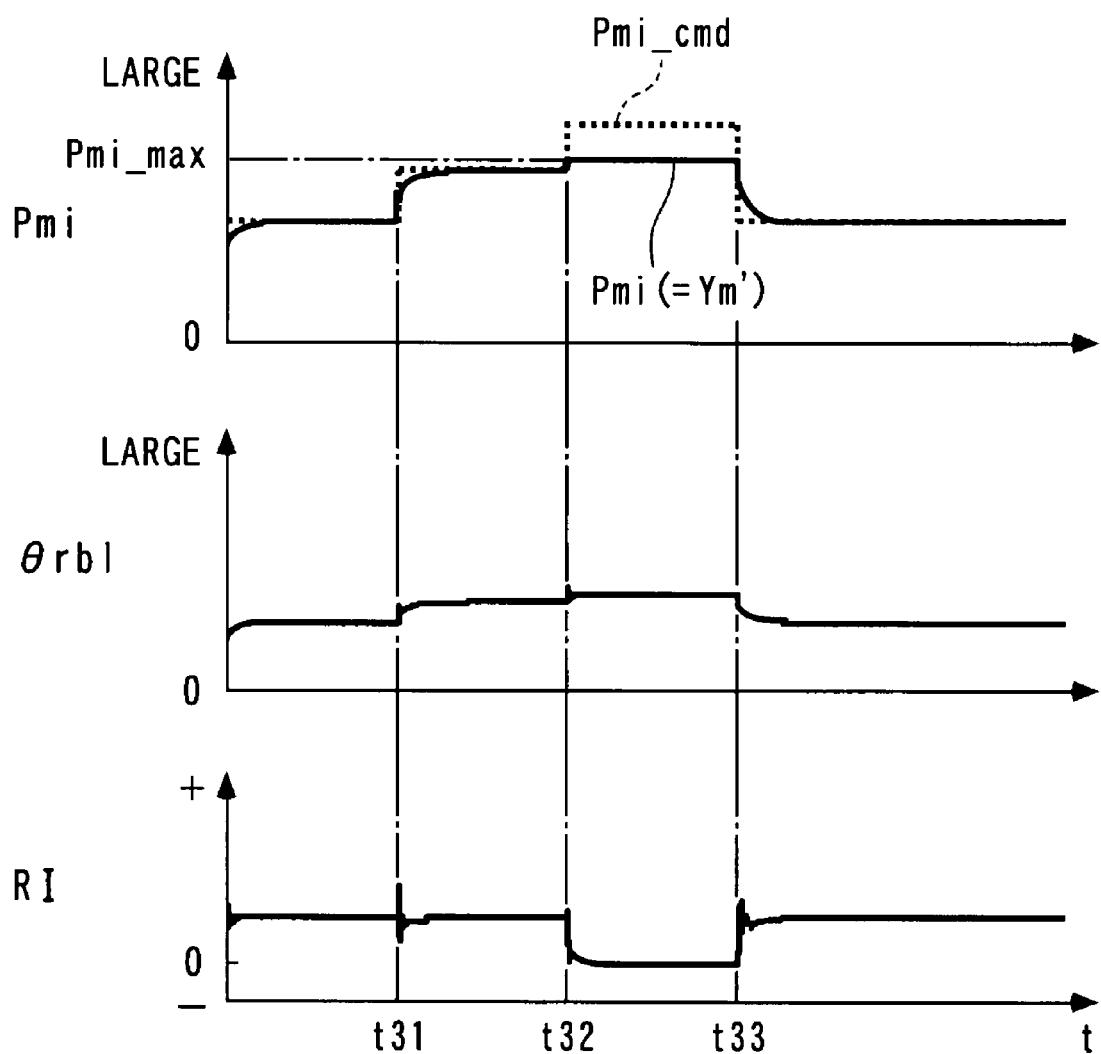
FIG. 39 is a timing diagram showing a comparative example of results of a simulation of the control of the indicated mean effective pressure Pmi, which is performed without using a model corrector when there is no modeling error of the controlled object model.
Figure 40:
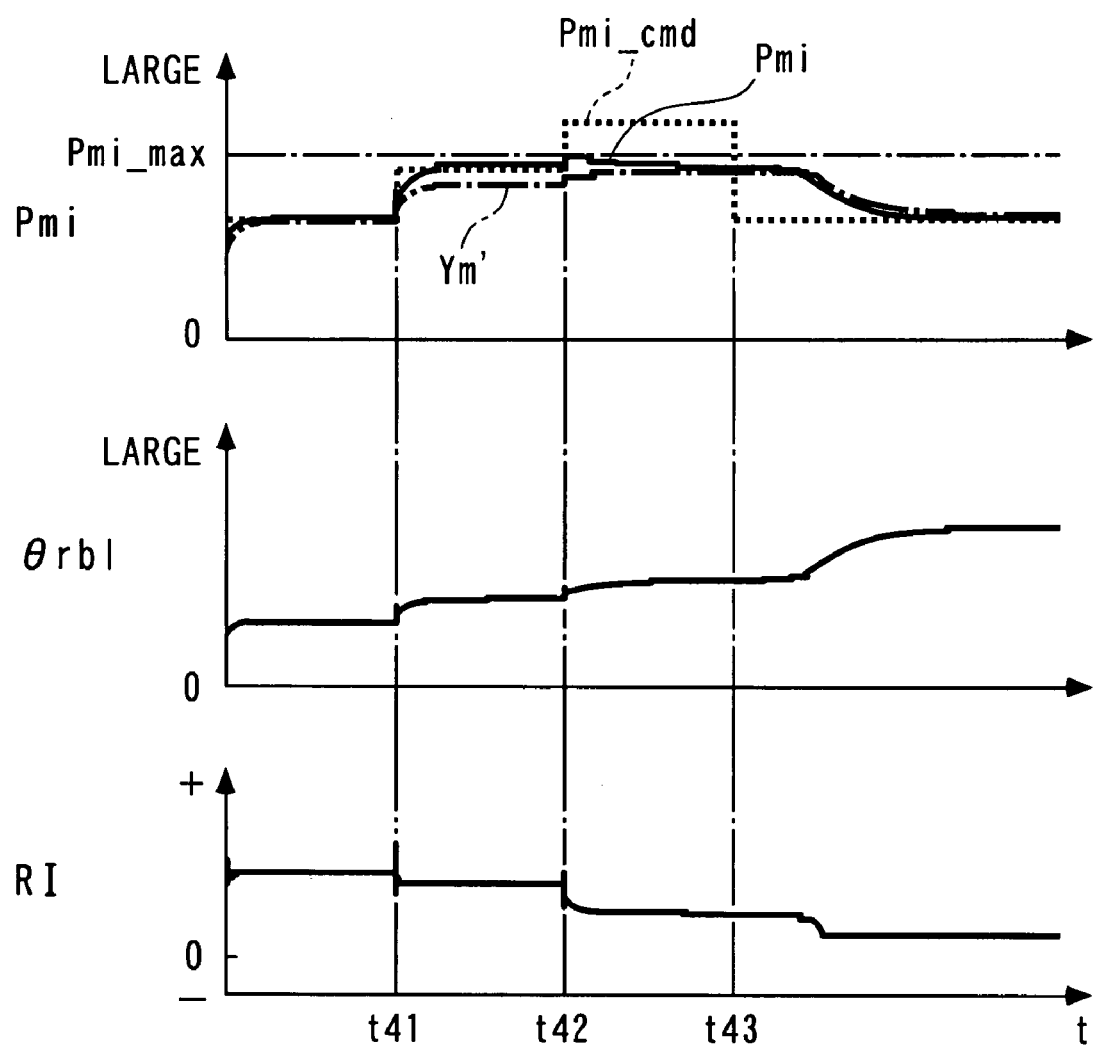
FIG. 40 is a timing diagram showing a comparative example of results of a simulation of the control of the indicated mean effective pressure Pmi, which is performed without using a model corrector when there is a modeling error of the controlled object model.

Further, FIGS. 39 and 40 show control results obtained when the imaginary controlled variable-calculating section 145 calculates the imaginary controlled variable Ym' by inputting the second imaginary control input V2 to the controlled object model in FIG. 35, by omitting the model corrector 160 (i.e. without using the model correction parameter vector θ'). FIG. 39 shows an example of control results obtained by configuring the controlled object model such that there is no modeling error, whereas FIG. 40 shows an example of control results obtained by configuring the controlled object model such that there is a modeling error.

First, a comparison is made between the control results shown in FIGS. 37 and 39. In both of them, when the target value Pmi_cmd of the indicated mean effective pressure is changed in the increasing or decreasing direction (at time points t11, t13, t31, and t33), thereafter, the indicated mean effective pressure Pmi is caused to converge to the target value Pmi_cmd. Further, when target value Pmi_cmd is set to a value larger than the maximum value Pmi_max (at time points t11 and t32), thereafter, control is provided such that the to are shows that the indicated mean effective pressure Pmi is held at the maximum value Pmi_max. In short, it is understood that when without a modeling error, it is possible to secure excellent control accuracy irrespective of the provision of the model corrector 160, However, when there is a modeling error, in the comparative example shown in FIG. 40, after the target value Pmi_cmd is changed in the increasing direction, there is produced a difference between the indicated mean effective pressure Pmi and the imaginary controlled variable Ym'. Further, when the target value Pmi_cmd is set to a value larger than the maximum value Pmi_max, at a time point t42, thereafter, the indicated mean effective pressure Pmi is caused to deviate from the Pmi_max due to the produced difference. In addition, when the target value Pmi_cmd is set to be fairly smaller than the maximum value Pmi_max at a time point t43, it takes time before the indicated mean effective pressure Pmi converges to the target value Pmi_cmd. In short, it is understood that when the model corrector 160 is not used, if there occurs a modeling error, the control accuracy is degraded.

In contrast, from the example of the control results shown in FIG. 38, it is known that when the target value Pmi_cmd of the indicated mean effective pressure is changed in the increasing or decreasing direction at a time point t21 or t23, thereafter, the model correction parameters θ1 to θ3 are calculated based on the corrected estimation error vector Emd' as the product of the estimation error Eid' and the nonlinear weight function vector W_mod, and the imaginary controlled variable Ym' is corrected by the model correction coefficient Yid_mod' calculated based these model correction parameters θ1 to θ3, whereby the imaginary controlled variable Ym' is caused to match the indicated mean effective pressure Pmi. That is, the controlled object model is corrected so as to eliminate the modeling error, so that the indicated mean effective pressure Pmi is controlled to converge to its target value Pmi_cmd. Further, when the target value Pmi_cmd is set to a value larger than the maximum value Pmi_max at a time point t22, the indicated mean effective pressure Pmi is properly held at the maximum value Pmi_max. In short, it is understood that if the model corrector 160 is used, even when there occurs a modeling error, it is possible to secure an excellent control accuracy.

As described hereinbefore, according to the control apparatus 1A of the present embodiment, it is possible to obtain the same advantageous effects as provided by the control apparatus 1 according to the first embodiment. More specifically, the onboard model analyzer 140 calculates the first response index RI as a value indicative of the correlation between the exhaust reopening angle θrbl and the indicated mean effective pressure Pmi. The controller 130 calculates the exhaust reopening angle θrbl with the response-specifying control algorithm such that the indicated mean effective pressure Pmi is caused to converge to its target value Pmi_cmd. At this time, the corrected estimation error Em used in the response-specifying control algorithms is calculated by multiplying the follow-up error E by the values RI/RI_max, so that as the response index RI becomes closer to its maximum value RI_max, i.e. as the correlation between the exhaust reopening angle θrbl and the indicated mean effective pressure Pmi becomes higher, the increasing/decreasing rate of the exhaust reopening angle θrbl as a control input become larger. As described above, even when the sensitivity, i.e. the correlation of the indicated mean effective pressure Pmi as a controlled variable associated with the exhaust reopening angle θrbl as control inputs changes according to the value of the control input θrbl, it is possible to determine the increasing/decreasing rate of the control input θrbl according to the change in the correlation, thereby making it possible to control the controlled variable Pmi such that the controlled variable Pmi converges to its target value Pmi_cmd without causing any oscillating behavior or unstable behavior. That is, it is possible to ensure high-level stability of the control.

Further, the second follow-up error Em is calculated using the aforementioned equation (61), and hence when the sign of the response indices RI is inverted, the sign of the corrected follow-up error Em is also inverted, whereby the increasing/decreasing direction of the exhaust reopening angle θrbl as the control input is inverted. More specifically, the increasing/decreasing direction is inverted from an increasing one to a decreasing one, or from the decreasing one to the increasing one. Therefore, as in the case of the present embodiment where the indicated mean effective pressure Pmi shows its local maximum value as the exhaust reopening angle θrbl is varied, even when the target value Pmi_cmd of the indicated mean effective pressure is set to a value larger than its local maximum value, it is possible to hold the indicated mean effective pressure Pmi close to its local maximum value.

Further, the model corrector 160 calculates the model correction parameter vector θ', onboard, such that the controlled object model in FIG. 30 matches actual characteristics of the controlled object. Further, the imaginary controlled variable-calculating section 148 of the onboard model analyzer 140 corrects the controlled object model in FIG. 35 which is substantially the same as the controlled object model in FIG. 30, using the model correction parameter vector θ' calculated as described above, onboard such that it matches the actual characteristics of the controlled object. Therefore, even when a modeling error occurs due to the variations between individual products of the engine 3 and the aging of the engine 3, it is possible to quickly accommodate the modeling error, and increase the accuracy of calculation of the response index RI.

Further, elements $\theta j$ of the model correction parameter vector $\theta'$ are set in a manner associated with a plurality of regions defined by three consecutive values of the exhaust reopening angle $\theta$ rbl_j, and only elements $\theta j$ associated with regions where the value $\theta$rbl(k−1) exists are calculated with a sliding mode control algorithm shown in the equations (44) to (48), as described above, such that the estimation error Eid' converges to 0 (more specifically such that the corrected estimated controlled variable Yid' converges to the indicated mean effective pressure Pmi), and the other elements $\theta j$ are calculated as 0. Therefore, even when the modeling error is different between a plurality of regions, it is possible to correct the controlled object model on a region-by-region basis using the model correction parameter vector $\theta'$. As a result, even in the case of the controlled object, such as the engine 3, in which the controlled object model cannot be expressed using a recurrence formula, when a modeling error occurs due to individual products of the controlled object and aging of the controlled object, it is possible to compensate for the modeling error, and improve the robustness of the control apparatus against the modeling error.

In addition, the model correction parameter vector $\theta'$ is calculated with a sliding mode control algorithm, and hence even in the case of the controlled object the controlled object model of which cannot be expressed using the recurrence formula, as in the case of the engine 3, it is possible to calculate the model correction parameter vector $\theta'$ as a value that does not cause an unstable behavior, such as an oscillating behavior or overshooting. Further, using the model correction parameter vector $\theta'$ thus calculated, it is possible to control the engine 3 while correcting the controlled object model. As a result, it is possible to prevent the transient response of the control system from becoming oscillatory or unstable, and improve the control accuracy during a transition period.

Further, the controlled object mode is corrected by the model correction coefficient Ym_mod', and the model correction coefficient Ym_mod' is calculated by adding the basic value Ym_base' to the sum of products of each element of the model correction parameter vector $\theta'$ and a corresponding element of the nonlinear weight function vector W_mod'. The nonlinear weight functions Wj as the elements of the nonlinear weight function vector W_mod' have characteristics that with respect to the second imaginary control input V2 in a plurality of regions, they take the maximum value of 1 in the center or its vicinity of each of the regions, and change on the inclined sides of an isosceles triangle, and they take 0 outside the regions. Further, each two of the nonlinear weight functions Wij associated with respective overlapping regions intersect with each other, in portions where they change as on the inclined sides of an isosceles triangle. Therefore, when the model correction coefficient Ym_mod' corrects the controlled object model, it can correct the same continuously over a plurality of regions of the second imaginary control input V2, whereby the corrected controlled object model no longer has discontinued points. This makes it possible to prevent the transient response of the control system from becoming temporarily unstable due to the discontinued points of the controlled object model, and further improve the control accuracy during the transient time.

Further, in the sliding mode control algorithm used in the calculation of the model correction parameter vector $\theta'$, the immediately preceding value $\theta$adp'(k−1) of the adaptive law input vector is multiplied by the forgetting coefficient $\lambda'$, in the equation (47) for calculating the adaptive law input vector $\theta$adp', and hence when at the time point where each element of the corrected estimation error vector Emd' converges to approximately 0, each element of the adaptive law input vector $\theta$'adp comes to converge to approximately 0. As a result, it is possible to prevent the estimation error of the model correction parameter vector $\theta'$ from remaining, whereby the model correction parameter vector $\theta'$ can be calculated as an appropriate value, and the stability of the control system can be improved.

Although in the second embodiment, the nonlinear weight functions Wj that change on the inclined sides of an isosceles triangle in a plurality of regions divided by values of the exhaust reopening angle $\theta$rbl are used as the plurality of functions according to the present invention by which the correction parameters are multiplied, by way of example, the plurality of functions according to the present invention are not limited to them, but any suitable functions may be used insofar as they have characteristics that they each take the maximum value in respective centers or their vicinities of associated regions and change linearly or curvilinearly, and are configured such that each two functions corresponding to respective two overlapping regions intersect with each other at portions where they change linearly or curvilinearly. It is more preferred that the sum of the values of two functions in overlapping portions of the respective associated regions takes a value equal to the maximum value, or that with respect to any value of the exhaust reopening angle $\theta$rbl, the sum of two functions corresponding thereto takes a value equal to the maximum value.

Figure 41:
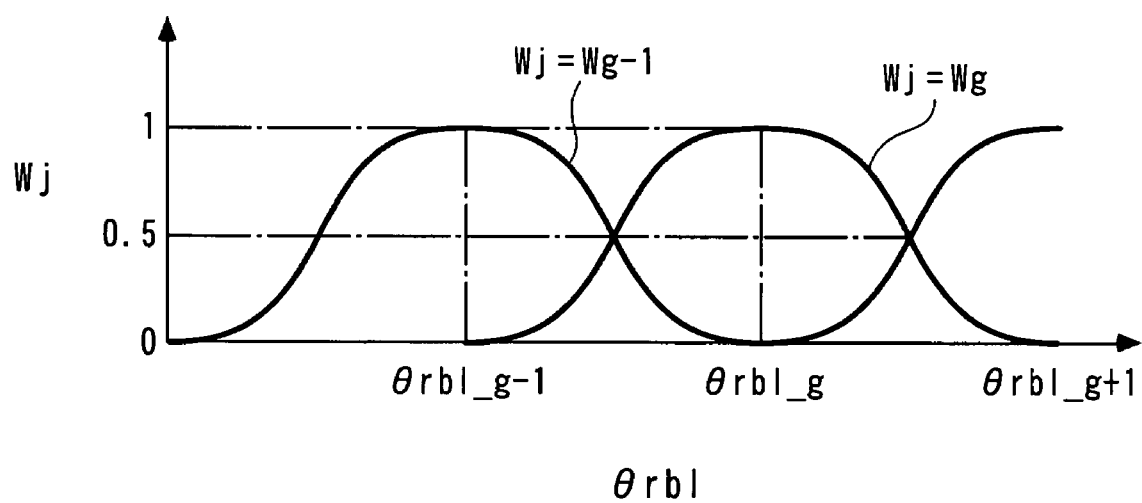
FIG. 41 is s a diagram showing another example of the map for use in the calculation of the nonlinear weight function Wj.

For example, as the plurality of functions, the nonlinear weight functions Wj in the second embodiment may be replaced by functions that have characteristics that change as on a polygon, such as a trapezoid or a pentagon, except the bottom surface thereof, and as to two adjacent elements thereof, respective portions of the elements that change linearly intersect with each other. Further, the nonlinear weight functions Wj according to the second embodiment may be replaced by nonlinear weight functions Wj shown in FIG. 41. As shown in FIG. 41, the nonlinear weight functions Wj are of a curve type which uses a sigmoid function, and are configured such that two adjacent functions intersect with each other, and the sum of the values of two functions corresponding to the exhaust reopening angle $\theta$rbl is equal to 1 at the intersecting portions. The use of such a nonlinear weight functions Wj can also provide the same advantageous effects as provided by the nonlinear weight functions Wj in the second embodiment.

Although in the second embodiment, as the map for calculating the nonlinear weight functions Wj, the one shown in FIG. 31 in which a plurality of regions are defined by equally dividing a range within which the exhaust reopening angle $\theta$rbl is variable, by way of example, there may be used a map in which the plurality of regions are defined by unequally dividing the range within which the exhaust reopening angle $\theta$rbl is variable, as the map for calculating the nonlinear weight functions Wj. In this case, the map is only required to be configured such that the regions are equal in area, and the sum of two values of intersecting portions of two adjacent nonlinear weight functions Wj is equal to 1.

Further, although in the second embodiment, the indicated mean effective pressure Pmi is controlled only by the exhaust reopening angle $\theta$rbl, with the intake opening angle $\theta$lin held constant, by way of example, it is to be understood that the conditions for applying the method of controlling the control apparatus 1A according to the second embodiment are not limited to the above. For example, the intake opening angle $\theta$lin may be calculated by searching a map according to the operating conditions of the engine, and then the exhaust reopening angle θrbl may be controlled by the same method as in the second embodiment, to thereby control the indicated mean effective pressure Pmi such that it is caused to converge to its target value Pmi_cmd.

First, the model corrector calculates the basic estimated controlled variable Yid_nm(k) by inputting the z control inputs to the controlled object model, and calculates the model correction parameter matrix θ(k) by the following equations (62) to (70):

$$Yid\_mod(k) = Yid\_base + \sum_{i=0}^{I} \sum_{j=0}^{J} \theta ij(k-1) \cdot Wij(U1(k-1) \cdots Uz(k-1))$$
$$= Yid\_base + \theta 00(k-1) \cdot W00(U1(k-1) \cdots Uz(k-1)) + \cdots + \theta fg(k-1) \cdot Wfg(U1(k-1) \cdots Uz(k-1)) + \cdots + \theta IJ(k-1) \cdot WIJ(U1(k-1) \cdots Uz(k-1))$$
(62)

$$Yid(k) = Yid\_nm(k) \cdot Yid\_mod(k) \tag{63}$$

$$Eid(k) = Yid(k) - Y(k) \tag{64}$$

$$Emd(k) = \begin{bmatrix} Emd00 & \cdots & Emdf0 & \cdots & EmdI0 \\ \vdots & \ddots & \vdots & \ddots & \vdots \\ Emd0g & \cdots & Emdfg & \cdots & EmdIg \\ \vdots & \ddots & \vdots & \ddots & \vdots \\ Emd0J & \cdots & EmdfJ & \cdots & EmdIJ \end{bmatrix}$$
$$= W\_mod(U1(k-1) \cdots Uz(k-1)) \cdot Eid(k)$$
$$= \begin{bmatrix} W00(U1(k-1) \cdots Uz(k-1)) & \cdots & Wf0(U1(k-1) \cdots Uz(k-1)) & \cdots & WI0(U1(k-1) \cdots Uz(k-1)) \\ \vdots & \ddots & \vdots & \ddots & \vdots \\ W0g(U1(k-1) \cdots Uz(k-1)) & \cdots & Wfg(U1(k-1) \cdots Uz(k-1)) & \cdots & WIg(U1(k-1) \cdots Uz(k-1)) \\ \vdots & \ddots & \vdots & \ddots & \vdots \\ W0J(U1(k-1) \cdots Uz(k-1)) & \cdots & WfJ(U1(k-1) \cdots Uz(k-1)) & \cdots & WIJ(U1(k-1) \cdots Uz(k-1)) \end{bmatrix} \cdot Eid(k)$$
(65)

$$\theta(k) = \theta rch(k) + \theta nl(k) + \theta adp(k) \tag{66}$$

$$\theta rch(k) = -Qrch \cdot \delta(k) \tag{67}$$

$$\theta nl(k) = -Qnl \cdot sgn(\delta(k)) \tag{68}$$

$$\theta adp(k) = \lambda \cdot \theta adp(k-1) - Qadp \cdot \delta(k) \tag{69}$$

$$\delta(k) Emd(k) + R \cdot Emd(k-1) \tag{70}$$

Further, as the method of controlling the indicated mean effective pressure Pmi, the control method according to the second embodiment may be used when the engine is in a steady operating condition with the intake opening angle θlin being held constant, and when the engine has changed from the steady operating condition into a condition other than the same, the method of controlling the indicated mean effective pressure Pmi may be switched from the control method according to the second embodiment to the control method according to the first embodiment.

On the other hand, although in the first embodiment, one controlled variable Pmi is controlled by two control inputs θlin and θrbl, by way of example, and in the second embodiment, one controlled variable Pmi is controlled by one control input θrbl, by way of example, this is not limitative, but the control apparatus according to the invention is also applicable to control of one controlled variable by three or more control inputs. For example, in controlling the controlled variable Pmi by z control inputs Uz (z is an integer not smaller than 3), it is only required to use a controlled object model, not shown, in which relationship between such z control inputs Uz and the controlled variable Pmi is defined, and the following control algorithm:

Next, the onboard model analyzer calculates the basic imaginary controlled variable Ym_nm(n) by inputting the z control inputs Uz to the controlled object model, for retrieval, and calculates z response indices RIz(n) by the following equations (71) to (77):

$$Sz(n) = Az \cdot Sz'(n) \tag{71}$$

$$Vz(n) = Sz(n) + Uz(n) \tag{72}$$

$$Ym\_mod(n) = Ym\_base + \sum_{j=0}^{I} \sum_{j=0}^{J} \theta ij(n) \cdot Wij(V1(n) \cdots Vz(n))$$
$$= Ym\_base + \theta 00(n) \cdot W00(V1(n) \cdots Vz(n)) + \cdots + \theta fg(n) \cdot Wfg(V1(n) \cdots Vz(n)) + \cdots + \theta IJ(n) \cdot WIJ(V1(n) \cdots Vz(n))$$
(73)

$$Ym(n) = Ym\_nm(n) \cdot Ym\_mod(n) \tag{74}$$

$$Ymf(n) = b0 \cdot Ym(n) + b1 \cdot Ym(n-1) + \cdots + bm^* \cdot Ym(n-m^*) + a1 \cdot Ymf(n-1) + a2 \cdot Ymf(n-2) + \cdots + ak^* \cdot Ymf(n-k^*)$$
(75)

-continued $$Sfz(n) = b0 \cdot Sz(n) + b1 \cdot Sz(n-1) + \cdots + bm^* \cdot Sz(n-m^*) + \quad (76)$$
$$a1 \cdot Sfz(n-1) + a2 \cdot Sfz(n-2) + \cdots + ak^* \cdot Sfz(n-k^*)$$

$$RIz(n) = Krz \cdot \sum_{j=n-h}^{n} Ymf(j)Sfz(j) \quad (77)$$

Then, it is only required that the cooperative controller calculates the z control inputs Uz(k) by the following equations (78) to (84):

$$Uz(k) = Urchz(k) + Uadpz(k) \quad (78)$$

$$Urchz(k) = -Krchz \cdot \sigma z(k) \quad (79)$$

$$Uadpz(k) = -Kadpz \cdot \sum_{j=0}^{k} \sigma z(j) \quad (80)$$

$$\sigma z(k) = Emz(k) + S \cdot Emz(k-1) \quad (81)$$

$$Emz(k) = \frac{RIz(k)}{RIz\_max} \cdot Edz(k) \quad (82)$$

$$Edz(k) = \frac{|RIz(k)|}{\sum_{j=1}^{z} |RIj(k)|} \cdot E(k) \quad (83)$$

$$E(k) = Pmi(k) - Pmi\_cmd(k) \quad (84)$$

It is further understood by those skilled in the art that the foregoing are preferred embodiments of the invention, and that various changes and modifications may be made without departing from the spirit and scope thereof.

What is claimed is:

1. A control apparatus comprising:
   correlation parameter-calculating means for using a controlled object model defining a relationship between a control input and a controlled variable in a controlled object, and thereby calculating a correlation parameter other than parameters included in the controlled object model, indicative of a correlation between the control input and a controlled variable in the controlled object model;
   target value-setting means for setting a target value as a target of the controlled variable of the controlled object;
   control input-calculating means for calculating the control input with a predetermined first control algorithm such that the controlled variable of the controlled object is caused to converge to the target value, and determining at least one of an increasing/decreasing rate and an increasing/decreasing direction of the control input according to the correlation parameter; and
   model corrector means for correcting the controlled object model such that the controlled variable of the controlled object model matches the controlled variable of the controlled object,
   wherein said model corrector means calculates a plurality of correction parameters for use in correction of the controlled object model such that the controlled variable of the controlled object model matches the controlled variable of the controlled object, wherein the plurality of correction parameters are calculated using a predefined second control algorithm and correspond to a plurality of re ions obtained by dividing a region where the control input is variable, and calculating ones of the correction parameters corresponding to ones of the regions where the calculated control input exists;
   wherein said model corrector means corrects the controlled object model using values obtained by multiplying values of a plurality of functions by the correction parameters, respectively;
   wherein adjacent two of the regions overlap each other; and
   wherein the functions have respective characteristics such that the functions each take a maximum value of one in a center of each of the respective associated regions and change linearly or curvilinearly, and each two of the functions corresponding to each two overlapping ones of the regions are set such that the functions intersect with each other in portions where the functions change linearly or curvilinearly.

2. A control apparatus as claimed in claim 1, wherein the predetermined second control algorithm includes a predetermined response-specifying control algorithm.

3. A control apparatus as claimed in claim 1, wherein said model corrector means calculates the correction parameters using an integral value of a value based on a difference between the controlled variable of the controlled object model and the controlled variable of the controlled object, while at the same time subjecting the integral value to a predetermined forgetting process.

4. A control apparatus as claimed in claim 1, wherein the controlled object is an internal combustion engine.

5. A control apparatus comprising:
   correlation parameter-calculating means for using a controlled object model defining a relationship between a plurality of control inputs and a controlled variable in a controlled object, and thereby calculating a plurality of correlation parameters respectively being other than parameters included in the controlled object model, indicative of a correlation between the control inputs and a controlled variable in the controlled object model;
   target value-setting means for setting a target value as a target of the controlled variable of the controlled object;
   control input-calculating means for calculating each of the control inputs with a predetermined first control algorithm such that the controlled variable of the controlled object is caused to converge to the target value, and determining at least one of an increasing/decreasing rate and an increasing/decreasing direction of each control input according to each of the correlation parameters; and
   model corrector means for correcting the controlled object model such that the controlled variable of the controlled object model matches the controlled variable of the controlled object,
   wherein said model corrector means calculates a plurality of correction parameters for use in correction of the controlled object model such that the controlled variable of the controlled object model matches the controlled variable of the controlled object, wherein the plurality of correction parameters are calculated using a predefined second control algorithm and correspond to, a plurality of regions obtained by dividing a region where the control inputs are variable, and calculating ones of the correction parameters corresponding to ones of the regions where the calculated control inputs exist;
   wherein said model corrector means corrects the controlled object model using values obtained by multiplying values of a plurality of functions by the correction parameters, respectively;
   wherein adjacent two of the regions overlap each other; and wherein the functions have respective characteristics such that with respect to the control inputs in the regions, the functions each take a maximum value of one in a center of each of the respective associated regions and change in a planar fashion or in a curviplanar fashion, and each two of the functions corresponding to each two overlapping ones of the regions are set such that the functions intersect with each other in portions where the functions change in a planar fashion or in a curviplanar fashion.

6. A control apparatus as claimed in claim 5, wherein the predetermined second control algorithm includes a predetermined response-specifying control algorithm.

7. A control apparatus as claimed in claim 5, wherein said model corrector means calculates the correction parameters using an integral value of a value based on a difference between the controlled variable of the controlled object model and the controlled variable of the controlled object, while at the same time subjecting the integral value to a predetermined forgetting process.

8. A control apparatus as claimed in claim 5, wherein the controlled object is an internal combustion engine.

9. A control method comprising:
a correlation parameter-calculating step of using a controlled object model defining a relationship between a control input and a controlled variable in a controlled object, and thereby calculating a correlation parameter other than parameters included in the controlled object model, indicative of a correlation between the control input and a controlled variable in the controlled object model;
a target value-setting step of setting a target value as a target of the controlled variable of the controlled object;
a control input-calculating step of calculating the control input with a predetermined first control algorithm such that the controlled variable of the controlled object is caused to converge to the target value, and determining at least one of an increasing/decreasing rate and an increasing/decreasing direction of the control input according to the correlation parameter; and
a model correction step of correcting the controlled object model such that the controlled variable of the controlled object model matches the controlled variable of the controlled object,
wherein said model correction step includes calculating a plurality of correction parameters for use in correction of the controlled object model such that the controlled variable of the controlled object model matches the controlled variable of the controlled object, wherein the plurality of correction parameters are calculated using a predefined second control algorithm and correspond to, a plurality of regions obtained by dividing a region where the control input is variable, and calculating ones of the correction parameters corresponding to ones of the regions where the calculated control input exists;
wherein said model correction step includes correcting the controlled object model using values obtained by multiplying values of a plurality of functions by the correction parameters, respectively;
wherein adjacent two of the regions overlap each other; and
wherein the functions have respective characteristics such that the functions each take a maximum value of one in a center of each of the respective associated regions and change linearly or curvilinearly, and each two of the functions corresponding to each two overlapping ones of the regions are set such that the functions intersect with each other in portions where the functions change linearly or curvilinearly.

10. A control method as claimed in claim 9, wherein the predetermined second control algorithm includes a predetermined response-specifying control algorithm.

11. A control method as claimed in claim 9, wherein said model correction step includes calculating the correction parameters using an integral value of a value based on a difference between the controlled variable of the controlled object model and the controlled variable of the controlled object, while at the same time subjecting the integral value to a predetermined forgetting process.

12. A control method as claimed in claim 9, wherein the controlled object is an internal combustion engine.

13. A control method comprising:
a correlation parameter-calculating step of using a controlled object model defining a relationship between a plurality of control inputs and a controlled variable in a controlled object, and thereby calculating a plurality of correlation parameters respectively being other than parameters included in the controlled object model, indicative of a correlation between the control inputs and a controlled variable in the controlled object model;
a target value-setting step of setting a target value as a target of the controlled variable of the controlled object;
a control input-calculating step of calculating each of the control inputs with a predetermined first control algorithm such that the controlled variable of the controlled object is caused to converge to the target value, and determining at least one of an increasing/decreasing rate and an increasing/decreasing direction of each control input according to each of the correlation parameters; and
a model correction step of correcting the controlled object model such that the controlled variable of the controlled object model matches the controlled variable of the controlled object,
wherein said model correction step includes calculating a plurality of correction parameters for use in correction of the controlled object model such that the controlled variable of the controlled object model matches the controlled variable of the controlled object, wherein the plurality of correction parameters are calculated using a predefined second control algorithm and correspond to, a plurality of regions obtained by dividing a region where the control inputs are variable, and calculating ones of the correction parameters corresponding to ones of the regions where the calculated control inputs exist;
wherein said model correction step includes correcting the controlled object model using values obtained by multiplying values of a plurality of functions by the correction parameters, respectively;
wherein adjacent two of the regions overlap each other; and
wherein the functions have respective characteristics such that with respect to the control inputs in the regions, the functions each take a maximum value
of one in a center of each of the respective associated regions and change in a planar fashion or in a curviplanar fashion, and each two of the functions corresponding to each two overlapping ones of the regions are set such that the functions intersect with each other in portions where the functions change in a planar fashion or in a curviplanar fashion.

14. A control method as claimed in claim 13, wherein the predetermined second control algorithm includes a predetermined response-specifying control algorithm.

15. A control method as claimed in claim 13, wherein said model correction step includes calculating the correction parameters using an integral value of a value based on a difference between the controlled variable of the controlled object model and the controlled variable of the controlled object, while at the same time subjecting the integral value to a predetermined forgetting process.

16. A control method as claimed in claim 13, wherein the controlled object is an internal combustion engine.

17. An engine control unit including a control program for causing a computer to use a controlled object model defining a relationship between a control input and a controlled variable in a controlled object, and thereby calculate a correlation parameter other than parameters included in the controlled object model, indicative of a correlation between the control input and a controlled variable in the controlled object model; set a target value as a target of the controlled variable of the controlled object; calculate the control input with a predetermined first control algorithm such that the controlled variable of the controlled object is caused to converge to the target value, and determine at least one of an increasing/decreasing rate and an increasing/decreasing direction of the control input according to the correlation parameter; and correct the controlled object model such that the controlled variable of the controlled object model matches the controlled variable of the controlled object,
- wherein when causing the computer to calculate the controlled object model, the control program causes the computer to calculate a plurality of correction parameters for use in correction of the controlled object model such that the controlled variable of the controlled object model matches the controlled variable of the controlled object, wherein the plurality of correction parameters are calculated using a predefined second control algorithm and correspond to, a plurality of regions obtained by dividing a region where the control input is variable, and calculate ones of the correction parameters corresponding to ones of the regions where the calculated control input exists;
- wherein the control program causes the computer to correct the controlled object model using values obtained by multiplying values of a plurality of functions by the correction parameters, respectively;
- wherein adjacent two of the regions overlap each other; and
- wherein the functions have respective characteristics such that the functions each take a maximum value of one in a center of each of the respective associated regions and change linearly or curvilinearly, and each two of the functions corresponding to each two overlapping ones of the regions are set such that the functions intersect with each other in portions where the functions change linearly or curvilinearly.

18. An engine control unit as claimed in claim 17, wherein the predetermined second control algorithm includes a predetermined response-specifying control algorithm.

19. An engine control unit as claimed in claim 17, wherein when causing the computer to calculate the controlled object model, the control program causes the computer to calculate the correction parameters using an integral value of a value based on a difference between the controlled variable of the controlled object model and the controlled variable of the controlled object, while at the same time subjecting the integral value to a predetermined forgetting process.

20. An engine control unit as claimed in claim 17, wherein the controlled object is an internal combustion engine.

21. An engine control unit including a control program for causing a computer to use a controlled object model defining a relationship between a plurality of control inputs and a controlled variable in a controlled object, and thereby
calculate a plurality of correlation parameters respectively being other than parameters included in the controlled object model, indicative of a correlation between the control inputs and a controlled variable in the controlled object model;
set a target value as a target of the controlled variable of the controlled object;
calculate each of the control inputs with a predetermined first control algorithm such that the controlled variable of the controlled object is caused to converge to the target value, and determine at least one of an increasing/decreasing rate and an increasing/decreasing direction of each control input according to each of the correlation parameters; and
correct the controlled object model such that the controlled variable of the controlled object model matches the controlled variable of the controlled object,
wherein the control program causes the computer to calculate a plurality of correction parameters for use in correction of the controlled object model such that the controlled variable of the controlled object model matches the controlled variable of the controlled object, wherein the plurality of correction parameters are calculated using a predefined second control algorithm and correspond to, a plurality of regions obtained by dividing a region where the control inputs are variable, and calculate ones of the correction parameters corresponding to ones of the regions where the calculated control inputs exist;
wherein the control program causes the computer to correct the controlled object model using values obtained by multiplying values of a plurality of functions by the correction parameters, respectively;
wherein adjacent two of the regions overlap each other; and
wherein the functions have respective characteristics such that with respect to the control inputs in the regions, the functions each take a maximum value of one in a center of each of the respective associated regions and change in a planar fashion or in a curviplanar fashion, and each two of the functions corresponding to each two overlapping ones of the regions are set such that the functions intersect with each other in portions where the functions change in a planar fashion or in a curviplanar fashion.

22. An engine control unit as claimed in claim 21, wherein the predetermined second control algorithm includes a predetermined response-specifying control algorithm.

23. An engine control unit as claimed in claim 21, wherein when causing the computer to calculate the controlled object model, the control program causes the computer to calculate the correction parameters using an integral value of a value based on a difference between the controlled variable of the controlled object model and the controlled variable of the controlled object, while at the same time subjecting the integral value to a predetermined forgetting process.

24. An engine control unit as claimed in claim 21, wherein the controlled object is an internal combustion engine.

* * * * *